United States Patent
Kitamura et al.

(10) Patent No.: US 8,630,032 B2
(45) Date of Patent: Jan. 14, 2014

(54) METHOD FOR PREPARING HOLOGRAM RECORDING MEDIUM

(75) Inventors: Mitsuru Kitamura, Tokyo (JP); Masato Taninaka, Tokyo (JP); Masayo Shima, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 1436 days.

(21) Appl. No.: 12/075,680

(22) Filed: Mar. 13, 2008

(65) Prior Publication Data

US 2008/0239423 A1   Oct. 2, 2008

(30) Foreign Application Priority Data

Mar. 30, 2007   (JP) .................... 2007-090739

(51) Int. Cl.
  *G03H 1/26*  (2006.01)
  *G03H 1/30*  (2006.01)
  *G03H 1/22*  (2006.01)

(52) U.S. Cl.
  USPC ................. 359/22; 359/25; 359/32

(58) Field of Classification Search
  USPC ........................................... 359/22
  See application file for complete search history.

(56) References Cited

U.S. PATENT DOCUMENTS

| | | | |
|---|---|---|---|
| 5,784,200 A | 7/1998 | Modegi | |
| 6,618,190 B2 | 9/2003 | Kitamura et al. | |
| 6,934,074 B2 | 8/2005 | Kitamura et al. | |
| 7,221,496 B2 | 5/2007 | Kitamura | |
| 7,337,168 B1 | 2/2008 | Sigel et al. | |
| 2006/0181077 A1* | 8/2006 | Kaule et al. | 283/72 |
| 2007/0206254 A1 | 9/2007 | Kitamura | |
| 2007/0216978 A1 | 9/2007 | Kitamura et al. | |
| 2007/0242325 A1 | 10/2007 | Kitamura | |
| 2007/0285748 A1 | 12/2007 | Kitamura | |
| 2007/0285749 A1 | 12/2007 | Kitamura | |
| 2007/0285750 A1 | 12/2007 | Kitamura | |
| 2007/0291340 A1 | 12/2007 | Kitamura | |

FOREIGN PATENT DOCUMENTS

| | | |
|---|---|---|
| JP | 10-123919 A | 5/1998 |
| JP | 2007-248716 A | 9/2007 |
| JP | 2007-333924 A | 12/2007 |
| JP | 2007-333925 A | 12/2007 |
| WO | 02/39389 | 5/2002 |

OTHER PUBLICATIONS

Office Action dated Mar. 21, 2012 for Application No. JP 2007-090739.
Espacenet English abstract of JP 10-123919 A.
Espacenet English abstract of JP 2007-248716 A.
Espacenet English abstract of JP 2007-333924 A.
Espacenet English abstract of JP 2007-333925 A.

* cited by examiner

*Primary Examiner* — Jade R Chwasz
(74) *Attorney, Agent, or Firm* — Ladas & Parry LLP

(57) ABSTRACT

Two adjacent images are recorded in a state smoothly blended at a boundary portion. On a recording plane Rec, provided is a region M1 in which an original image Pic(A) is recorded, a region M2 in which an original image Pic(B) is recorded, and a middle region Mm positioned therebetween. The region Mm is divided into a plurality of strip-like regions f1 to f6. The widths of the strip-like regions f1, f3, and f5 that are odd-numbered when counted from the region M1 are set so as to increase monotonically in this order, while the widths of the even-numbered strip-like regions f2, f4, and f6 are set so as to decrease monotonically in this order.

36 Claims, 27 Drawing Sheets

CONDITION (A)

FIG. 13

<SEQUENCE A>

| | G1 | G2 | G3 | G4 | G5 | G6 |
|---|---|---|---|---|---|---|
| | 3 | 11 | 6 | 6 | 11 | 3 |

SUM=40

◎ $W1 = Lm \times \frac{G1}{SUM} = Lm \times \frac{3}{40}$

◎ $W2 = Lm \times \frac{G2}{SUM} = Lm \times \frac{11}{40}$

◎ $W3 = Lm \times \frac{G3}{SUM} = Lm \times \frac{6}{40}$

◎ $W4 = Lm \times \frac{G4}{SUM} = Lm \times \frac{6}{40}$

◎ $W5 = Lm \times \frac{G5}{SUM} = Lm \times \frac{11}{40}$

◎ $W6 = Lm \times \frac{G6}{SUM} = Lm \times \frac{3}{40}$

FIG. 14

<SEQUENCE B>

| | G1 | G2 | G3 | G4 | G5 | G6 |
|---|---|---|---|---|---|---|
| | 3 | 7 | 6 | 7 | 11 | 7 |

<SEQUENCE C>

| | G1 | G2 | G3 | G4 | G5 | G6 |
|---|---|---|---|---|---|---|
| | 7 | 11 | 7 | 6 | 7 | 3 |

FIG. 32

|  | G1 | G2 | G3 | G4 | G5 | G6 |
|---|---|---|---|---|---|---|
| <SEQUENCE A> | 1 | 3 | 2 | 2 | 3 | 1 |

SUM=12

◎ DISTANCE BETWEEN e4/q1

$$W1 = \Delta \times \frac{G1}{SUM} = \Delta \times \frac{1}{12}$$

◎ DISTANCE BETWEEN q1/q2

$$W2 = \Delta \times \frac{G2}{SUM} = \Delta \times \frac{3}{12}$$

◎ DISTANCE BETWEEN q2/q3

$$W3 = \Delta \times \frac{G3}{SUM} = \Delta \times \frac{2}{12}$$

◎ DISTANCE BETWEEN q3/q4

$$W4 = \Delta \times \frac{G4}{SUM} = \Delta \times \frac{2}{12}$$

◎ DISTANCE BETWEEN q4/q5

$$W5 = \Delta \times \frac{G5}{SUM} = \Delta \times \frac{3}{12}$$

◎ DISTANCE BETWEEN q5/E4

$$W6 = \Delta \times \frac{G6}{SUM} = \Delta \times \frac{1}{12}$$

DIFFRACTION GRATING PATTERN

METHOD FOR PREPARING HOLOGRAM RECORDING MEDIUM

BACKGROUND OF THE INVENTION

The present invention relates to a method for preparing a hologram recording medium and particularly relates to a method for preparing a hologram recording medium, with which a state of two adjacent images smoothly blended at a boundary portion therebetween can be expressed by computation using a computer.

Holograms are widely used in applications for preventing counterfeiting of cash vouchers and credit cards. Normally, a region onto which a hologram is to be recorded is set up in a portion of a medium to be subjected to counterfeiting prevention, and a hologram of a three-dimensional image, etc., is recorded inside this region.

Although conventionally with many commercially available holograms, an original image is recorded onto a medium in the form of interference fringes by an optical method, methods for preparing a hologram by forming interference fringes on a recording plane by computation using a computer have recently come to be known. A hologram prepared by such a method is generally referred to as a "computer generated hologram (CGH)" or simply as a "computer hologram." A computer hologram is obtained by simulating a so-called optical interference fringe generating process on a computer, and an entire process of generating interference fringe patterns is carried out as computation on the computer. Upon obtaining image data of interference fringe patterns by such a computation, physical interference fringes are formed on an actual medium based on the image data. As a specific example, a method, with which image data of interference fringe patterns prepared by a computer are provided to an electron beam printer and physical interference fringes are formed by scanning an electron beam across a medium, has been put into practical use.

With the advance of computer graphics technologies, the handling of various images on computers has become a general practice in the printing industry. It will thus be convenient to be able to prepare original images, to be recorded as holograms, in the form of image data obtained using a computer. To meet such demands, techniques for preparing computer holograms are becoming increasingly important and are anticipated to take the place of optical hologram preparing methods in the future. Various techniques related to such computer holograms are disclosed in Japanese Patent Laid-open Publications No. 11-024539, No. 2001-109362 and No. 2003-186376.

Also, although "hologram" normally refers to an optical interference fringe pattern that enables reconstruction of a three-dimensional image, recently, a medium called a "pseudo hologram," in which a diffraction grating pattern is formed in place of an optical interference fringe pattern, has come into widespread use. For example, Japanese Patent Laid-open Publications No. 06-337622 and No. 07-146635 (U.S. Pat. No. 5,784,200 corresponds to them), and No. 07-146637 disclose methods for preparing a "pseudo hologram," with which a predetermined motif is expressed by arraying diffraction grating patterns of various types as pixels, by using a computer, and Japanese Patent Laid-open Publication No. 2001-083866 discloses a method for recording such a "pseudo hologram" and a "normal hologram" on the same medium. Also, Japanese Patent Laid-open Publications No. 2002-328639 and No. 2002-333854 disclose examples of pseudo holograms that use scattering structure patterns instead of diffraction grating patterns.

As mentioned above, although a normal "hologram" refers to an arrangement with which optical interference fringes of an object light and a reference light are recorded on a medium, recently, media, with which various motifs are expressed by diffraction grating patterns or scattering structure patterns, have also come to be generally referred to "holograms." Thus, in the present Application, the term "hologram" shall be used as a broad concept that includes not only normal holograms, formed of optical interference fringe patterns, but also includes pseudo holograms formed of diffraction grating patterns (diffraction grating recording media) and pseudo holograms formed of scattering structure patterns (scattering structure recording media).

In a hologram for a cash voucher or credit card, various motifs, such as a company logo mark, a character string indicating a company name, etc., are recorded according to the application. Methods for superposingly recording a plurality of motifs on the same hologram recording medium have thus been proposed. Because both normal holograms, in which optical interference fringe patterns are recorded, and pseudo holograms, in which diffraction grating patterns are recorded, have a function of making use of the diffraction phenomenon of light to generate reconstruction light, directed in specific directions, two motifs can be recorded superposingly in a manner such that a first motif is observed upon observation from a first direction and a second motif is observed upon observation from a second direction. For example, the above-mentioned Japanese Patent Laid-open Publications No. 2001-109362 and No. 2003-186376 disclose methods for superposingly recording information of a plurality of original images onto the same recording medium, and the above-mentioned Japanese Patent Laid-open Publication No. 06-337622 discloses a method for superposingly recording diffraction grating patterns for indicating two different alphabetical characters.

When two motifs can thus be recorded superposingly, the two motifs can be displayed switchingly according to the observation direction so that, for example, a motif, constituted of a character string indicating a company name, is observed upon observation from a first direction, and a motif, constituted of a company logo mark, is observed upon observation from a second direction. However, depending on the application, such a method for switching according to observation direction may not necessarily be appropriate. For example, there are cases where it is preferable for both the character string indicating the company name and the company logo mark to be displayed next to each other at the same time.

Such cases are conventionally accommodated by simply positioning the two motifs adjacently. For example, the above-mentioned Japanese Patent Laid-open Publication No. 2001-083866 discloses a technique of recording a first motif as an optical interference fringe pattern onto a central region of a medium and positioning a second motif as a diffraction grating pattern at a peripheral region of the medium. However, when a plurality of motifs are simply positioned adjacently in this manner, the motifs do not blend well with each other and the resulting hologram lacks design quality.

SUMMARY OF THE INVENTION

Thus, an object of the present invention is to provide a method for preparing a hologram recording medium, with which two adjacent images can be recorded in a state smoothly blended at a boundary portion therebetween.

(1) The first feature of the invention resides in a hologram recording medium preparing method comprising:

an original image preparing step of preparing, as data, a first original image and a second original image to be recorded;

a main region defining step of defining a first main region and a second main region positioned spatially separated from each other on a hologram recording plane and further defining a middle main region positioned between the first main region and the second main region and in contact with both the first main region and the second main region;

a strip-like region defining step of defining a plurality of strip-like regions extending almost along a first boundary line positioned at a boundary between the first main region and the middle main region or a second boundary line positioned at a boundary between the middle main region and the second main region by dividing the middle main region;

an attribute assigning step of assigning a first record attribute to the first main region, assigning a second record attribute to the second main region, and assigning either the first record attribute or the second record attribute to the middle main region, for the individual strip-like regions, respectively;

a record pattern preparing step of determining an interference fringe pattern, a diffraction grating pattern, or a scattering structure pattern, based on the first original image, for a region assigned with the first record attribute, and determining an interference fringe pattern, a diffraction grating pattern, or a scattering structure pattern, based on the second original image, for a region assigned with the second record attribute, to prepare data indicating a record pattern to be formed on the recording plane; and a medium forming step of forming the record pattern on a physical medium, wherein in the strip-like region defining step, a total of 2n strip-like regions constituted of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region are defined so that any of the following conditions (A), (B), and (C) is satisfied:

(A) Widths of odd-numbered strip-like regions gradually increase from the first main region to the second main region, and widths of even-numbered strip-like regions gradually decrease from the first main region to the second main region;
(B) Widths of odd-numbered strip-like regions gradually increase from the first main region to the second main region, and widths of even-numbered strip-like regions are maintained almost constant; and
(C) Widths of even-numbered strip-like regions gradually decrease from the first main region to the second main region, and widths of odd-numbered strip-like regions are maintained almost constant, and in the attribute assigning step, the second record attribute is assigned to the odd-numbered strip-like regions, and the first record attribute is assigned to the even numbered strip-like regions.

(2) The second feature of the invention resides in a hologram recording medium preparing method according to the first feature, wherein in the strip-like region defining step, the respective strip-like regions are defined so that one lateral contour line of a first strip-like region is in contact with the first main region, the other lateral contour line of the first strip-like region is in contact with a second strip-like region, with respect to i within a range of 1<i<2n, one lateral contour line of an i-th strip-like region is in contact with an (i−1)-th strip-like region, and the other lateral contour line of the i-th strip-like region is in contact with an (i+1)-th strip-like region, and one lateral contour line of a 2n-th strip-like region is in contact with a (2n−1)-th strip-like region, and the other contour line of the 2n-th strip-like region is in contact with the second main region.

(3) The third feature of the invention resides in a hologram recording medium preparing method according to the second feature, wherein in the main region defining step, the respective main regions are defined so that the first boundary line and the second boundary line are constituted of lines in the same shape so as to overlap with each other by a parallel displacement, and in the strip-like region defining step, strip-like regions each having, as lateral contour lines, two sides constituted of lines in the same shape that overlap with the first boundary line and the second boundary line by a parallel displacement are defined, and where a distance in a predetermined axis direction between both contour lines of a strip-like region is provided as a width of the strip-like region, the width is defined so that any of the conditions (A), (B), and (C) is satisfied.

(4) The fourth feature of the invention resides in a hologram recording medium preparing method according to the third feature, wherein in the main region defining step, the respective main regions are defined so that the first boundary line and the second boundary line become straight lines parallel to each other, and in the strip-like region defining step, strip-like regions each having, as lateral contour lines, two sides parallel to the first boundary line and the second boundary line are defined.

(5) The fifth feature of the invention resides in a hologram recording medium preparing method according to the fourth feature, wherein in the main region defining step, the first main region, the middle main region, and the second main region are defined, respectively, by three rectangular regions positioned adjacently in a traverse direction, and in the strip-like region defining step, longer-than-wide strip-like regions are defined by dividing a rectangle constituting the middle main region into 2n parts in the traverse direction.

(6) The sixth feature of the invention resides in a hologram recording medium preparing method according to the third to fifth features, wherein in the strip-like region defining step, any of the following sequences A, B, and C is defined:
<Sequence A>: Sequence composed of 2n numerals Gi (i=1~2n, n is an integer equal to or more than 2) of which odd-numbered numerals increase monotonically and even-numbered numerals decrease monotonically;
<Sequence B>: Sequence composed of 2n numerals Gi (i=1~2n, n is an integer equal to or more than 2) of which odd-numbered numerals increase monotonically and even-numbered numerals take the same value; and
<Sequence C>: Sequence composed of 2n numerals Gi (i=1~2n, n is an integer equal to or more than 2) of which even-numbered numerals decrease monotonically and odd-numbered numerals take the same value, and the strip-like regions are defined so that, where a total width of the middle main region is Lm and a sum total of numerals composing a defined sequence is SUM, a width Wi of an i-th strip-like region becomes Wi=Lm×Gi/SUM.

(7) The seventh feature of the invention resides in a hologram recording medium preparing method according to the second feature, wherein in the main region defining step, a first boundary half line and a second boundary half line having a predetermined reference point as an end point are defined to define the respective main regions, so that a partial section of the first boundary half line becomes the first boundary line and a partial section of the second boundary half line becomes the second boundary line, and in the strip-like region defining step, $(2n-1)$ dividing half lines having the reference point as an end point and positioned between the first boundary half line and the second boundary half line are defined to define strip-like regions by dividing the middle main region by the individual dividing half lines, so that, where an intersection angle of half lines constituting lateral contour lines of each strip-like region is provided as a width of the strip-like region, any of the conditions (A), (B), and (C) is satisfied.

(8) The eighth feature of the invention resides in a hologram recording medium preparing method according to the second feature, wherein in the main region defining step, a specific shape line whose shape and position are determined with reference to a predetermined half line is defined and a first boundary half line and a second boundary half line having a predetermined reference point as an end point are defined to define the respective main regions, so that a partial section of a specific shape line with reference to the first boundary half line becomes the first boundary line and a partial section of a specific shape line with reference to the second boundary half line becomes the second boundary line, and in the strip-like region defining step, $(2n-1)$ dividing half lines having the reference point as an end point and positioned between the first boundary half line and the second boundary half line are defined to define strip-like regions by dividing the middle main region by specific shape lines with reference to the individual dividing half lines, and for each strip-like region, where an intersection angle of a pair of half lines being the basis for a pair of specific shape lines including contour lines at both sides is provided as a width of the strip-like region, the widths are defined so that any of the conditions (A), (B), and (C) is satisfied.

(9) The ninth feature of the invention resides in a hologram recording medium preparing method according to the seventh or eighth feature, wherein in the strip-like region defining step, any of the following sequences A, B, and C is defined:

<Sequence A>: Sequence composed of 2n numerals Gi ($i=1 \sim 2n$, n is an integer equal to or more than 2) of which odd-numbered numerals increase monotonically and even-numbered numerals decrease monotonically;

<Sequence B>: Sequence composed of 2n numerals Gi ($i=1 \sim 2n$, n is an integer equal to or more than 2) of which odd-numbered numerals increase monotonically and even-numbered numerals take the same value; and <Sequence C>: Sequence composed of 2n numerals Gi ($i=1 \sim 2n$, n is an integer equal to or more than 2) of which even-numbered numerals decrease monotonically and odd-numbered numerals take the same value, and the strip-like regions are defined so that, where an intersection angle of the first boundary half line and the second boundary half line is $\phi$ and a sum total of numerals composing a defined sequence is SUM, a width $\theta i$ of an i-th strip-like region becomes $\theta i = \phi \times Gi / SUM$.

(10) The tenth feature of the invention resides in a hologram recording medium preparing method according to the first feature, wherein in the main region defining step, the middle main region is defined so as to surround the first main region, and the second main-region is defined so as to surround the middle main region, and in the strip-like region defining step, a first annular strip-like region is defined so as to surround the first main region, an $(i+1)$-th annular strip-like region is defined so as to surround an i-th annular strip-like region ($i=1 \sim 2n-1$, n is an integer equal to or more than 2), and the second main region surround a 2n-th annular strip-like region.

(11) The eleventh feature of the invention resides in a hologram recording medium preparing method according to the tenth feature, wherein in the main region defining step, a sample figure having a closed contour line and a reference point positioned in the interior or on the contour line of the sample figure are defined, a first basic figure obtained by increasing the sample figure by $\alpha$ times and a reference point corresponding thereto and a second basic figure obtained by increasing the same figure by $\beta$ times ($\alpha < \beta$) and a reference point corresponding thereto are determined, the first basic figure and the second basic figure are overlapped so that the respective reference points overlap, and an inner region of the first basic figure or a part thereof is defined as the first main region, an outer region of the second basic figure or a part thereof is provided as the second main region, and a region positioned outside the first basic region and inside the second basic region or a part thereof is defined as the middle main region.

(12) The twelfth feature of the invention resides in a hologram recording medium preparing method according to the eleventh feature, wherein in the strip-like region defining step, a total of $(2n-1)$ magnification parameters $\gamma(i)$ ($i=1 \sim 2n-1$, n is an integer equal to or more than 2) that satisfy a condition $\alpha < \gamma(1) < \gamma(2) < \gamma(3) < , \ldots , < \gamma(2n-1) < \beta$ are defined to determine a total of $(2n-1)$ middle figures obtained by increasing the sample figure by $\gamma(i)$ times, respectively, and these respective middle figures are overlapped so that respective reference points overlap with the reference points of the first basic figure and the second basic figure, an annular region sandwiched between a contour line of the first basic figure and a contour line of a first middle figure is defined as a first strip-like region, an annular region sandwiched between a contour line of an i-th middle figure and a contour line of an $(i+1)$-th middle figure is defined as an $(i+1)$-th strip-like region ($i=1 \sim 2n-2$, n is an integer equal to or more than 2), and an annular region sandwiched by a contour line of a $(2n-1)$-th middle figure and a contour line of the second basic figure is defined as a 2n-th strip-like region.

(13) The thirteenth feature of the invention resides in a hologram recording medium preparing method according to the twelfth feature, wherein in the strip-like region defining step, any of the following sequences A, B, and C is defined:

<Sequence A>: Sequence composed of 2n numerals Gi ($i=1 \sim 2n$, n is an integer equal to or more than 2) of which odd-numbered numerals increase monotonically and even-numbered numerals decrease monotonically;

<Sequence B>: Sequence composed of 2n numerals Gi ($i=1 \sim 2n$, n is an integer equal to or more than 2) of which odd-numbered numerals increase monotonically and even-numbered numerals take the same value; and <Sequence C>: Sequence composed of 2n numerals Gi ($i=1 \sim 2n$, n is an integer equal to or more than 2) of which even-numbered numerals decrease monotonically and odd-numbered numerals take the same value, and the strip-like regions are defined so that, where $\delta=\beta-\alpha$, a sum total of numerals composing a defined sequence is SUM, and a sum of numerals from a first numeral G1 to an i-th numeral Gi of the defined sequence is Si, an i-th magnification parameter $\gamma(i)$ becomes $\gamma(i)=\alpha+(Si/SUM)\delta$.

(14) The fourteenth feature of the invention resides in a hologram recording medium preparing method according to the eleventh to thirteenth features, wherein a reference point of a sample figure is defined at a center of gravity position of the sample figure.

(15) The fifteenth feature of the invention resides in a hologram recording medium preparing method according to the tenth feature, wherein in the main region defining step, a first basic figure having a closed contour line and a second basic figure having a closed contour line and including the first basic figure are defined, an inner region of the first basic figure or a part thereof is defined as the first main region, an outer region of the second basic figure or a part thereof is defined as the second main region, and a region positioned outside the first basic figure and inside the second basic figure or a part thereof is defined as the middle main region.

(16) The sixteenth feature of the invention resides in a hologram recording medium preparing method according to the fifteenth feature, wherein in the strip-like region defining step, a reference point is defined in an interior of the first basic figure, and a plurality of, m first index points are defined on the contour line of the first basic figure, m half lines having the reference point as an end point and passing through the m first index points are defined, and second index points are defined at intersections between these m half lines and the contour line of the second basic figure, and where a distance along a half line between an inner contour line and an outer contour line of each strip-like region is provided as a width of the strip-like region on the half line, the width is defined so that, on any of the m half lines, any of the conditions (A), (B), and (C) is satisfied.

(17) The seventeenth feature of the invention resides in a hologram recording medium preparing method according to the sixteenth feature, wherein in the strip-like region defining step, any of the following sequences A, B, and C is defined:
<Sequence A>: Sequence composed of 2n numerals Gi (i=1~2n, n is an integer equal to or more than 2) of which odd-numbered numerals increase monotonically and even-numbered numerals decrease monotonically;
<Sequence B>: Sequence composed of 2n numerals Gi (i=1~2n, n is an integer equal to or more than 2) of which odd-numbered numerals increase monotonically and even-numbered numerals take the same value; and
<Sequence C>: Sequence composed of 2n numerals Gi (i=1~2n, n is an integer equal to or more than 2) of which even-numbered numerals decrease monotonically and odd-numbered numerals take the same value, and where, for each half line, a distance between the first index point and the second index point is A and a sum total of numerals composing a defined sequence is SUM, a width Wi of an i-th strip-like region on the half line becomes $Wi=A \times Gi/SUM$.

(18) The eighteenth feature of the invention resides in a hologram recording medium preparing method according to the seventeenth feature, wherein in the strip-like region defining step, by plotting, on each half line, points to be intersections with inner contour lines and outer contour lines of individual strip-like regions and connecting the plotted points by a straight line or a smooth curved line, the inner contour lines and the outer contour lines of the individual strip-like regions are defined.

(19) The nineteenth feature of the invention resides in a hologram recording medium preparing method according to the sixteenth to eighteenth features, wherein in the strip-like region defining step, a reference point of the first basic figure is defined at a center of gravity position thereof.

(20) The twentieth feature of the invention resides in a hologram recording medium preparing method according to the sixteenth to nineteenth features, wherein in the main region setting step, a polygon is defined as the first basic figure, and in the strip-like region defining step, individual apexes of the polygon are used as the first index points.

(21) The twenty-first feature of the invention resides in a hologram recording medium preparing method according to the sixteenth to nineteenth features, wherein in the strip-like region defining step, a start point is determined on the contour line of the first basic figure, and the first index points are defined as points periodically plotted at predetermined reference intervals along the contour line from the start point.

(22) The twenty-second feature of the invention resides in a hologram recording medium preparing method according to the sixteenth to nineteenth features, wherein in the strip-like region defining step, dividing points to divide an overall length of the contour line of the first basic figure into a plurality of, m equal parts are determined, and these dividing points are used as the first index points.

(23) The twenty-third feature of the invention resides in a hologram recording medium preparing method according to the sixteenth to nineteenth features, wherein in the strip-like region defining step, with an integer m equal to or more than 2, m half lines having a reference point as an end point are defined in a manner separated at an angle of 360°/m, and the first index points are defined at intersections between these m half lines and the contour line of the first basic figure.

(24) The twenty-fourth feature of the invention resides in a hologram recording medium preparing method according to the first to twenty-third features, wherein in the original image preparing step, digital data, expressing a two-dimensional image or a three-dimensional image, is prepared as an original image.

(25) The twenty-fifth feature of the invention resides in a hologram recording medium preparing method according to the first to twenty-fourth features, wherein in the original image preparing step, an empty image without an actual entity is prepared as one of the original images and no pattern whatsoever is formed for regions that have been assigned with a record attribute of the empty image.

(26) The twenty-sixth feature of the invention resides in a hologram recording medium preparing method according to the first to twenty-fifth features, wherein in determining an interference fringe pattern based on an original image for each region in the record pattern preparing step, the original image and the recording plane are positioned in a three-dimensional space, a predetermined reference light is defined, and an interference fringe pattern, formed in the region by an object light from the original image and the reference light, is determined by computation.

(27) The twenty-seventh feature of the invention resides in a hologram recording medium preparing method according to the first to twenty-fifth features, wherein in determining a diffraction grating pattern or a scattering structure pattern based on an original image for each region in the record pattern preparing step, a plurality of pixels are defined in each region, corresponding pixels on the original image are determined for the defined pixels, and a diffraction grating pattern or a scattering structure pattern in each individual defined pixel is determined based on a pixel value of a corresponding pixel.

(28) The twenty-eighth feature of the invention resides in a hologram recording medium preparing method according to the first to twenty-fifth features, wherein in the record pattern preparing step, the first original image, the second original image, and the recording plane are positioned in a three-dimensional space, a predetermined reference light is defined, an interference fringe pattern of object light from the first original image and the reference light is determined by computation for each region, to which the first record attribute is assigned, and an interference fringe pattern of object light from the second original image and the reference light is determined by computation for each region, to which the second record attribute is assigned.

(29) The twenty-ninth feature of the invention resides in a hologram recording medium preparing method according to the first to twenty-fifth features, wherein in the record pattern preparing step, the first original image and the recording plane are positioned in a three-dimensional space, a predetermined reference light is defined, and an interference fringe pattern of object light from the first original image and the reference light is determined by computation for each region to which the first record attribute is assigned, and for each region to which the second record attribute is assigned, a plurality of pixels are defined in the region, corresponding pixels on the second original image are determined for the defined pixels, and a diffraction grating pattern or a scattering structure pattern in each individual defined pixel is determined based on a pixel value of a corresponding pixel.

(30) The thirtieth feature of the invention resides in a hologram recording medium preparing method according to the first to twenty-fifth features, wherein in the record pattern preparing step, for each region to which the first record attribute is assigned, a plurality of pixels are defined in the region, corresponding pixels on the first original image are determined for the defined pixels, and a diffraction grating pattern or a scattering structure pattern in each individual defined pixel is determined based on a pixel value of a corresponding pixel, and for each region to which the second record attribute is assigned, a plurality of pixels are defined in the region, corresponding pixels on the second original image are determined for the defined pixels, and a diffraction grating pattern or a scattering structure pattern in each individual defined pixel is determined based on a pixel value of a corresponding pixel.

(31) The thirty-first feature of the invention resides in a computer program, having a function of making a computer execute, on the basis of digital data, expressing an original image prepared in the original image preparing step of the preparing method according to the first to thirtieth features, and digital data, expressing the main regions defined in the main region defining step of the preparing method according to the first to thirtieth features;

the process of the strip-like region defining step, the process of the attribute assigning step, and the process of the record pattern preparing step of the preparing method according to the first to thirtieth features.

(32) The thirty-second feature of the invention resides in a hologram recording medium, prepared by the preparing method according to the first to thirtieth features.

(33) The thirty-third feature of the invention resides in a hologram recording medium preparing device comprising:

an original image storage unit, storing, as data, a first original image and a second original image to be recorded;

a main region data storage unit, storing data indicating a first main region and a second main region positioned spatially separated from each other on a hologram recording plane and a middle main region positioned between the first main region and the second main region and in contact with both the first main region and the second main region;

a strip-like region defining unit, defining a plurality of strip-like regions extending almost along a first boundary line positioned at a boundary between the first main region and the middle main region or a second boundary line positioned at a boundary between the middle main region and the second main region by dividing the middle main region;

an attribute assigning unit, assigning a first record attribute to the first main region, assigning a second record attribute to the second main region, and assigning either the first record attribute or the second record attribute to the middle main region for the individual strip-like regions, respectively; and a record pattern preparing unit, determining an interference fringe pattern, a diffraction grating pattern, or a scattering structure pattern, based on the first original image, for a region assigned with the first record attribute, and determining an interference fringe pattern, a diffraction grating pattern, or a scattering structure pattern, based on the second original image, for a region assigned with the second record attribute, to prepare data indicating a predetermined record pattern to be formed on the recording plane, wherein in the strip-like region defining unit, a total of 2n strip-like regions constituted of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region are defined so that any of the following conditions (A), (B), and (C) is satisfied:

(A) Widths of odd-numbered strip-like regions gradually increase from the first main region to the second main region, and widths of even-numbered strip-like regions gradually decrease from the first main region to the second main region;
(B) Widths of odd-numbered strip-like regions gradually increase from the first main region to the second main region, and widths of even-numbered strip-like regions are maintained almost constant; and
(C) Widths of even-numbered strip-like regions gradually decrease from the first main region to the second main region, and widths of odd-numbered strip-like regions are maintained almost constant, and in the attribute assigning unit, the second record attribute is assigned to the odd-numbered strip-like regions, and the first record attribute is assigned to the even numbered strip-like regions.

(34) The thirty-fourth feature of the invention resides in a hologram recording medium comprising:

a first main region and a second main region positioned spatially separated from each other and a middle main region positioned between the first main region and the second main region and in contact with both the first main region and the second main region, wherein the middle main region is divided into a plurality of strip-like regions extending almost along a first boundary line positioned at a boundary between the first main region and the middle main region or a second boundary line positioned at a boundary between the middle main region and the second main region, the plurality of strip-like regions are constituted of a total of 2n strip-like regions of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region, widths of the 2n strip-like regions are set so that any of the following conditions (A), (B), and (C) is satisfied:

(A) Widths of odd-numbered strip-like regions gradually increase from the first main region to the second main region, and widths of even-numbered strip-like regions gradually decrease from the first main region to the second main region;

(B) Widths of odd-numbered strip-like regions gradually increase from the first main region to the second main region, and widths of even-numbered strip-like regions are maintained almost constant; and (C) Widths of even-numbered strip-like regions gradually decrease from the first main region to the second main region, and widths of odd-numbered strip-like regions are maintained almost constant, and in the first main region and the even-numbered strip-like regions, an interference fringe pattern, a diffraction grating pattern, or a scattering structure pattern based on a first original image is recorded, while in the second main region and the even-numbered strip-like regions, an interference fringe pattern, a diffraction grating pattern, or a scattering structure pattern based on a second original image is recorded.

(35) The thirty-fifth feature of the invention resides in a hologram recording medium comprising:

a first main region and a second main region positioned spatially separated from each other and a middle main region positioned between the first main region and the second main region and in contact with both the first main region and the second main region, wherein the middle main region is divided into a plurality of strip-like regions extending almost along a first boundary line positioned at a boundary between the first main region and the middle main region or a second boundary line positioned at a boundary between the middle main region and the second main region, the plurality of strip-like regions are constituted of a total of 2n strip-like regions of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region, widths of the 2n strip-like regions are set so that any of the following conditions (A), (B), and (C) is satisfied:

(A) Widths of odd-numbered strip-like regions gradually increase from the first main region to the second main region, and widths of even-numbered strip-like regions gradually decrease from the first main region to the second main region;

(B) Widths of odd-numbered strip-like regions gradually increase from the first main region to the second main region, and widths of even-numbered strip-like regions are maintained almost constant; and (C) Widths of even-numbered strip-like regions gradually decrease from the first main region to the second main region, and widths of odd-numbered strip-like regions are maintained almost constant, and an interference fringe pattern of an object light from an original image and a reference light is recorded in the first main region and the even-numbered strip-like regions, and in the second main region and the odd-numbered strip-like regions, a plurality of pixels are positioned, and diffraction grating patterns or scattering structure patterns according to pixels of an image to be expressed are recorded in the individual pixels.

In the hologram recording medium preparing method according to the present invention, a middle main region is provided between a first main region in which a first original image is recorded and a second main region in which a second original image is recorded. And, in this middle main region, a strip-like region in which the first original image is recorded and a strip-like region in which the second original image is recorded are alternately positioned and the widths of the respective strip-like regions are gradually changed, so that in this middle main region, switching spatially can be smoothly performed from the first original image to the second original image. Thus, it becomes possible to record two adjacent images in a state smoothly blended at a boundary portion.

BRIEF DESCRIPTION OF THE DRAWINGS

FIG. 13 is a view showing a sequence A used for setting dimensions of the strip-like regions according to the condition (A) shown in FIG. 8 and expressions for calculating the widths of the respective strip-like regions.

FIG. 14 is a view showing sequences B and C used for setting dimensions of the strip-like regions according to the conditions (B) and (C) shown in FIG. 9 and FIG. 10.

FIG. 32 is a view showing a sequence A used for setting positions of the points q1 to q5 shown in FIG. 31 and expressions used for calculating distances between the respective points.

DESCRIPTION OF THE PREFERRED EMBODIMENTS

The present invention shall now be described based on the illustrated embodiments.

Section 1

Basic Embodiment

Figure 1:
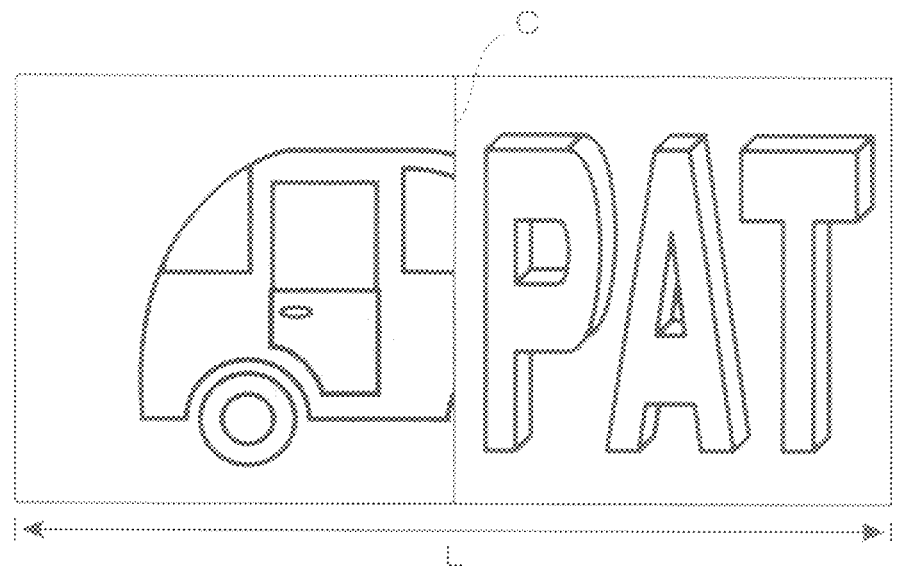
FIG. 1 is a plan view showing an example of a mode of observation of a conventional hologram recording medium, in which two motifs are expressed upon simply being positioned adjacently.

First, basic concepts of the present invention shall be described. FIG. 1 is a plan view showing an example of a conventional hologram recording medium, in which two motifs are expressed upon being positioned adjacently. A boundary line C is set at a position at approximately half of a transverse width L of the hologram recording medium, a motif of an automobile is recorded in a left half, and a motif of three-dimensional characters of "PAT" is recorded in a right half. This recording medium is thus formed by positioning the medium of the left half, in which the automobile motif is recorded, and the medium of the right half, in which the three-dimensional character motif is recorded, next to each other across the boundary line C. Such a recording medium can be prepared by a general, conventional hologram recording medium preparing method. Conventionally, such a method for recording two motifs by partitioning by a contour line C is employed, for example, in a case where a company logo mark and a character string indicating a company name are to be recorded respectively as motifs positioned next to each other at left and right sides.

However, as mentioned above, when a plurality of motifs are simply positioned adjacently in this manner, the motifs do not blend well with each other and the resulting hologram lacks design quality. The present invention proposes a new method for improving the design quality by securing blending of recorded motifs by recording two adjacent images (motifs) in a state smoothly blended at a boundary portion.

Figure 2:
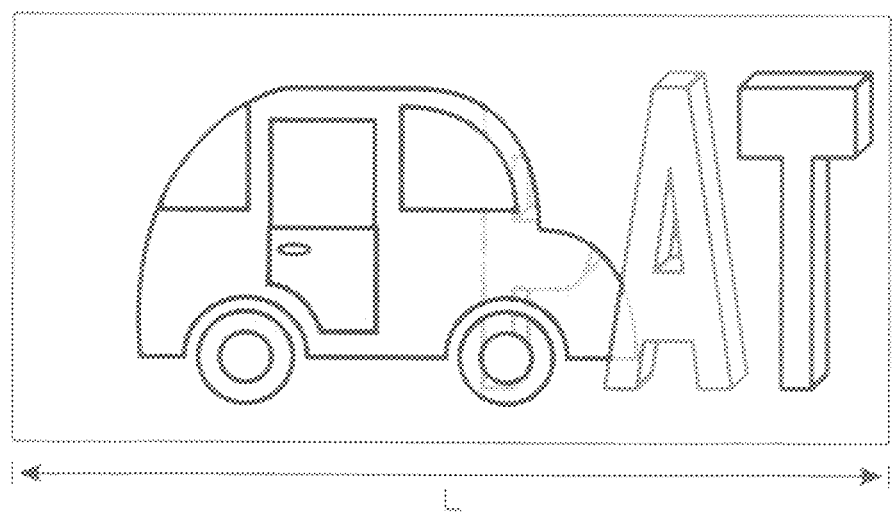
FIG. 2 is a plan view showing an example of a mode of observation of a hologram recording medium recorded with two motifs in a state smoothly blended at a boundary portion by a method according to the present invention.

FIG. 2 is a plan view showing an example of a mode of observation of a hologram recording medium recorded with two motifs in a state smoothly blended at a boundary portion by a method according to the present invention. However, this FIG. 2 is not a view accurately showing an actual mode of observation, but a view showing, as a plan view, an image of two motifs observed while smoothly blended at a boundary portion therebetween. Although an actual mode of observation of the hologram recording medium cannot be shown as a plan view, an image viewed by an observer is close to such a form as shown in FIG. 2.

Although in the recording medium shown in FIG. 2, the automobile motif and the three-dimensional character motif of "PAT" are recorded as in the recording medium shown in FIG. 1, the boundary between the two motifs is not clear and the motifs are expressed so as to blend near a central portion. This is a result of such an expression as to blend a right portion of the automobile motif and a left portion of the three-dimensional character motif. From a comparison with the conventional recording medium, shown in FIG. 1, it can be understood that with the recording medium according to the present invention, shown in FIG. 2, the two motifs are mixed as if dissolving into each other, and blending of both motifs is secured so that a design that is integral as a whole is realized.

With general images (images that are not recorded as interference fringe patterns or diffraction grating patterns), image processing techniques by which two motifs are gradually blended by applying gradation as shown in FIG. 2 have been practiced for a long time. To blend two pieces of digital image data, a method called α-blending is generally used. In this method, when two images are overlapped, the pixel value of a pixel at a position of mutual overlap is determined by synthesis at a ratio of: "α:(1−α))" (where 0≤α≤1). For example, to synthesize a pixel value Pa of an image A and a pixel value Pb of an image B to determine a new, synthesized pixel value, the new pixel value Pc is determined by the formula: "Pc=α·Pa+(1−α)·Pb." By gradually changing the value of α spatially, two images can be blended as shown in FIG. 2.

However, in the case of a hologram recording medium, this α-blending method for a general, planar image cannot be applied as it is. This is because whereas a general planar image is observed as a distribution of densities or luminances of the respective individual pixels, in the case of a hologram recording medium, a reconstruction image is observed due to diffracted light that results from diffraction by an interference fringe pattern or a diffraction grating pattern recorded on the medium and propagates toward a viewpoint direction. Even if, in actually recording a synthetic image of an image A and an image B as a hologram onto a medium, a method for simply overlapping the interference fringe pattern or the diffraction grating pattern of both images is employed, recording cannot be performed in a manner such that a clear reconstruction image for practical purposes is obtained.

Figure 3:
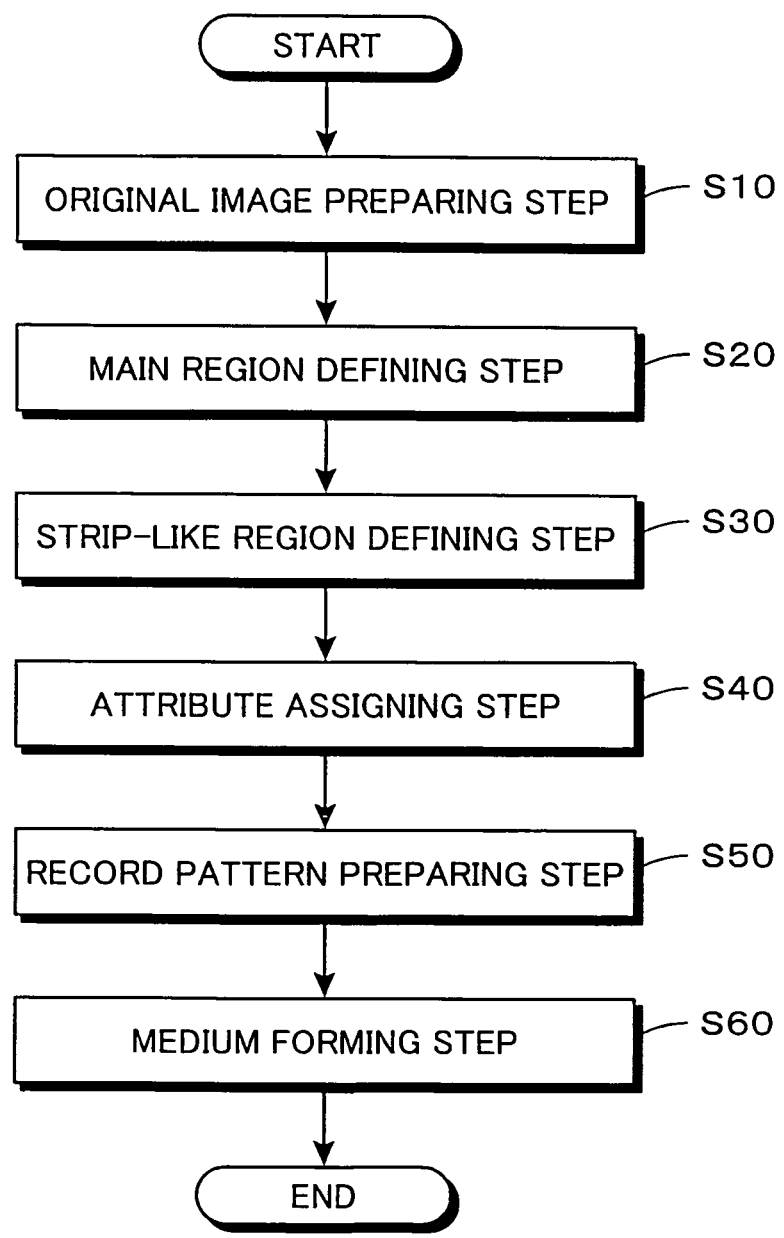
FIG. 3 is a flowchart showing procedures of a hologram recording medium preparing method according to a basic embodiment of the present invention.

The present invention proposes a new method that enables an expression of two images smoothly blended at a boundary portion to be carried out on a hologram recording medium. A procedure of a hologram recording medium preparing method according to a basic embodiment of the present invention shall now be described with reference to a flowchart of FIG. 3. The basic procedure shown in FIG. 3 is constituted of an original image preparing step (S10), a main region defining step (S20), a strip-like region defining step (S30), an attribute assigning step (S40), a record pattern preparing step (S50), and a medium forming step (S60). Specific processing details of these respective steps shall now be described in line with an example of preparing the recording medium shown in FIG. 2.

Figure 4A:
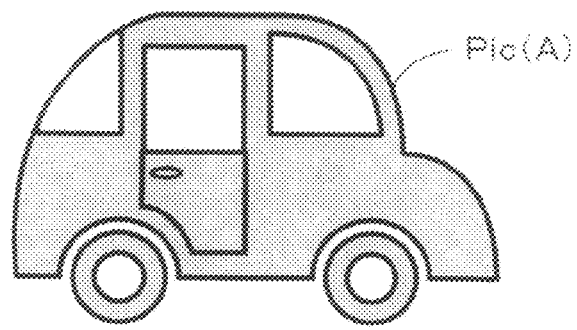
FIGS. 4A and 4B are front views of two original images that are to be recorded by the method according to the present invention.
Figure 4B:
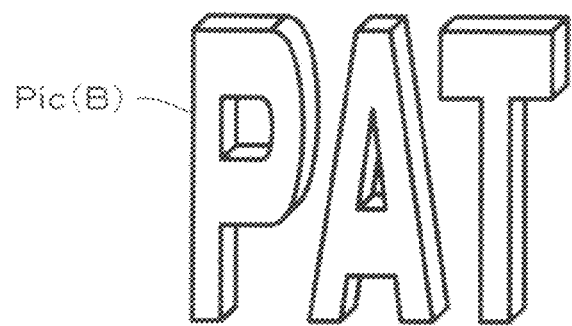

As mentioned above, two types of motifs are recorded in the recording medium shown in FIG. 2. Thus, in the "original image preparing step" of step S10, a first original image and a second original image that are to be recorded are prepared as data. The two pieces of original image data correspond to the respective motifs. FIG. 4A shows a first original image Pic(A) for expressing the automobile motif (although a front view is shown in the figure, the image is actually a three-dimensional image with the shape of an automobile), and FIG. 4B shows a second original image Pic(B) for expressing the three-dimensional characters of "PAT." These pieces of data that express the original images are both prepared as digital data. Here, it shall be deemed that the respective original images Pic(A) and Pic(B) are prepared as data of three-dimensional objects defined in a three-dimensional XYZ coordinate system. Although a three-dimensional object is normally expressed as data of a form expressing a collection of a large number of polygons, the data form of the original image data prepared here may be any data form.

The "main region defining step" of step S20 is carried out next. That is, three main regions of a first main region M1, a second main region M2, and a middle main region Mm are defined on a hologram recording plane. Here, the first main recording region M1 and the second main recording region M2 are regions positioned spatially separated from each other, and the middle main region Mm is a region that is positioned between the first main region M1 and the second main region M2 and in contact with both the first main region M1 and the second main region M2.

Figure 4C:
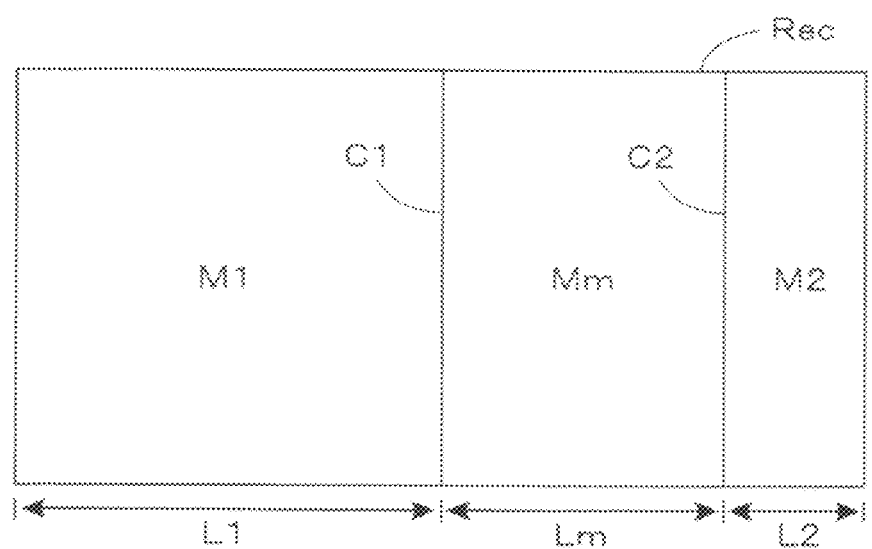
FIG. 4C is a front view of a recording plane, on which three main regions are defined.

FIG. 4C shows an example of three main regions M1, Mm, and M2 defined on a hologram recording plane Rec. Specifically, a rectangular hologram recording plane Rec is divided into three rectangular regions having transverse widths L1, Lm, and L2, and the respective rectangular regions are provided as a first main region M1, a middle main region Mm, and a second main region M2. The first main region M1 and the middle main region Mm are in contact across a first boundary line C1, and the middle main region Mm and the second main region M2 are in contact across a second boundary line C2. The first main region M1 is a region for recording the first original image Pic(A) shown in FIG. 4A, and the second main region M2 is a region for recording the second original image Pic(B) shown in FIG. 4B. The middle main region Mm is a region for recording these both original images in a smoothly blended state.

Figure 5:
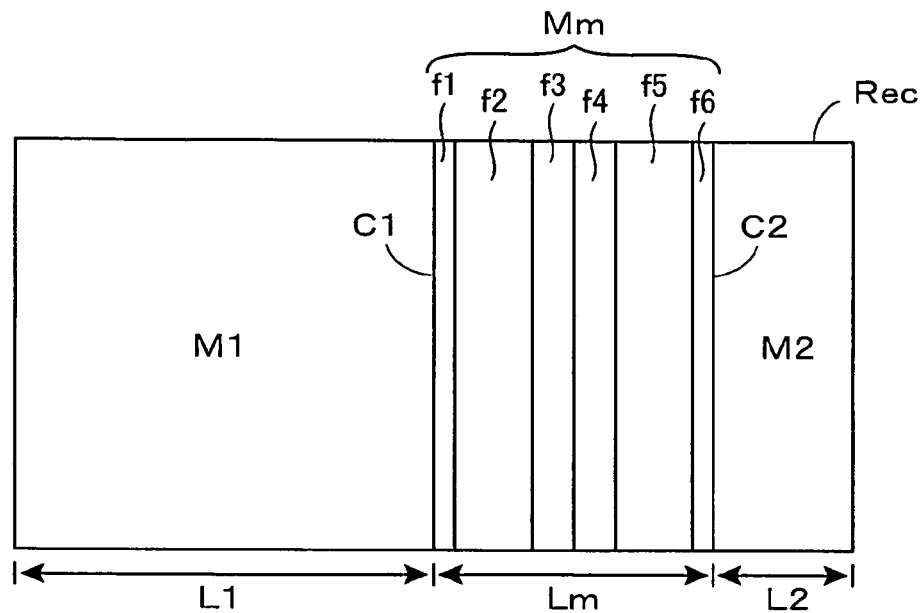
FIG. 5 is a plan view showing a state in which a middle main region Mm of the recording plane shown in FIG. 4C has been divided into a plurality of strip-like regions f1 to f6.

The "strip-like region defining step" of step S30 is then carried out. A strip-like region (band-like region) to be defined here is a region that is obtained by dividing the middle main region Mm and should be called a sub-region relative to a main region. FIG. 5 is a plan view showing a state in which a middle main region Mm of the recording plane Rec shown in FIG. 4C has been divided into a plurality of strip-like regions f1 to f6. The respective strip-like regions f1 to f6 are all slender rectangular regions, and longitudinal directions thereof are all vertical directions. In other words, each of the strip-like regions f1 to f6 is a slender strip-like region, and a longitudinal direction thereof is a direction along the first boundary line C1 or the second boundary line C2. The strip-like region defined in the present invention is thus a slender strip-like region obtained by dividing the middle main region Mm, which is characterized by extending in a direction almost along the first boundary line C1 positioned at a boundary between the first main region M1 and the middle main region Mm or the second boundary line C2 positioned at a boundary between the middle main region Mm and the second main region M2. There is also an important feature with regard to the positioning and widths of the respective strip-like regions, which shall be described later.

In the first main region M1, the second main region M2, and the individual strip-like regions f1 to f6, as shall be described later, any of the interference fringe patterns, diffraction grating patterns, or scattering structure patterns are to be recorded. It is therefore necessary that the respective regions have an adequate area for recording these respective patterns. In addition, the hologram recording plane Rec, on which the respective regions are defined in steps S20 and S30, is merely a conceptual, geometrical recording plane at this step. Of the respective steps shown in FIG. 3, the processes up to that of the "record pattern preparing step" of step S50 are actually processes performed inside a computer, and the process of the main region defining step in step 20 and the process of the strip-like region defining step in step S30 are also actually processes of setting up individual regions on a conceptual recording plane on a computer.

The "attribute assigning step" of step S40 is performed next. In this step, a process of assigning a first record attribute A to the first main region M1, assigning a second record attribute B to the second main region M2, and assigning one of either the first record attribute A or the second record attribute B to the middle main region Mm, for the individual strip-like regions f1 to f6, respectively, is performed. Here, record attributes are parameters that indicate which of the first original image Pic(A) and the second original image Pic(B) prepared in the "original image preparing step" of step S10 is recorded. The first record attribute A indicates being a region in which the first original image Pic(A) should be recorded, and the second record attribute B indicates being a region in which the second original image Pic(B) should be recorded.

Figure 6:
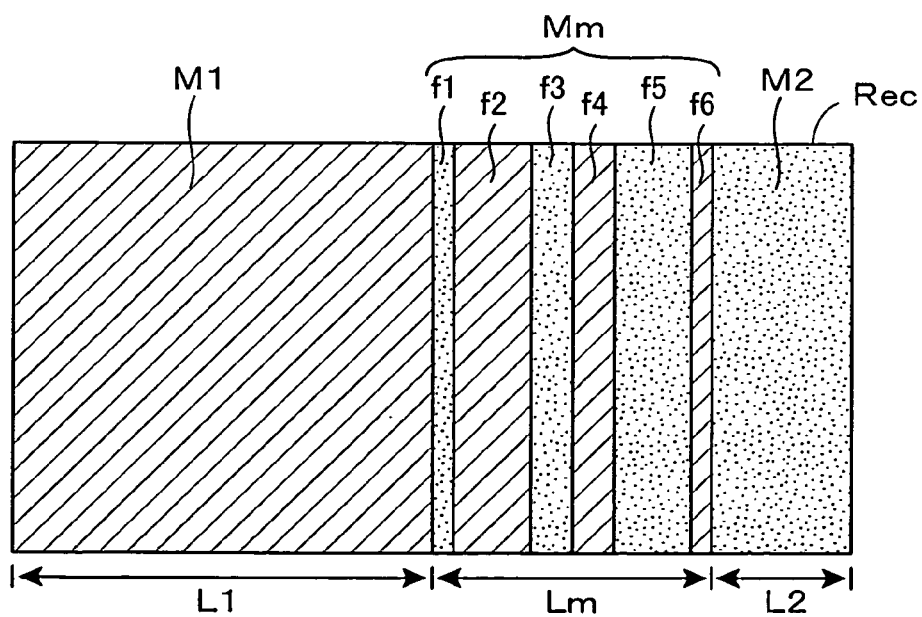
FIG. 6 is a plan view showing a state in which either of two record attributes has been assigned to the respective regions of the recording plane shown in FIG. 5.

FIG. 6 is a plan view showing a state in which either of two record attributes A and B has been assigned to the respective regions of the recording plane Rec shown in FIG. 5. In the figure, the region hatched by diagonal lines is a region to which the first record attribute A was assigned, and the region hatched by dots is a region to which the second attribute B was assigned. It has been described above that the first record attribute A (indicated by hatching by diagonal lines) is assigned to the first main region M1 and the second record attribute B (indicated by hatching by dots) is assigned to the second main region M2. And, for the middle main region Mm, to the individual strip-like regions constituting the same, the first record attribute A and the second record attribute B are alternately assigned. More specifically, it suffices that, when the respective strip-like regions are counted from the strip-like region M1 in contact with the first main region f1 to the strip-like region f6 in contact with the second main region M2 in order, the second record attribute B is assigned to the odd-numbered strip-like regions f1, f3, and f5 and the first attribute A is assigned to the even-numbered strip-like regions f2, f4, and f6.

When the process of assigning attributes to the respective regions is thus completed, the "record pattern preparing step" of step S50, shown in the flowchart of FIG. 3, is executed. In this step, a process, of determining an interference fringe pattern, diffraction grating pattern, or scattering structure pattern, based on the first original image Pic(A), for each region to which the first record attribute A was assigned, of determining an interference fringe pattern, diffraction grating pattern, or scattering structure pattern, based on the second original image Pic(B), for each region to which the second record attribute B was assigned, and finally preparing data indicating a predetermined record pattern to be formed on the recording plane Rec, is executed.

In the "medium forming step" of the last step S60 of FIG. 3, a process, of forming a record pattern on a physical medium based on the record pattern data on the recording plane Rec prepared in step S50, is performed. Although as mentioned above, the procedures up to step S50 are processes that are performed on a computer, the procedure of step S60 is a processing procedure of using the record pattern data, prepared by processing on the computer, to form interference fringe patterns or diffraction grating patterns on an actual, physical medium. Specifically, a process of transmitting the prepared record pattern data to an electron beam printer, etc., and preparing the physical medium is executed. Because specific methods for forming such a physical hologram recording medium are known techniques, detailed description thereof shall be omitted here.

Figure 7:
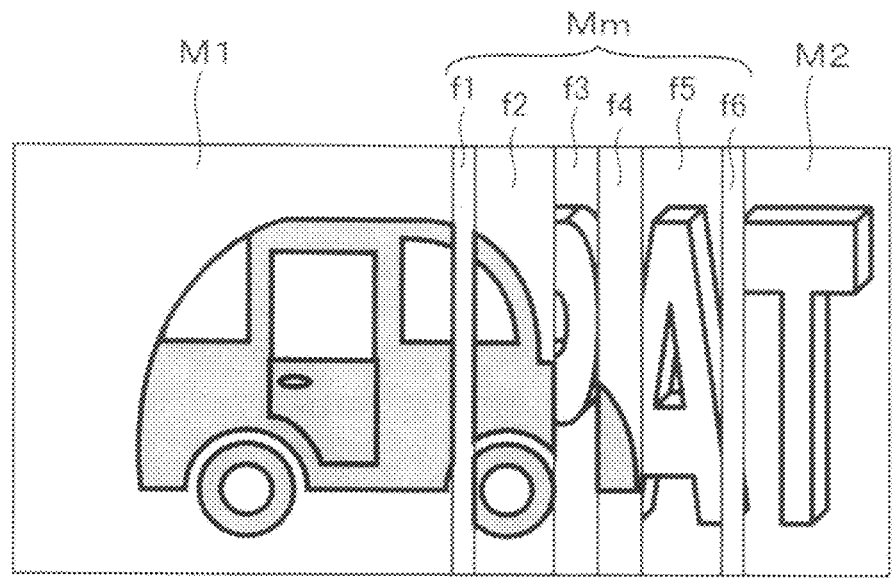
FIG. 7 is a plan view showing, in a hologram recording medium with the original images shown in FIGS. 4A and 4B recorded on the respective regions of the recording plane shown in FIG. 5, an example of the original images reconstructed on the respective regions.

FIG. 7 is a plan view showing, in a hologram recording medium with the original images shown in FIGS. 4A and 4B recorded on the respective regions of the recording plane shown in FIG. 5, examples of the original images reconstructed on the respective regions. As mentioned above, since the first record attribute A has been assigned to the first main region M1 and the even-numbered strip-like regions f2, f4, and f6, the first original image Pic(A) constituted of the automobile motif shown in FIG. 4A is to be recorded, and from these respective regions, the automobile motif is reconstructed. On the other hand, since the second record attribute B has been assigned to the second main region M2 and the odd-numbered strip-like regions f1, f3, and f5, the second original image Pic(B) constituted of the three-dimensional character motif shown in FIG. 4B is to be recorded, and from these respective regions, the three-dimensional character motif of "PAT" is reconstructed.

In the above, a description has been given of the basic procedure of the hologram recording medium preparing method according to the present invention with reference to the flowchart of FIG. 3. Here, the method for defining strip-like regions in the "strip-like region defining step" of step S30 is very important, and the positioning and widths of the defined strip-like regions f1 to f6 have an important feature. This important feature shall be described from Section 2 onward.

Section 2

Arrangement of Respective Strip-Like Regions

Here, features of the strip-like regions f1 to f6 constituting the middle main region Mm shown in FIG. 5 will be considered. As shown in FIG. 5, on the recording plane Rec, the first main region M1, the middle main region Mm, and the second main region M2 are positioned side by side in this order in a transverse direction. The respective strip-like regions f1 to f6 are strip-like regions slender in a longitudinal direction, obtained by dividing the middle main region Mm in the longitudinal direction, which extend in the direction along the first boundary line C1 or the second boundary line C2.

In addition, a left contour line (overlapping with the boundary line C1) of the first strip-like region f1 is in contact with only the first main region M1, and a right contour line is in contact with only the second strip-like region f2. And, in such a manner that a left contour line of the second strip-like region f2 is in contact with only the first strip-like region f1, and likewise, a left contour line of the third strip-like region f3 is in contact with only the second strip-like region f2, ..., the respective strip-like regions are juxtaposed in order. That is, where the total number of strip-like regions is 2n (in the illustrated example, although n=3, it suffices that n is an integer of 2 or more), with regard to "i" within a range of $1 \leq i \leq 2n$, a left contour line of the i-th strip-like region is in contact with only the (i−1)-th strip-like region, and a right contour line is in contact with only the (i+1)-th strip-like region. Also, a left contour line of the 2n-th strip-like region f6 is in contact with only the (2n−1)-th strip-like region f5, and a right contour line is in contact with only the second main region M2. That is, from the side of the first main region M1 to the side of the second main region M2, the individual strip-like regions are positioned so as to be connected one by one in order.

Consequently, in the present invention, the middle main region Mm is divided into a total of 2n strip-like regions constituted of the first strip-like region in contact with the first main region M1, the (i+1)-th strip-like region in contact with the i-th strip-like region (i=1~2n−2, n is an integer equal to or more than 2), and the 2n-th strip-like region in contact with the (2n−1)-th strip-like region and the second main region M2. FIG. 5 shows an example of setting to n=3.

Figure 8:
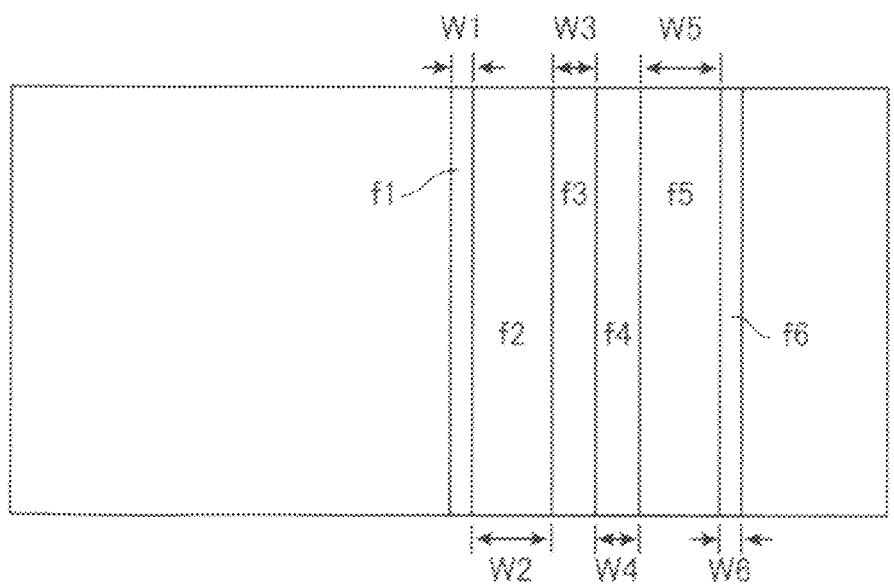
FIG. 8 is a plan view showing a first condition (condition (A)) regarding the widths of the strip-like regions f1 to f6 composing the middle main region Mm.

Here, attention shall be focused on the widths of the respective strip-like regions f1 to f6. FIG. 8 is a plan view showing a feature regarding the widths of the strip-like regions f1 to f6 shown in FIG. 5. The widths W1 to W6 shown in FIG. 8 indicate the widths of the strip-like regions f1 to f6, respectively. First, in terms of the widths W1, W3, and W5 of the odd-numbered strip-like regions f1, f3, and f5, it can be understood that the widths gradually increase toward the right. On the other hand, in terms of the widths W2, W4, and W6 of the even-numbered strip-like regions f2, f4, and f6, it can be understood that the widths gradually decrease toward the right. When a condition regarding the widths of the strip-like regions in the present invention is thus defined as a generalization, the following condition (A) can be defined.

Condition (A): The widths of the odd-numbered strip-like regions gradually increase from the first main region M1 to the second main region M2, and the widths of the even-numbered strip-like regions gradually decrease from the main region M1 to the second main region M2.

When the respective strip-like regions are defined so as to satisfy the above condition (A) in the "strip-like region defining step" of step S30, a reconstructing effect to smoothly blend two original images can be obtained due to the middle main region Mm of a hologram recording medium finally obtained.

FIG. 7 shows, in a hologram recording medium with the original images shown in FIGS. 4A and 4B recorded on the respective regions of the recording plane shown in FIG. 5, an example of the original images reconstructed on the respective regions. Since it is impossible to express a hologram recording medium on the drawing of the present application document, this FIG. 7 does not show a mode of observation of an actual hologram recording medium. Thus, as far as viewing FIG. 7, two adjacent images, that is, a motif of an automobile and a motif of three-dimensional characters of "PAT" are not observed in a state smoothly blended at the boundary portion (middle main region Mm). However, in an actual hologram recording medium, both motifs are observed in a manner smoothly blended at a boundary portion therebetween. That is, a natural expression such that a first motif (automobile) changes gradually to a second motif (three-dimensional characters) from the left to the right is enabled.

What is unique in the present invention is to focus attention on the fact that although a sufficient blending effect cannot be obtained even when a normal image (an image not in a hologram form such as interference fringe patterns, diffraction grating patterns, or scattering structure patterns) is recorded on a physical medium in the mode shown in FIG. 7, a very noticeable visual blending effect can be obtained when a hologram image (an image recorded in the form of interference fringe patterns, diffraction grating patterns, or scattering structure patterns) is recorded on a physical medium in the mode shown in FIG. 7. The effect that both motifs are smoothly blended in the middle main region Mm is more noticeably expressed when the widths of the respective strip-like regions are set narrower, however, even when the widths of the respective strip-like region are wide to some extent, since a hologram image is recorded in the present invention, a sufficient blending effect can be obtained as compared with when a normal image is recorded. The inventor of the present application has conducted experimentation to record two motifs as a hologram image according to interference fringe patterns, respectively, using a sample medium with a size of a recording region of 28 mm×28 mm, and a sufficient blending effect in the middle main region could be recognized up to the maximum width of the strip-like region of approximately 3 mm.

When a hologram image is recorded in the mode shown in FIG. 7, as the image of the observer, as shown in FIG. 2, it seems as though the automobile motif gradually changes to the three-dimensional character motif of "PAT. In other word, as far as the perception of the observer is considered, an image as shown in FIG. 2 is observed in the case of a hologram image, though an image as shown in FIG. 7 is observed in the case of a normal image. The reason for this has not been analyzed in detail at the present stage. However, in the case of a hologram image, interference, diffraction, and scattering phenomenon of light occur on the surface of the recording medium, and the inventor of the present invention assumes that these optical phenomena cause a unique effect in the mode of observation of the observer to produce a visual effect to smoothly blend both motifs at the boundary portion. For example, when a motif of an automobile has been recorded in the strip-like regions f2, f4, and f6 of FIG. 7 as a three-dimensional hologram image, even a part of the automobile that looks as though it has been hidden by the strip-like regions f1, f3, and f5 can be visually recognized, in an actual observation environment by both eyes, by moving the viewpoint in a right and left direction. In the present invention, occurrence of such a phenomenon is considered to produce a visual effect to smoothly blend both motifs.

According to experimentation conducted by the inventor of the present application, it was found that the condition (A) described above is not the only condition regarding the widths of the strip-like regions to produce such a blending effect. Specifically, a visual effect to smoothly blend both motifs could also be obtained when the width was set so as to satisfy the following condition (B) or (C).

Condition (B): The widths of the odd-numbered strip-like regions gradually increase from the first main region M1 to the second main region M2, and the widths of the even-numbered strip-like regions are maintained almost constant.

Condition (C): The widths of the even-numbered strip-like regions gradually decrease from the first main region M1 to the second main region M2, and the widths of the odd-numbered strip-like regions are maintained almost constant.

Figure 9:
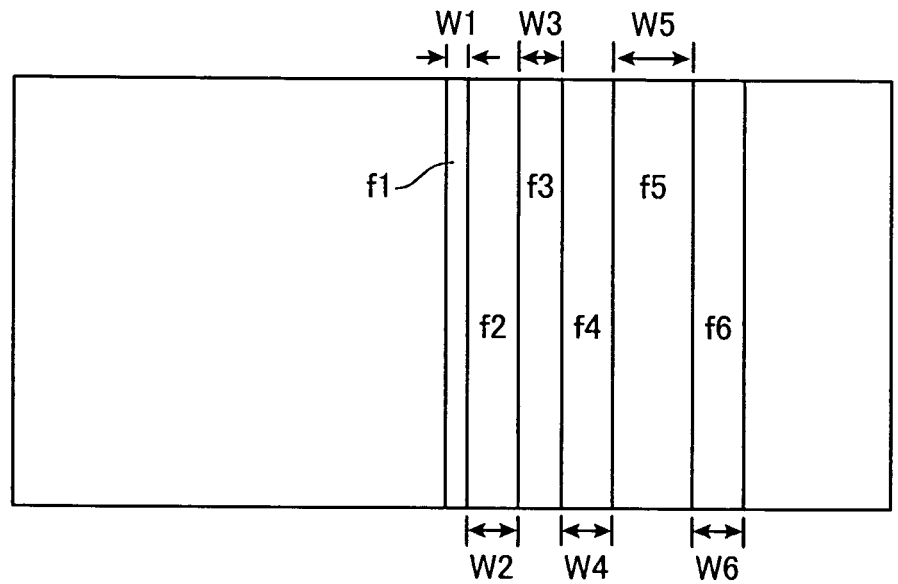
FIG. 9 is a plan view showing a second condition (condition (B)) regarding the widths of the strip-like regions f1 to f6 composing the middle main region Mm.
Figure 10:
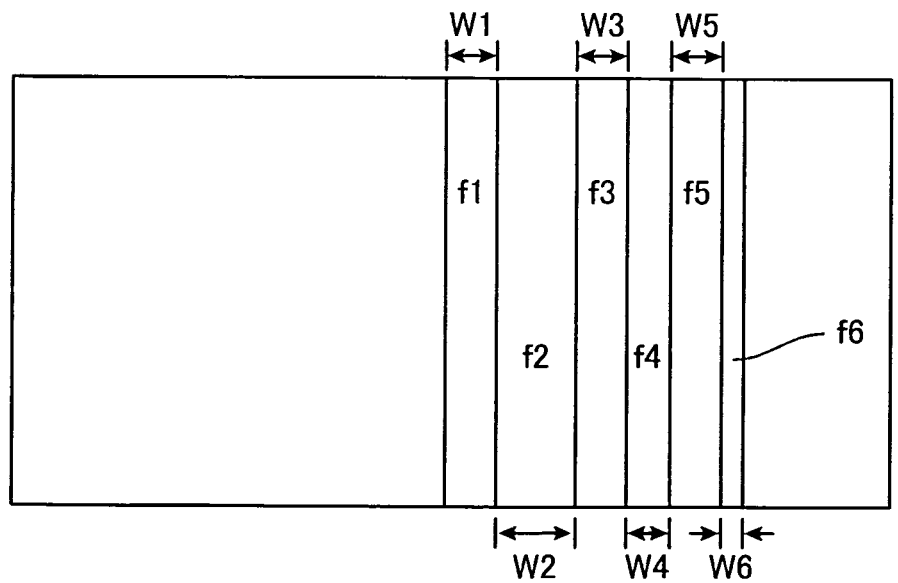
FIG. 10 is a plan view showing a third condition (condition (C)) regarding the widths of the strip-like regions f1 to f6 composing the middle main region Mm.

FIG. 9 is a plan view showing an example applied with the condition (B) regarding the widths of the strip-like regions f1 to f6 composing the middle main region Mm, and FIG. 10 is a plan view showing an example applied with the condition (C). In the example of FIG. 9, the widths W2, W4, and W6 of the even-numbered strip-like regions f2, f4, and f6 are set equal, and thus all of the strip-like regions in which an automobile motif is recorded have the same width, however, since it has been set so that the widths W1, W3, and W5 of the odd-numbered strip-like regions f1, f3, and f5 gradually increase, the width of the strip-like regions in which a three-dimensional character motif is recorded gradually increases, and a visual effect of smoothly blending is consequently produced.

On the other hand, in the example of FIG. 10, since the widths W1, W3, and W5 of the odd-numbered strip-like regions f1, f3, and f5 are set equal, and thus all of the strip-like regions in which a three-dimensional character motif is recorded have an equal width, however, since it has been set so that the widths W2, W4, and W6 of the even-numbered strip-like regions f2, f4, and f6 gradually decrease, the width of the strip-like regions in which an automobile motif is recorded gradually decreases, and a visual effect of smoothly blending is consequently produced.

Thus, in the "strip-like region defining step" of step S30 of the flowchart of FIG. 3, it suffices that the widths of the individual strip-like regions are set so as to satisfy any of the above-described conditions (A), (B), and (C).

In the example described so far, as shown in FIG. 5, the first main region M1, the middle main region Mm, and the second main region M2 are defined by three rectangular regions positioned adjacently in the transverse direction, respectively, in the "main region defining step" of step S20, and the rectangle constituting the middle main region Mm is divided into 2n (in the illustrated example, n=3) in the transverse direction to define longer-than-wide strip-like regions in the "strip-like region defining step" of step S30. When the respective main regions M1, M2, and Mm are thus defined so that the first boundary line C1 and the second boundary line C2 become straight lines parallel to each other in the "main region defining step" of step S20, it suffices that strip-like regions each having, as lateral contour lines, two sides parallel to the first boundary line C1 and the second boundary line C2 are defined in the "strip-like region defining step" of step S30.

However, in putting the present invention into practice, it is not always necessary that the boundary lines C1 and C2 of the respective main regions M1, M2, and Mm and the contour lines of the respective strip-like regions are straight lines. It suffices that the first main region M1 and the second main region M2 are regions positioned spatially separated from each other and the middle main region Mm is a region positioned therebetween and in contact with both of these, and it suffices that the respective strip-like regions are regions obtained by dividing this middle main region, and it suffices that these regions are slender regions extending almost along boundary line C1 or C2.

Figure 11:
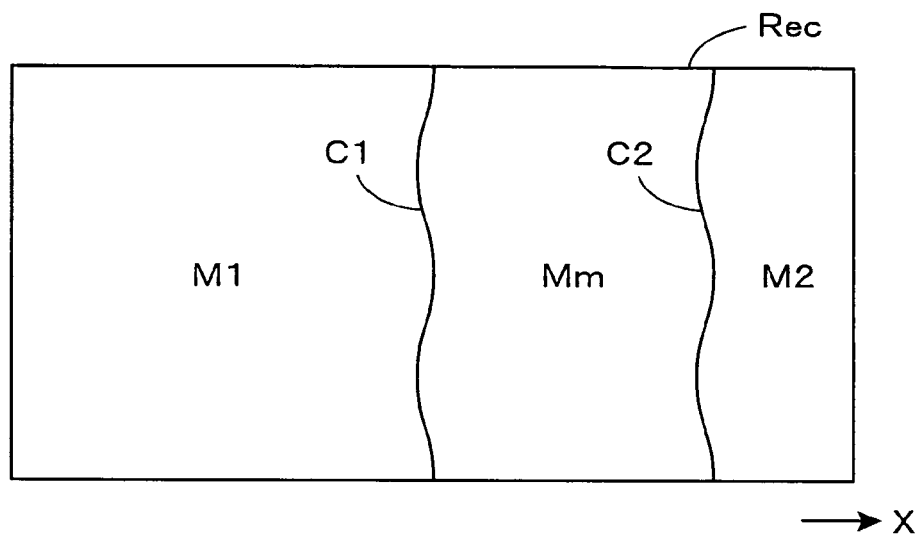
FIG. 11 is a plan view showing an example where curved lines are used as boundary lines of three main regions defined on a recording plane.

FIG. 11 is a plan view showing an example where curved lines are used as boundary lines C1 and C2 of three main regions M1, Mm, and M2 defined on a recording plane Rec.

Here, the first boundary line C1 and the second boundary line C2 are constituted of lines in the same shape so as to overlap with each other by a parallel displacement. When the three main regions M1, Mm, and M2 are defined by such boundary lines C1 and C2 as shown in FIG. 11 in the "main region defining step" of step S20, it suffices that strip-like regions each having, as lateral contour lines, two sides constituted of lines in the same shape that overlap by a parallel displacement with the first boundary line C1 and the second boundary line C2 are defined in the "strip-like region defining step" of step S30. In the illustrated example, a coordinate axis X is defined in the transverse direction of the recording plane Rec, the first boundary line C1 constituted of an arbitrary curved line is defined, and then the first boundary line C1 is moved in parallel rightward by a predetermined distance along the coordinate axis X, whereby the second boundary line C2 is defined.

Figure 12:
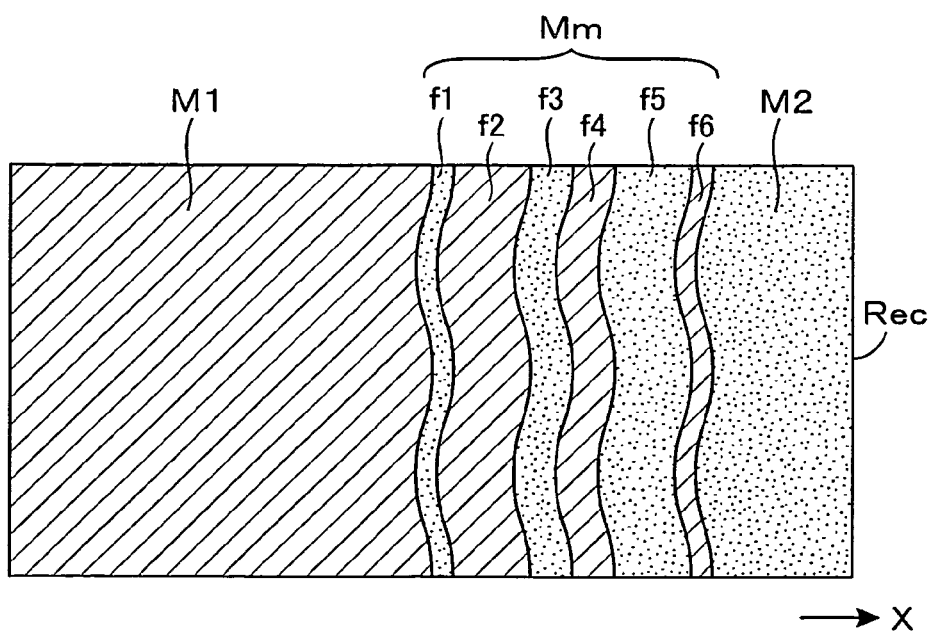
FIG. 12 is a plan view showing a state in which a middle main region Mm of the recording plane shown in FIG. 11 has been divided into a plurality of strip-like regions f1 to f6 and either of two record attributes has been assigned to the respective regions.

FIG. 12 is a plan view showing a state in which a middle main region Mm of the recording plane Rec shown in FIG. 11 has been divided into a plurality of strip-like regions f1 to f6 and either of two record attributes has been assigned to the respective regions. The region hatched by diagonal lines shows a region assigned with the first record attribute A, and the region hatched by dots shows a region assigned with the second record attribute B. The lateral contour lines of the respective strip-like regions f1 to f6 are all lines obtained by moving in parallel the first boundary line C1 (or may be the second boundary line C2) shown in FIG. 11 by a predetermined distance in the X-axis direction and are lines in the same shape as the first boundary line C1 and the second boundary line C2.

Here, the widths of the respective strip-like regions f1 to f6 have been set so as to satisfy the condition (A) mentioned above. Specifically, there is a setting such that the condition (A) mentioned above is satisfied where the distances with regard to the X-axis direction between the lateral contour lines of the respective strip-like regions f1 to f6 are provided as the widths of the strip-like regions. The respective strip-like regions f1 to f6 thus defined are regions having contour lines constituted of curved lines, but are slender regions extending almost along the boundary line C1 or C2, and moreover, the condition (A) has been satisfied with respect to the widths. Thus, selectively recording the original images based on the assigned respective record attributes allows to produce such a visual effect, as in the embodiment shown in FIG. 7, to smoothly blend both motifs at the boundary portion. As the condition regarding the widths, the condition (B) or the condition (C) mentioned above may also be used.

Next, a specific method for defining such a plurality of strip-like regions f1 to f6 as shown in FIG. 5 by dividing the middle main region Mm shown in FIG. 4C or defining a plurality of strip-like regions f1 to f6 shown in FIG. 12 by dividing the middle main region Mm shown in FIG. 11 shall be exemplified.

In this method, a sequence having a specific feature is first defined, and the widths of the respective strip-like regions are defined using individual numerical values composing the sequence. FIG. 13 is a view showing a sequence A used for setting dimensions of the strip-like regions according to the condition (A) shown in FIG. 8 and expressions for calculating the widths W1 to W6 of the respective strip-like regions. The sequence A is a sequence composed of 2n numerals $G_i$ ($i=1 \sim 2n$, n is an integer equal to or more than 2) of which odd-numbered numerals increase monotonically and even-numbered numerals decrease monotonically, and in the illustrated example, exemplified is a sequence composed of six numerals of "3, 11, 6, 6, 11, 3" (corresponding to the example with n=3).

The odd-numbered numerals of this sequence A increase monotonically as "3, 6, 11," while the even-numbered numerals thereof decrease monotonically as "11, 6, 3." In the case of the illustrated example, the odd-numbered numerals and the even-numbered numerals are both composed of three numerals of "3, 6, 11," however, it is not always necessary that the composition of the odd-numbered numerals and the composition of the even-numbered numerals are the same. In addition, it is not always necessary that the increment or decrement is uniform, and a part with an increment or decrement of 0 may be partially included.

After such a sequence is defined, it suffices that the respective strip-like regions are defined so that, where a sum total of numerals composing this sequence is SUM, the width Wi of the i-th strip-like region becomes Wi=Lm×Gi/SUM. Here, Lm is a dimensional value to be a sum total of the widths of all strip-like regions, and corresponds to the width of the middle main region Mm. For example, the width W1 of the first strip-like region f1 can be determined, as described in FIG. 13, by W1=Lm×G1/SUM. In the case of the illustrated sequence A, since G1=3 and SUM=40, it can be determined by W1=Lm×3/40. The same applies to the widths W2 to W6. The respective widths W1 to W6 (widths satisfying the condition (A)) shown in FIG. 8 can be determined by such a computation.

On the other hand, the sequence B shown in FIG. 14 is a sequence for determining the respective widths W1 to W6 (widths satisfying the condition (B)) shown in FIG. 9, and is a sequence composed of 2n numerals Gi (i=1~2n, n is an integer equal to or more than 2: in the illustrated example, n=3) of which odd-numbered numerals increase monotonically as "3, 6, 11" and even-numbered numerals take the same value "7." Likewise, the sequence C shown in FIG. 14 is a sequence for determining the respective widths W1 to W6 (widths satisfying the condition (C)) shown in FIG. 10, and is a sequence composed of 2n numerals Gi (i=1~2n, n is an integer equal to or more than 2: in the illustrated example, n=3) of which even-numbered numerals decrease monotonically as "11, 6, 3" and odd-numbered numerals take the same value "7."

When the widths of the respective strip-like regions are thus defined by use of a sequence, it consequently suffices that any of the following sequences A, B, and C is defined in the "strip-like region defining step" of step S30:
<Sequence A>: Sequence composed of 2n numerals Gi (i=1~2n, n is an integer equal to or more than 2) of which odd-numbered numerals increase monotonically and even-numbered numerals decrease monotonically;
<Sequence B>: Sequence composed of 2n numerals Gi (i=1~2n, n is an integer equal to or more than 2) of which odd-numbered numerals increase monotonically and even-numbered numerals take the same value; and
<Sequence C>: Sequence composed of 2n numerals Gi (i=1~2n, n is an integer equal to or more than 2) of which even-numbered numerals decrease monotonically and odd-numbered numerals take the same value, and the respective strip-like regions are defined so that, where a total width of the middle main region is Lm and a sum total of numerals composing the defined sequence is SUM, the width Wi of the i-th strip-like region becomes Wi=Lm×Gi/SUM. For example, if the width of one pixel was set to 10 μm, n=5, Lm=129 pixels×10 μm=1.29 mm, and the width Wi of each strip-like region was expressed by the number of pixels× 10 u m, as a result of such dimensional setting as:

W1=5×10 μm=0.05 mm, W2=14×10 μm=0.14 mm,
W3=12×10 μm=0.12 mm, W4=10×10 μm=0.1 mm,
W5=17×10 μm=0.17 mm, W6=7×10 μm=0.07 mm,
W7=24×10 μm=0.24 mm, W8=7×10 μm=0.07 mm,
W9=27×10 μm=0.27 mm, W10=6×10 μm=0.06 mm,
satisfactory results of the present invention were obtained.

Section 3

Definition of Strip-Like Region Width by Angle

Although the embodiment described in Section 2 is an example where the width W of each individual strip-like region was given as a predetermined dimensional value, in the present invention, it is not always necessary to give the width of the strip-like region as a dimensional value, and it is also possible to give the same as an angle. In addition, the shape of the strip-like region is not limited to a rectangle. In the following, an embodiment where the width of the strip-like region is given as an angle shall be exemplified.

Figure 15:
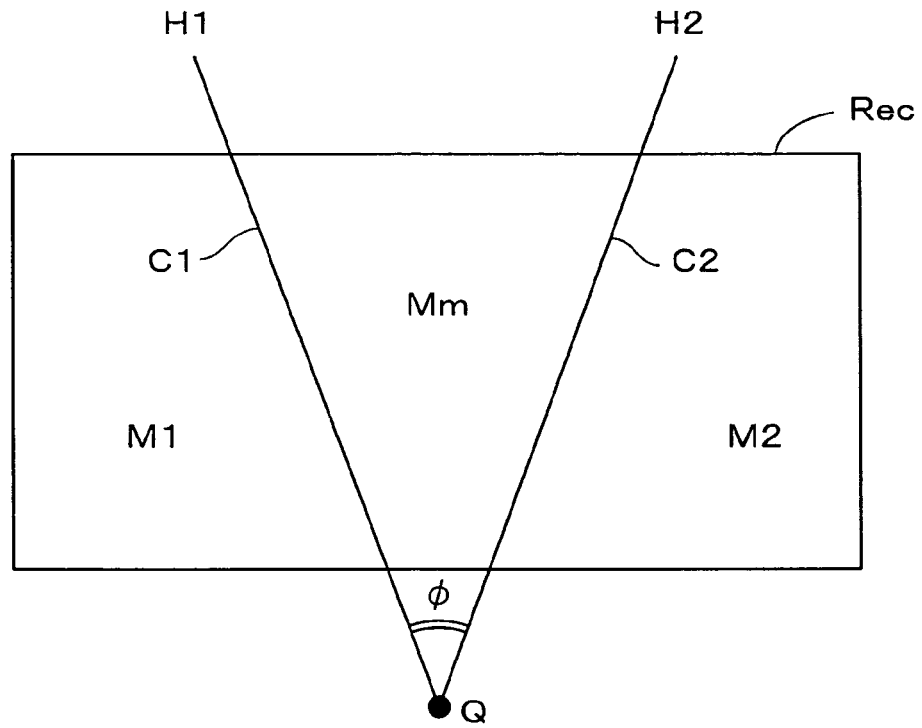
FIG. 15 is a plan view of another embodiment where three main regions are defined on a recording plane.

FIG. 15 is a plan view of an embodiment where a first main region M1, a second main region M2, and a middle main region Mm are defined on a recording plane Rec. In this embodiment, first, in the "main region defining step" of step S20, a first boundary half line H1 and a second boundary half line H2 having a predetermined reference point Q as an end point are defined to define the respective main regions so that a partial section of the first boundary half line H1 becomes a first boundary line C1 and a partial section of the second boundary half line H2 becomes a second boundary line C2. In the illustrated example, the first boundary half line H1 and the second boundary half line H2 create an angle $\phi$ at the reference point Q, and thus, extensions of the first boundary line C1 and the second boundary line C2 are straight lines that intersect at an angle $\phi$.

Figure 16:
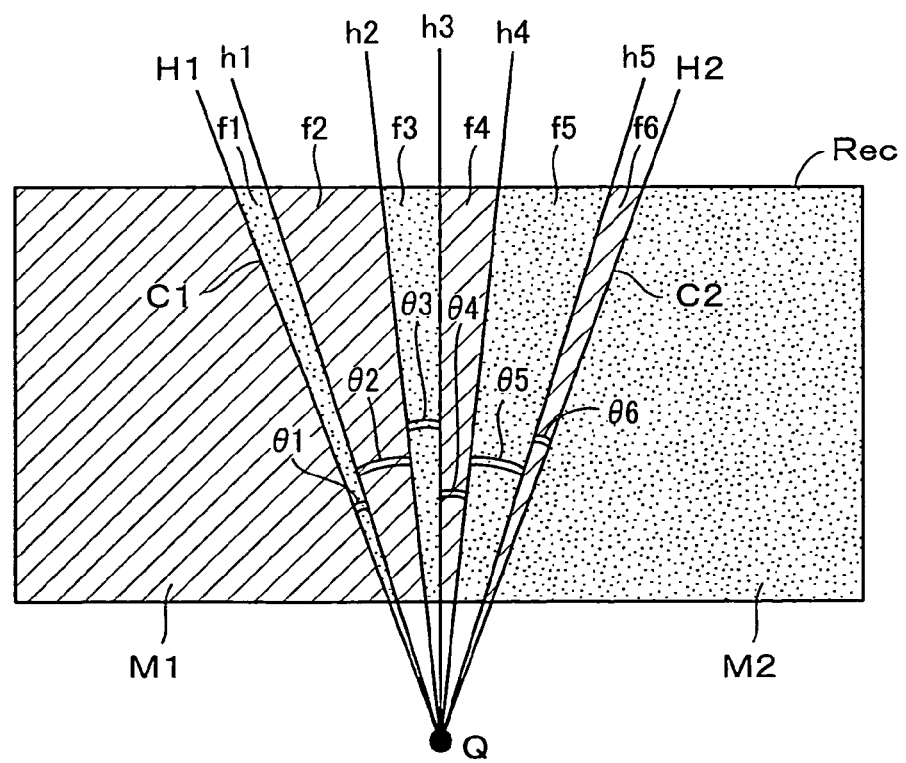
FIG. 16 is a plan view showing a state in which a middle main region Mm of the recording plane shown in FIG. 15 has been divided into a plurality of strip-like regions f1 to f6 and either of two record attributes has been assigned to the respective regions.

In this case, it suffices that (2n−1) dividing half lines positioned between the first boundary half line H1 and the second boundary half line H2 and having the reference point Q as an end point are defined and the middle main region Mm is divided by the individual dividing half lines so as to define 2n strip-like regions in the "strip-like region defining step" of step S30. FIG. 16 is a plan view showing a state in which a middle main region Mm of the recording plane Rec shown in FIG. 15 has been divided into six (corresponding to n=3) strip-like regions f1 to f6 and either of two record attributes has been assigned to the respective regions. Likewise, the region hatched by diagonal lines shows a region assigned with the first record attribute A, and the region hatched by dots shows a region assigned with the second record attribute B.

The five half lines h1 to h5 shown in FIG. 16 are dividing half lines for dividing the middle main region Mm into six parts, and all half lines have the reference point Q as an end point. By defining these dividing half lines h1 to h5 between the first boundary half line H1 and the second boundary half line H2, the middle main region Mm is divided into six strip-like regions f1 to f6. The shapes of the strip-like regions f1 to f6 defined by such a method are not rectangles, but slender shapes extending almost along the first boundary line C1 or the second boundary line C2, and the widths thereof can be defined as intersection angles $\theta_1$ to $\theta_6$ of the half lines constituting lateral contour lines of the respective strip-like regions f1 to f6. For example, the width of the strip-like region f1 can be defined as the intersection angle $\theta_1$ between the first boundary half line H1 and the dividing half line h1, and the width of the strip-like region f2 can be defined as the intersection angle $\theta_2$ between the dividing half line h1 and the dividing half line h2.

According to the experimentation conducted by the inventor of the present application, also in the embodiment where the widths of the strip-like regions are thus defined as angles, by performing a setting so as to satisfy any of the conditions (A), (B), and (C) mentioned above, a visual effect to smoothly blend both motifs could be obtained. For example, FIG. 16 shows an example of six strip-like regions f1 to f6 being defined by setting the widths (angles) so as to satisfy the condition (A). In the case of this example, the widths of the odd-numbered strip-like regions f1, f3, and f5, that is, angles θ1, θ3, and θ5 gradually increase from the first main region M1 to the second main region M2, while the widths of the even-numbered strip-like regions f2, f4, and f6, that is, angles θ2, θ4, and θ6 gradually decrease from the first main region M1 to the second main region M2.

In employing such an embodiment of defining the widths of strip-like regions as angles, it is not always necessary that the first boundary line C1, the second boundary line C2, and the lateral contour lines of the respective strip-like regions are straight lines, and it is also possible to prepare these in arbitrary shapes consisting of curved lines. A specific embodiment thereof shall now be described.

Figure 17:
FIG. 17 is a plan view showing an example of a specific shape line U whose shape and position are determined with reference to a half line H.

In this embodiment, a specific shape line whose shape and position are determined with reference to a predetermined half line is first defined in the "main region defining step" of step S20. FIG. 17 is a plan view showing an example of a specific shape line U whose shape and position are determined with reference to a half line H. Such a specific shape line U may be defined, for example, by a formula expressing e.g. a sine curve, or may be defined as a collection of points having a specific coordinate value with reference to the half line H.

Subsequently, as shown in FIG. 15, with the predetermined reference point Q as an end point, the first boundary half line H1 and the second boundary half line H2 passing through the recording plane Rec are defined to define the respective main regions so that a partial section of the specific shape line U with reference to the first boundary half line H1 becomes a first boundary line C1 and a partial section of the specific shape line U with reference to the second boundary half line H2 becomes a second boundary line C2. In other words, the half line H shown in FIG. 17 is overlapped onto the half line H1 shown in FIG. 15 so that the reference points Q are coincident, and the specific shape line U located on the recording plane Rec at that time is defined as a first boundary line C1, and likewise, the half line H shown in FIG. 17 is overlapped onto the half line H2 shown in FIG. 15 so that the reference points Q are coincident, and the specific shape line U located on the recording plane Rec at that time is defined as a second boundary line C2.

Figure 18:
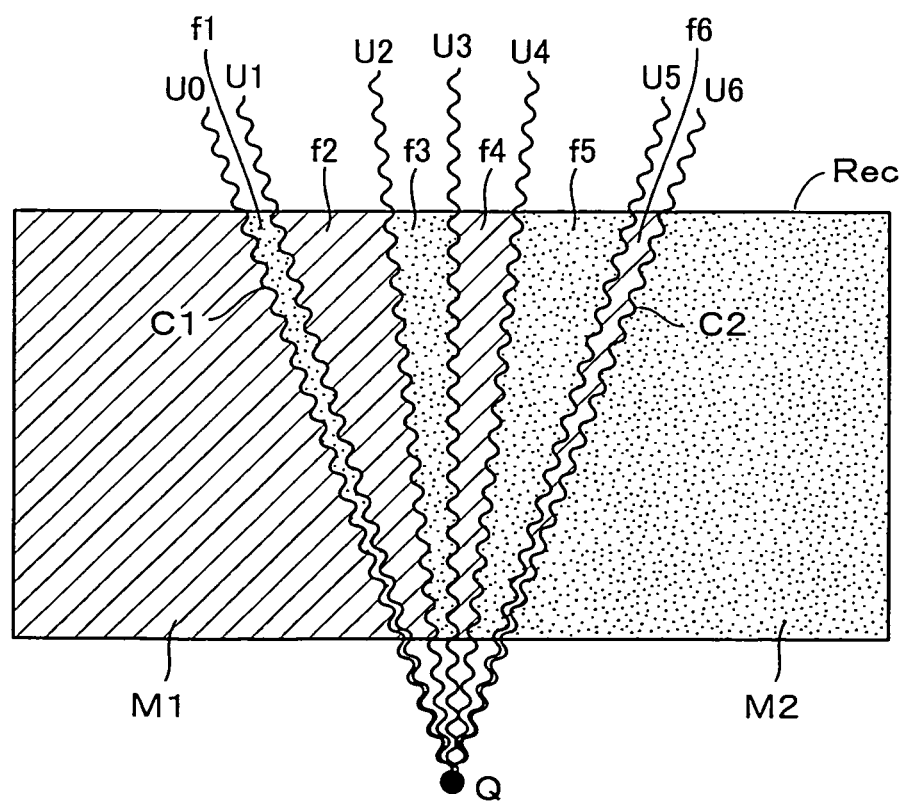
FIG. 18 is a plan view showing an example where the specific shape line U shown in FIG. 17 is used as boundary lines of the respective regions of the recording plane shown in FIG. 16.

On the other hand, in the "strip-like region defining step" of step S30, (2n−1) dividing half lines positioned between the first boundary half line H1 and the second boundary half line H2 and having the reference point Q as an end point are defined (the same as the dividing half lines h1 to h5 shown in FIG. 16) and the middle main region Mm is divided by specific shape lines U with reference to the individual dividing half lines so as to define strip-like regions. FIG. 18 is a plan view showing an example where the specific shape line U shown in FIG. 17 is used as boundary lines of the respective regions of the recording plane Rec shown in FIG. 16. That is, the half line H shown in FIG. 17 is overlapped onto the dividing half lines h1 to h5 shown in FIG. 16 so that the reference points Q are coincident, and the specific shape lines U located on the recording plane Rec at that time are defined as contour lines of the respective strip-like regions f1 to f6.

At this time as well, for each of the strip-like regions f1 to f6, a setting is performed such that, where the intersection angle of a pair of half lines being the basis for a pair of specific shape lines U including contour lines at both sides is provided as the width of the strip-like region, any of the conditions (A), (B), and (C) mentioned above is satisfied. For example, since a pair of half lines being the basis for a pair of specific shape lines U including contour lines at both sides of the region f1 shown in FIG. 18 are the half lines H1 and h1 shown in FIG. 16, the intersection angle θ1 of these both half lines is a parameter indicating the width of the region f1. Likewise, the widths of the strip-like regions f2 to f6 shown in FIG. 18 are shown by the intersection angles θ2 to θ6 shown in FIG. 16. Thus, by performing a setting so that the widths of the odd-numbered strip-like regions f1, f3, and f5, that is, the angles θ1, θ3, and θ5 gradually increase from the first main region M1 to the second main region M2 and the widths of the even-numbered strip-like regions f2, f4, and f6, that is, the angles θ2, θ4, and θ6 gradually decrease from the first main region M1 to the second main region M2, the condition (A) mentioned above is satisfied. FIG. 18 is an example of such a setting, and in the case of such a setting of strip-like regions as well, a visual effect to smoothly blend both motifs can be obtained.

In defining the widths of the strip-like regions by angles as well, the widths of the respective strip-like regions can be defined by use of a sequence. That is, it suffices that any of the following sequences A, B, and C is defined in the "strip-like region defining step" of step S30:

<Sequence A>: Sequence composed of 2n numerals $G_i$ ($i=1\sim 2n$, n is an integer equal to or more than 2) of which odd-numbered numerals increase monotonically and even-numbered numerals decrease monotonically;

<Sequence B>: Sequence composed of 2n numerals $G_i$ ($i=1\sim 2n$, n is an integer equal to or more than 2) of which odd-numbered numerals increase monotonically and even-numbered numerals take the same value; and <Sequence C>: Sequence composed of 2n numerals $G_i$ ($i=1\sim 2n$, n is an integer equal to or more than 2) of which even-numbered numerals decrease monotonically and odd-numbered numerals take the same value, and the strip-like regions are defined so that, where an intersection angle between the first boundary half line and the second boundary half line is φ and a sum total of numerals composing the defined sequence is SUM, the width θi of the i-th strip-like region becomes $\theta_i = \phi \times G_i / SUM$.

Section 4

Definition of Strip-Like Regions by Inclusive Similar Figures

In the embodiment having been described so far, the first main region M1 was positioned at the left of the recording plane Rec, the second main region M2 was positioned at the right of the recording plane Rec, and the middle main region was positioned in between. In this Section 4 and the following Section 5, an embodiment shall be mentioned in which the middle main region Mm is defined so as to surround the first main region M1 and the second main region M2 is defined so as to surround the middle main region Mm in the "main region defining step" of step S20. That is, figures in a mutual inclusion relation are used to define the three main regions M1, Mm, and M2.

In this case, in the "strip-like region defining step" of step S30, it suffices that the first annular strip-like region is defined so as to surround the first main region M1, the (i+1)-th annular strip-like region is defined so as to surround the i-th annular strip-like region (i=1~2n−1, n is an integer equal to or more than 2), and the second main region M2 surrounds the 2n-th annular strip-like region. That is, figures with a nested structure in a mutual inclusion relation are used to define individual annular strip-like regions.

In Section 4, of such examples using figures with a nested structure in an inclusion relation, an embodiment in which similar figures are used for all figures shall be described. First, as the simplest example, an example using circles with a nested structure shall be described.

Figure 19:
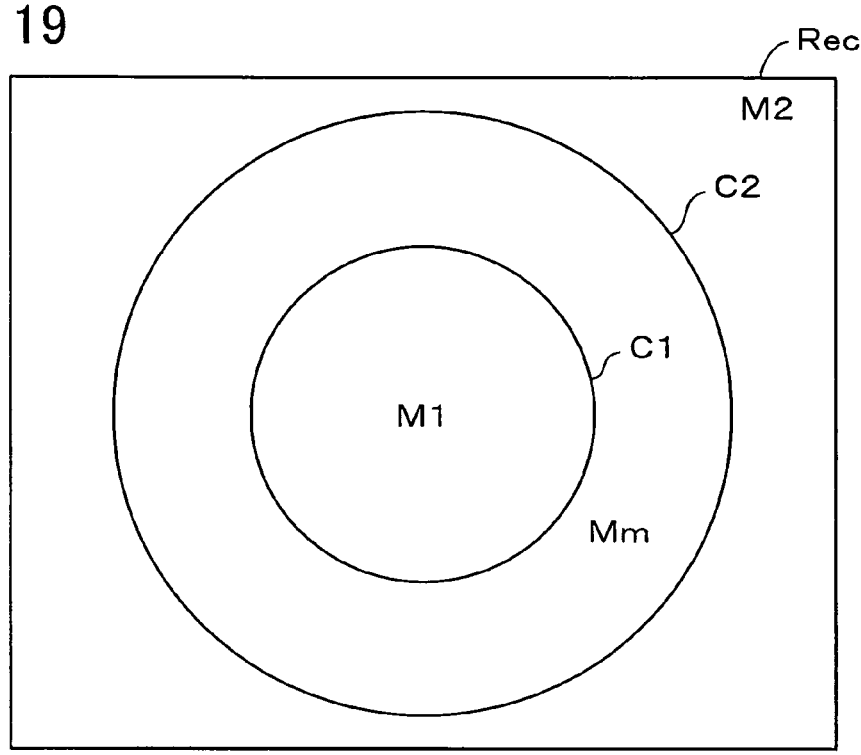
FIG. 19 is a plan view of an embodiment where three main regions are defined by arranging two concentric circles on a recording plane.

FIG. 19 is a plan view of an embodiment where three main regions are defined by arranging two concentric circles on a recording plane Rec. That is, an interior region of the inner circle (first boundary line C1) is the first main region M1, an exterior region of the outer circle (second boundary line C2) is the second main region M2, and a washer-like region between both circles is the middle main region Mm. Thus, in the case of this embodiment, the "main region defining step" of step S20 is executed by an operation to position two concentric circles different in size on a recording plane Rec.

Figure 20:
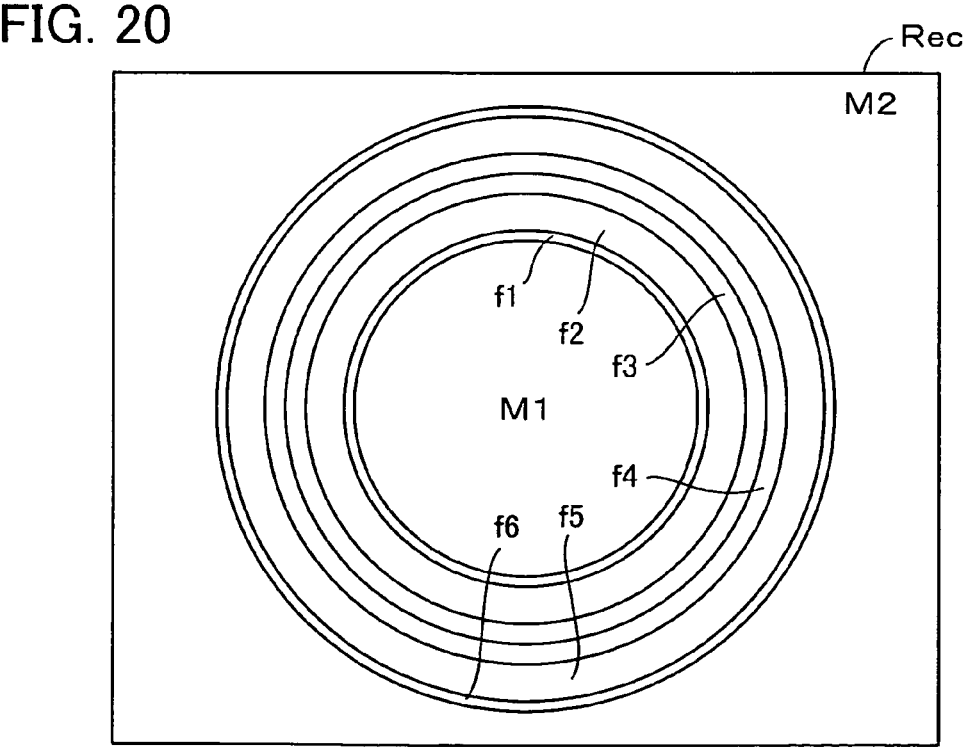
FIG. 20 is a plan view showing a state in which a middle main region Mm of the recording plane shown in FIG. 19 has been divided into a plurality of annular strip-like regions f1 to f6.
Figure 21:
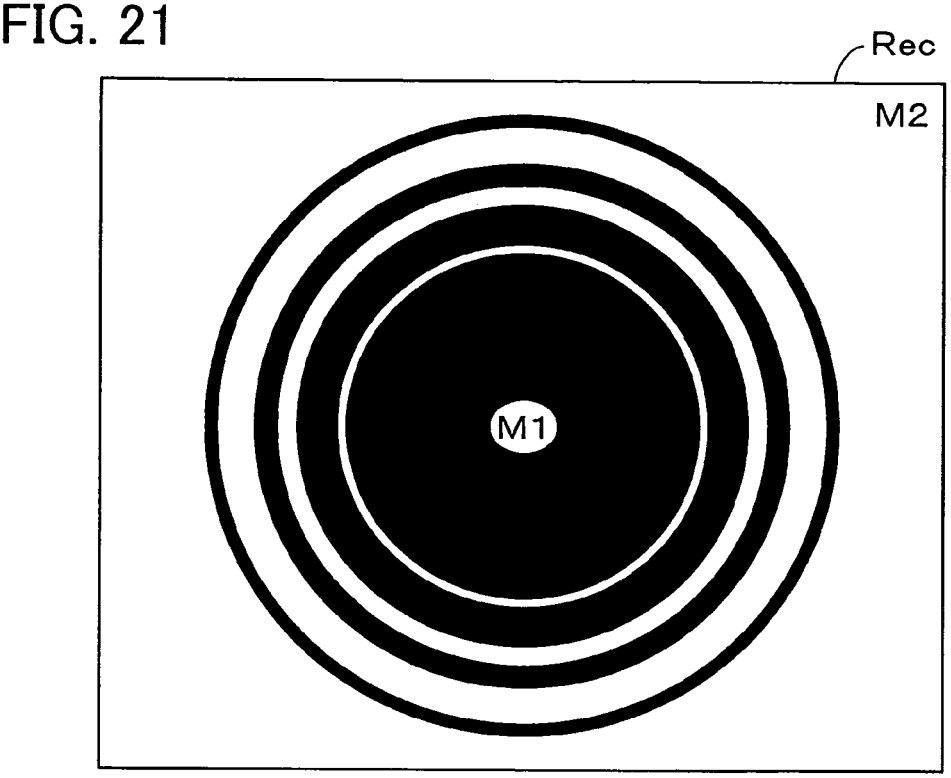
FIG. 21 is a plan view showing a state in which either of two record attributes has been assigned to the respective regions of the recording plane shown in FIG. 20.

On the other hand, in the "strip-like region defining step" of step S30, an operation to divide the middle main region Mm shown in FIG. 19 into a plurality of annular strip-like regions is performed, and this operation is also executed by an operation to position a plurality of concentric circles different in size on a recording plane Rec. FIG. 20 is a plan view showing a state in which the middle main region Mm has been divided into six annular strip-like regions f1 to f6. The respective strip-like regions f1 to f6 are all washer-like circular annular regions, whose inner and outer contour lines are circles, and these respective circles are concentric circles. FIG. 21 is a plan view showing a state in which either of two record attributes has been assigned to the respective regions of the recording plane Rec shown in FIG. 20. The black region is a region assigned with the first record attribute A, and the white region is a region assigned with the second record attribute B.

FIG. 21 clearly shows the shapes of the six strip-like regions f1 to f6 (filled in black or white). The respective strip-like regions f1 to f6 constitute slender regions extending along the first boundary line C1 or the second boundary line C2 shown in FIG. 19. Moreover, when attention is focused on the widths of the respective regions f1 to f6 (a difference in radial width between adjacent concentric circles), this satisfies the condition (A) mentioned above. Specifically, where the widths of the respective strip-like regions f1 to f6 are W1 to W6, W1:W2:W3:W4:W5:W6=3:11:6:6:11:3, which correspond to the widths set based on the sequence A shown in FIG. 13.

Figure 22:
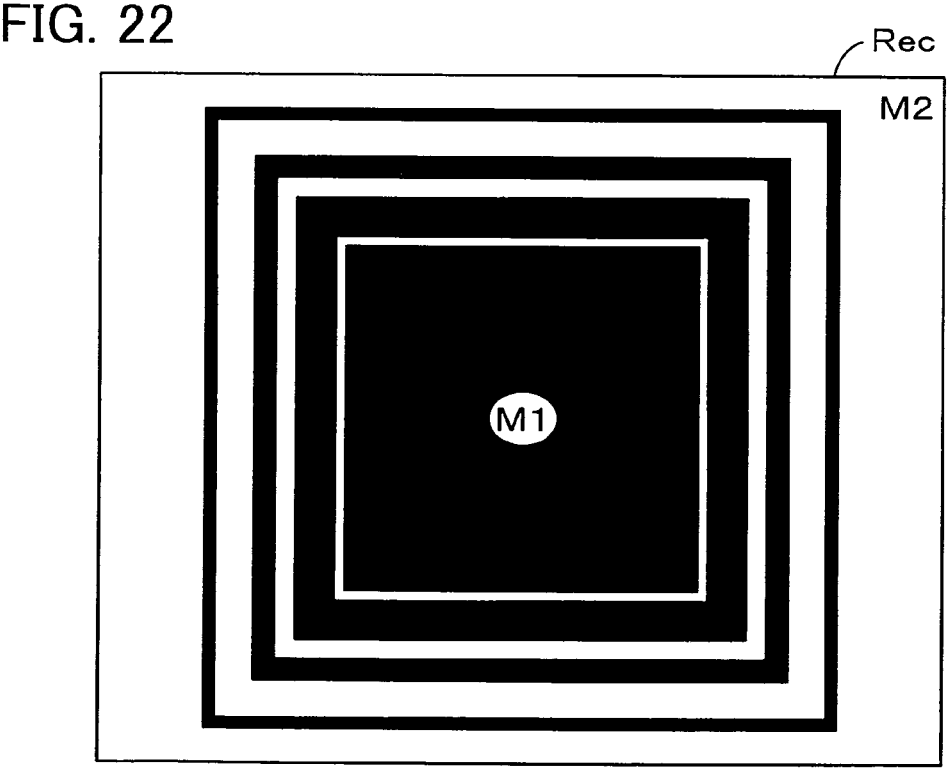
FIG. 22 is a plan view showing an example where circular contour lines on the recording plane shown in FIG. 21 are changed to square contour lines.

FIG. 22 is a plan view showing an example where circular contour lines on the recording plane Rec shown in FIG. 21 are changed to square contour lines. In this case, the individual strip-like regions are all frame-like square annular regions and can be formed by positioning a plurality of squares different in size on a recording plane Rec with their center positions overlapped. The "annular" used in the present application is not always limited to "circular annular," but this includes the meaning of "square annular" and "a ring in an arbitrary shape."

In the examples of FIG. 21 and FIG. 22, the point that a motif of the first original image is recorded on the region (black region) assigned with the first record attribute A and a motif of the second original image is recorded on the region, (white region) assigned with the second record attribute B is completely the same as that of the embodiment described up to Section 3.

In the above, the examples where respective regions are formed on a recording plane Rec by providing circles or squares with a nested structure have been described, however, the figure to be provided with a nested structure is not limited to circles or squares, and figures in an arbitrary shape can be used. Thus, an example using heart-shaped figures shall be described below as a general example.

Figure 23:
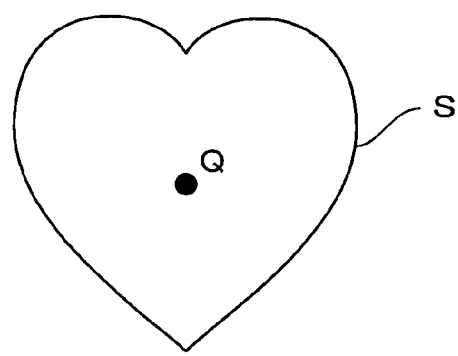
FIG. 23 is a plan view showing an example of a sample figure S having a closed contour line and a reference point Q defined inside thereof.

Now, a heart-shaped figure S as shown in FIG. 23 is defined, and a reference point Q is defined in the interior thereof. Here, this heart-shaped figure shall be referred to as a sample figure S. Here, although an example using a heart-shaped sample figure S is shown, the sample figure S may be any figure as long as it has a closed contour line. In addition, the reference point Q is defined as an arbitrary point located in the interior of the sample figure S or on the contour line. Practically, it is preferable to define the reference point Q of a sample figure S at a center of gravity position of the sample figure S.

Figure 24:
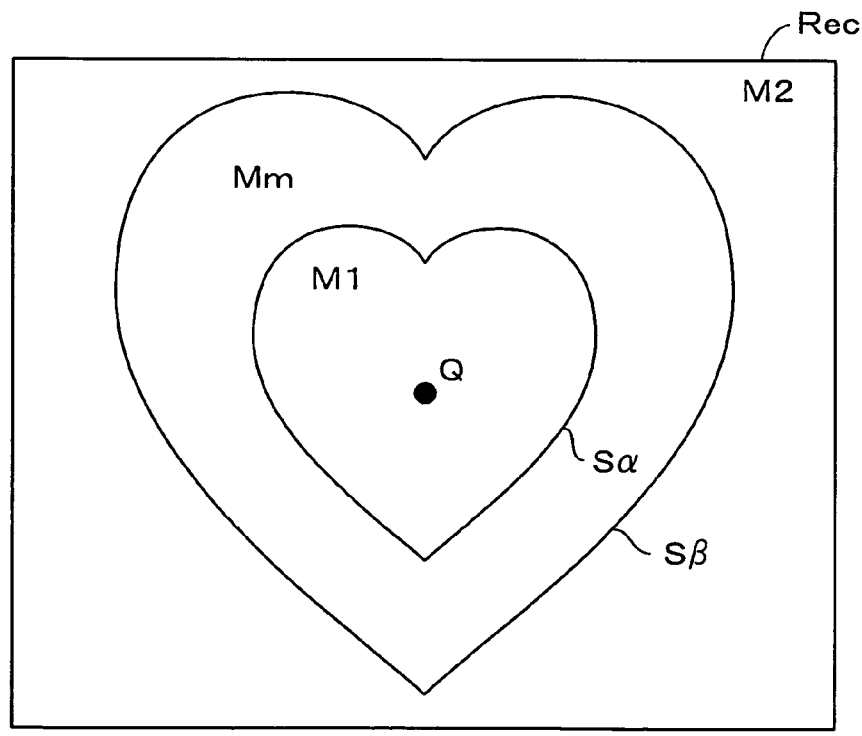
FIG. 24 is a plan view of an embodiment where three main regions having an inclusion relation are defined on a recording plane by use of the sample figure S shown in FIG. 23.

In the "main region defining step" of step S20, such a sample figure S and a reference point Q are defined, and then three main regions are defined. FIG. 24 is a plan view of an embodiment where three main regions having an inclusion relation are defined on a recording plane Rec by use of the sample figure S shown in FIG. 23. For carrying out such a definition, a first basic figure Sα obtained by increasing the sample figure S shown in FIG. 23 by α times and a reference point Q corresponding thereto are determined, and further, a second basic figure Sβ obtained by increasing the same sample figure S by β times (α<β) and a reference point Q corresponding thereto are determined. Also, the "magnification" herein referred to is a dimensional magnification in terms of a one-dimensional direction (an area magnification is a square thereof). And, the first basic figure Sα and the second basic figure Sβ are overlapped with each other on the recording plane Rec so that respective reference points Q are overlapped. By doing so, as shown in FIG. 24, an inner region of the first basic figure Sα can be provided as the first main region M1, an outer region of the second basic region Sβ can be provided as the second main region M2, and a region positioned outside the first basic figure Sα and inside the second basic figure Sβ can be provided as the middle main region Mm.

In place of defining an entire inner region of the first basic figure Sα as the first main region M1, a part thereof can be defined as the first main region M1. Likewise, in place of defining an entire outer region of the second basic figure Sβ as the second main region M2, a part thereof can be defined as the second main region M2. Also, in place of defining the entire region positioned outside the first basic figure Sα and inside the second basic figure Sβ as the middle main region Mm, a part thereof can be defined as the middle main region Mm. For example, in the example shown in FIG. 24, it is also possible to divide the recording plane Rec into two right and left parts by a vertical line passing through the reference point Q and use, in place of the whole of the illustrated recording plane Rec, only a right half thereof as a recording plane. In this case, a right half of the inner region of the first basic figure Sα becomes the first maim region M1, a right half of the outer region of the second basic figure Sβ becomes the second main region M2, and a right half of the region positioned outside the first basic figure Sα and inside the second basic figure Sβ becomes the middle main region Mm. Alternatively, in the example shown in FIG. 24, it is also possible to draw a small circle centered on the reference point Q in the interior of the first basic figure Sα and provide the inside of this circle as a region that belongs to none of the respective main regions M1, M2, and Mm. In this case, a part of the inner region of the first basic figure Sα (a part excluding the inside of the circle) becomes the first main region M1. Since neither of the original images is recorded inside the circle, it is also possible, for example, on a physical medium, to cut out the inside of the circle to use as a circular opening window. Obviously, such a circle may be positioned in the second main region M2 or in the middle main region Mm.

On the other hand, in the "strip-like region defining step" of step S30, individual strip-like regions can be defined by the following procedures. First, a total of (2n−1) magnification parameters γ(i) (i=1~2n−1, n is an integer equal to or more than 2) that satisfy a condition α<γ(1)<γ(2)<γ(3)<, . . . , <γ(2n−1)<β are defined to determine a total of (2n−1) middle figures that can be obtained by increasing a sample figure by γ(i) times, respectively. Then, these respective middle figures are overlapped with each other so that respective reference points overlap with the reference point Q of the first basic figure Sα and the second basic figure Sβ. Then, an annular region sandwiched between a contour line of the first basic figure Sα and a contour line of the first middle figure is defined as a first strip-like region, an annular region sandwiched between a contour line of the i-th middle figure and a contour line of the (i+1)-th middle figure is defined as the (i+1)-th strip-like region (i=1~2n−2, n is an integer equal to or more than 2), and an annular region sandwiched by a contour line of the (2n−1)-th middle figure and a contour line of the second basic figure Sβ is defined as the 2n-th strip-like region.

Figure 25:
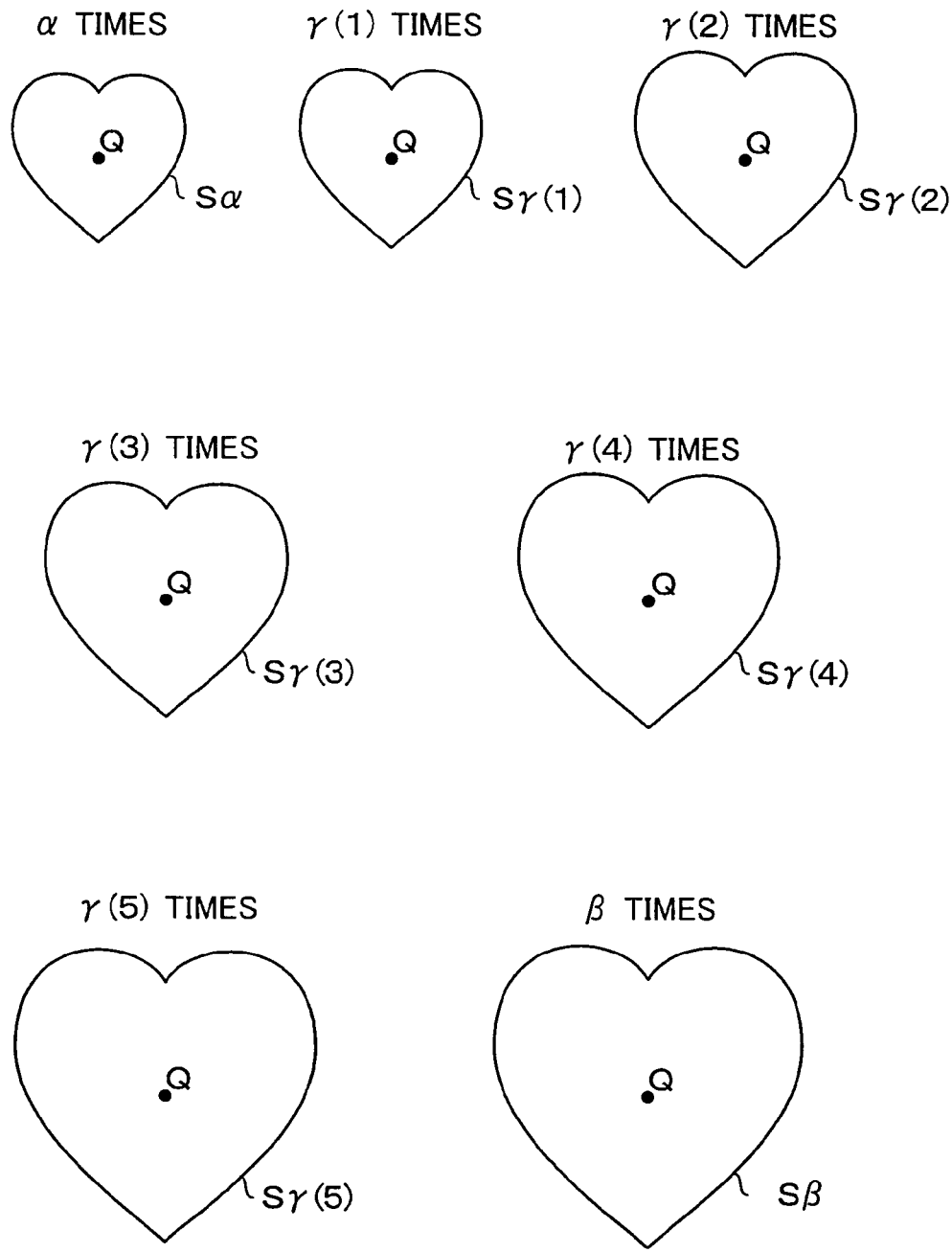
FIG. 25 is a plan view showing a state in which middle figures that form contour lines of strip-like regions have been generated by use of the sample figure S shown in FIG. 23.

For example, a specific case of n=3 shall be considered. In this case, a total of five magnification parameters γ(1), γ(2), γ(3), γ(4), and γ(5) that satisfy a condition α<γ(1)<γ(2)<γ(3) <γ(4)<γ(5)<β are defined. Then, a total of five middle figures Sγ(1), Sγ(2), Sγ(3), Sγ(4), and Sγ(5) are determined, which can be obtained by increasing the sample figure S shown in FIG. 23 by γ(1), γ(2), γ(3), γ(4), and γ(5) times, respectively. FIG. 25 is a plan view showing five middle figures thus determined along with the first basic figure Sα and the second basic figure Sβ. The five middle figures Sγ(1), Sγ(2), Sγ(3), Sγ(4), and Sγ(5) are figures in middle sizes between those of the first basic figure Sα and the second basic figure Sβ. The positions of the reference points Q are also determined at corresponding positions of the similar figures.

Lastly, these five middle figures are overlapped with each other onto the recording plane Rec so that respective reference points Q overlap with the reference point Q of the first basic figure Sα and the reference point Q of the second basic figure Sβ, and an annular region sandwiched between a contour line of the first basic figure Sγ and a contour line of the first middle figure Sγ(1) is defined as the first strip-like region f1, an annular region sandwiched between a contour line of the first middle figure Sγ(1) and a contour line of the second middle figure Sγ(2) is defined as the second strip-like region f2, an annular region sandwiched between a contour line of the second middle figure Sγ(2) and a contour line of the third middle figure Sγ(3) is defined as the third strip-like region f3, an annular region sandwiched between a contour line of the third middle figure Sγ(3) and a contour line of the fourth middle figure Sγ(4) is defined as the fourth strip-like region f4, an annular region sandwiched between a contour line of the fourth middle figure Sγ(4) and a contour line of the fifth middle figure S γ(5) is defined as the fifth strip-like region f5, and an annular region sandwiched by a contour line of the fifth middle figure Sγ(5) and a contour line of the second basic figure Sβ is defined as the sixth strip-like region f6.

Figure 26:
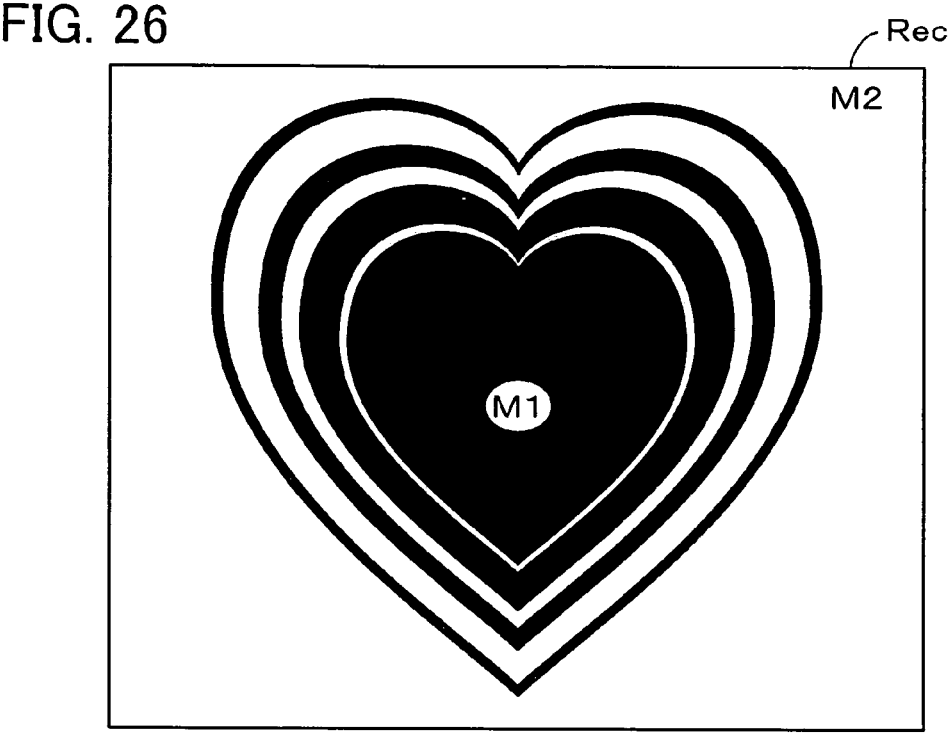
FIG. 26 is a plan view showing a state in which a middle main region Mm has been divided into a plurality of annular strip-like regions by arranging the middle figures shown in FIG. 25 on the recording plane shown in FIG. 24 and either of two record attributes has been assigned to the respective regions.

FIG. 26 is a plan view showing a state in which a middle main region Mm has been divided into six annular strip-like regions by positioning the five middle figures shown in FIG. 25 on the recording plane Rec shown in FIG. 24 and either of two record attributes has been assigned to the respective regions. The black region is a region assigned with the first record attribute A, and the white region is a region assigned with the second record attribute B. The individual strip-like regions have a shape along a heart-shaped contour line, and all form slender regions extending almost along the contour line (first boundary line C1) of the first basic figure Sα shown in FIG. 24 or the contour line (second boundary line C2) of the second basic figure Sβ.

Also, in defining such strip-like regions, for providing such a visual effect that, when a medium recorded with two motifs is observed, both motifs are smoothly blended in the middle main region Mm, it is still necessary to set the widths of the respective strip-like regions f1 to f6 so that any of the conditions (A), (B), and (C) mentioned above is satisfied.

Such a setting of the widths of the respective strip-like regions can also be performed by use of a sequence. That is, any of the following sequences A, B, and C is defined in the "strip-like region defining step" of step S30:

<Sequence A>: Sequence composed of 2n numerals Gi (i=1~2n, n is an integer equal to or more than 2) of which odd-numbered numerals increase monotonically and even-numbered numerals decrease monotonically;

<Sequence B>: Sequence composed of 2n numerals Gi (i=1~2n, n is an integer equal to or more than 2) of which odd-numbered numerals increase monotonically and even-numbered numerals take the same value; and <Sequence C>: Sequence composed of 2n numerals Gi (i=1~2n, n is an integer equal to or more than 2) of which even-numbered numerals decrease monotonically and odd-numbered numerals take the same value, and further, a setting is performed so that, where δ=β−α, a sum total of numerals composing the defined sequence is SUM, and a sum of numerals from the first numeral G1 to the i-th numeral Gi is Si, the i-th magnification parameter γ(i) becomes γ(i)=α+(Si/SUM)δ.

For example, a case where, with n=3, a sequence "3, 11, 6, 6, 11, 3" as shown in FIG. 13 is defined as a sequence A shall be considered. Here, let us suppose that magnification parameter values α=1 and β=1.4 have been set (that is, the first basic figure Sα shown in FIG. 24 is the same in size as the sample figure S shown in FIG. 23 and the second basic figure Sβ shown in FIG. 24 is 1.4 times the size of the sample figure S shown in FIG. 23). In this case, since δ=1.4−1=0.4 and SUM=40, the first magnification parameter γ(1) becomes γ(1)=α+(G1/SUM) δ=1+(3/40)×0.4=1.03. In addition, the second magnification parameter γ(2) becomes γ(2)=α+((G1+ G2)/SUM) δ=1+(14/40)×0.4=1.14. Since the same calculation results in γ(3)=1.20, γ(4)=1.26, and γ(5)=1.37, if, in FIG. 25, the first basic figure Sα is 1 time of the sample figure S and the second basic figure Sβ is 1.4 times the sample figure S, the five middle figures Sγ(1), Sγ(2), S γ(3), Sγ(4), and Sγ(5) are 1.03 times, 1.14 times, 1.20 times, 1.26 times, and 1.37 times of the sample figure S, respectively.

As mentioned above, the magnification herein referred to is a one-dimensional magnification, the ratio of the widths of the first strip-like region f1 to the sixth strip-like region f6 results in a ratio as shown in the sequence A "3, 11, 6, 6, 11, 3," and the respective widths satisfy the condition (A). Obviously, a setting to satisfy the condition (B) or (C) may be performed.

Section 5

Definition of Strip-Like Regions by Different Inclusive Figures

In Section 4, of the examples using figures with a nested structure, an embodiment in which similar figures are used for all figures has been described. An example where different figures are provided with a nested structure to define strip-like regions shall now be described.

First, in the "main region defining step" of step S20, a first basic figure Sa having a closed contour line and a second basic figure Sb having a closed contour line and including the first basic figure Sa are defined, and an inner region of a first basic figure Sa is provided as a first main region M1, an outer region of a second basic figure Sb is provided as a second main region M2, and a region positioned outside the first basic figure Sa and inside the second basic figure Sb is provided as a middle main region Mm.

Figure 27:
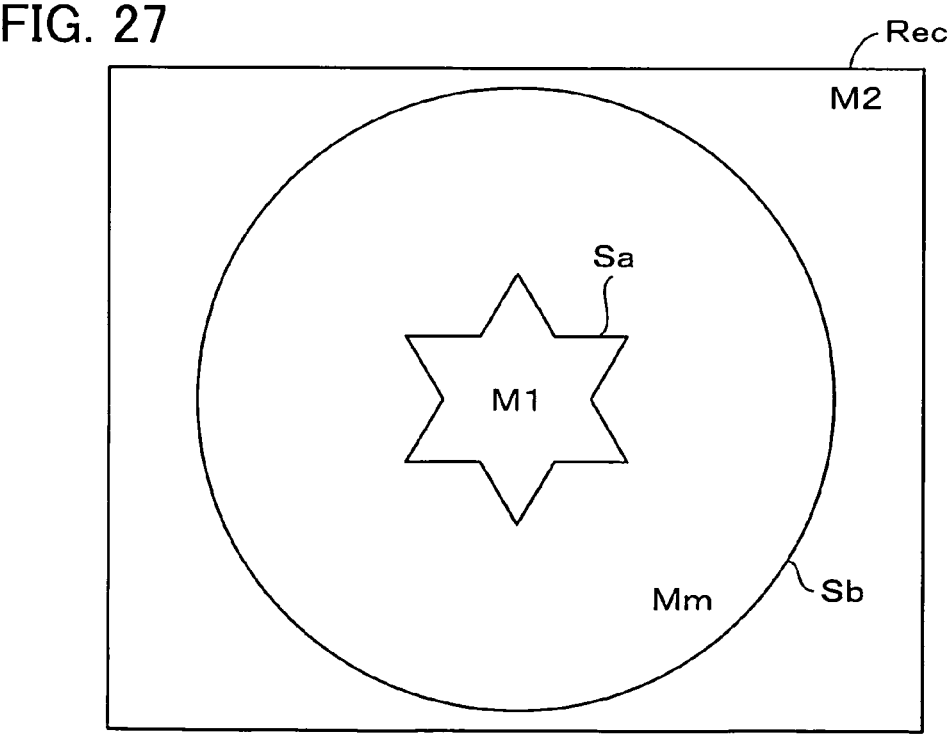
FIG. 27 is a plan view of an embodiment where three main regions having an inclusion relation are defined on a recording plane by use of basic figures Sa and Sb different from each other.

FIG. 27 is a plan view of a specific example where three main regions M1, Mm, and M2 are defined on a recording plane Rec by such a method. In this example, the first basic figure Sa is a star-shaped polygon, while the second basic figure Sb is a circle. As has been described in the example of FIG. 24, in place of providing the entire inner region of the first basic FIG. 5a as the first main region M1, a part thereof can be provided as the first main region M1. Likewise, in place of providing the entire outer region of the second basic figure Sb as the second main region M2, a part thereof can be provided as the second main region M2. Also, in place of providing the entire region positioned outside the first basic figure Sa and inside the second basic figure Sb as the middle main region Mm, a part thereof can be provided as the middle main region Mm.

As in the example shown in FIG. 24, when the first basic figure Sα and the second basic figure Sβ are similar figures, contour lines of the respective strip-like regions can also be formed by the same similar figures. However, when, as in the example shown in FIG. 27, the first basic figure Sa and the second basic figure Sb are different figures, contour lines of the respective strip-like regions cannot be formed by mere similar figures.

Figure 28:
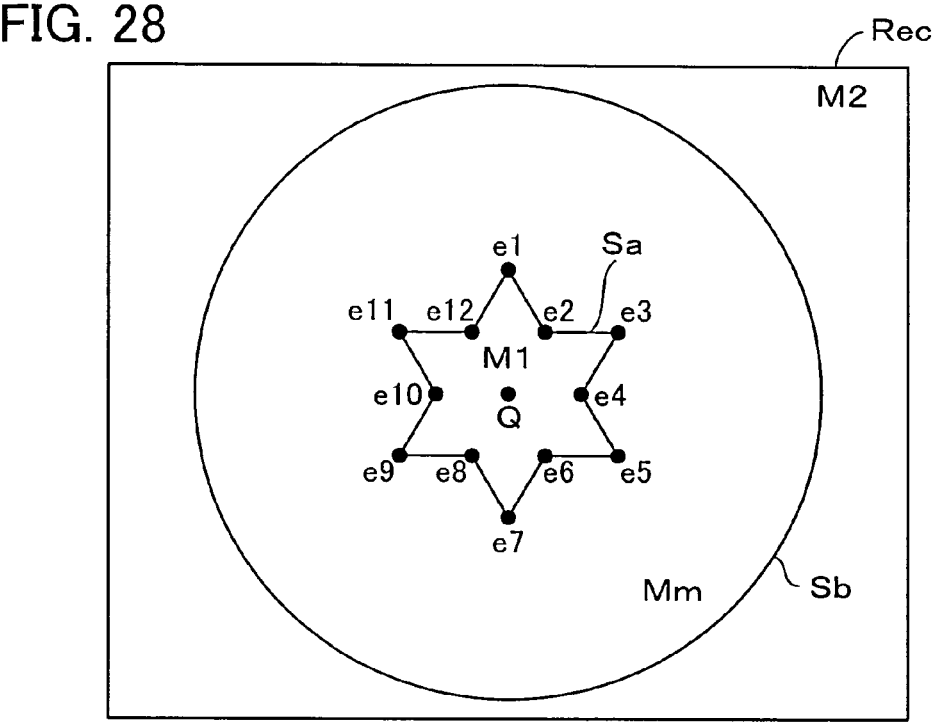
FIG. 28 is a plan view showing a state in which a reference point Q and first index points e1 to e12 have been defined for the basic figure Sa shown in FIG. 27.

Therefore, in the "strip-like region defining step" of step S30, first, a reference point Q is defined in the interior of the first basic figure Sa, and a plurality of, m first index points are defined on the contour line of the first basic figure Sa. FIG. 28 is a plan view showing a state in which a reference point Q and first index points e1 to e12 have been defined for the basic figure Sa shown in FIG. 27. Although the reference point Q may be defined at any position as long as it is in the interior of the first basic figure Sa, practically, it is preferable to define the reference point Q at a center of gravity position of the first basic figure Sa.

In addition, in the case of the illustrated example, individual apexes of the star-shaped polygon constituting the first basic figure Sa correspond to the first index points e1 to e12. When a polygon is thus used as the first basic figure Sa, by using individual apexes of the polygon as the first index points, the first index points can be defined by a simple method. Obviously, for determining the first index points, other various methods can also be employed. Some of the methods will be exemplified below. These methods can be widely applied when the first basic figure Sa is in an arbitrary shape, without being limited to a polygon.

In the first method, a start point is determined on the contour line of the first basic figure Sa, and the first index points are determined as points periodically plotted from this start point at predetermined reference intervals along the contour line. For example, by presetting as "points plotted at 5 mm intervals," the first index points can be plotted along the contour line at 5 mm intervals.

In the second method, dividing points to divide the overall length of the contour line of the first basic figure Sa into a plurality of, m equal parts are determined, and these dividing points are used as the first index points. For example, if it can be recognized that the overall length of the contour line is Z by a geometric method, the length obtained by dividing this overall length into m equal parts is Z/m, and thus in the same manner as in the first method described above, the first index points are defined as points periodically plotted at intervals of Z/m along the contour line. According to the second method, the intervals of the first index points are all unified to an interval of Z/m.

In the third method, angle-based dividing is performed. That is, with an integer m equal to or more than 2, m half lines having a reference point as an end point are defined in a manner separated at an angle of 360°/m, and the first index points are respectively defined at intersections between the m half lines and the contour line of the first basic figure Sa. For example, when m=36 is set, 36 half lines having the reference point as an end point and separated by 10° from each other can be defined, and thus 36 first index points can be defined as intersections of these 36 half lines and the contour line of the first basic figure Sa.

Figure 29:
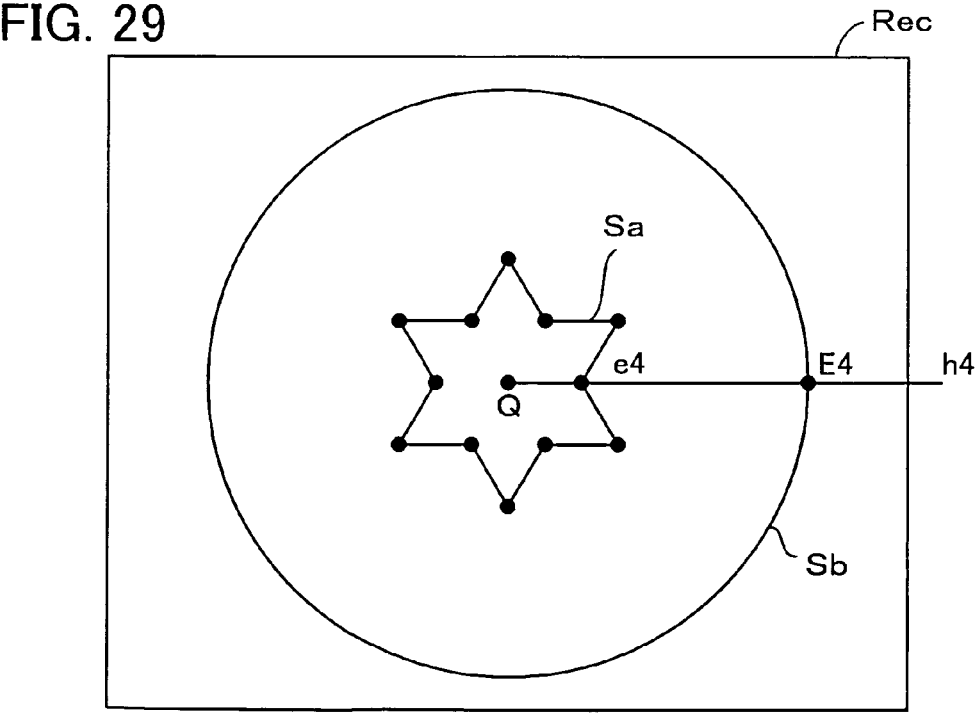
FIG. 29 is a plan view showing a method for defining a second index point E4 on the basic figure Sb by use of the reference point Q and the first index point e4 shown in FIG. 28.
Figure 30:
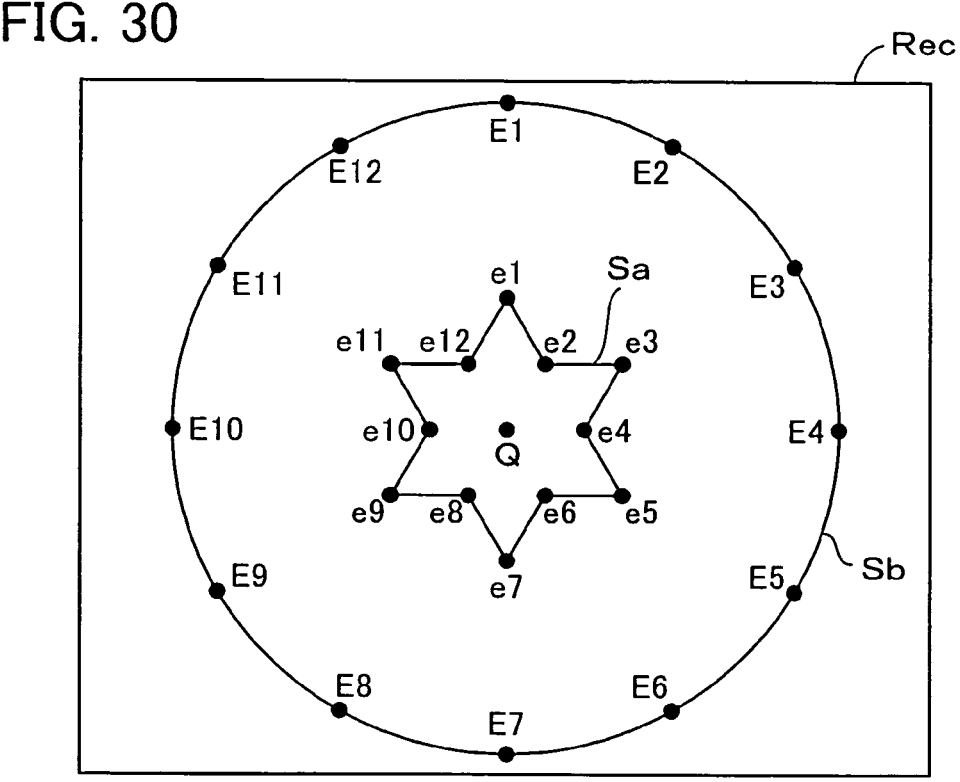
FIG. 30 is a plan view showing a state in which second index points E1 to E12 have been defined on the basic figure Sb by the method shown in FIG. 29.

When the m first index points have thus been defined, m half lines having the reference point Q as an end point and passing through the m first index points are defined, and second index points are respectively defined at intersections between these m half lines and the contour line of the second basic figure Sb. FIG. 29 is a plan view showing a method for defining a second index point E4 on the basic figure Sb by use of the reference point Q and the first index point e4 shown in FIG. 28. As illustrated, a half line h4 having the reference point Q as an end point and passing through the first index point e4 is defined, and the second index point E4 is defined at an intersection between the half line h4 and the contour line of the second basic figure Sb. When corresponding second index points are determined by the same method to all of the twelve first index points e1 to e12 shown in FIG. 28, respectively, twelve second index points E1 to E12 can be determined on the contour line of the second basic figure Sb, as shown in FIG. 30.

The respective strip-like regions are set so that the widths on the respective half lines (half lines having the reference point Q as an end point) passing through the first index points e1 to e12 and the second index points E1 to E12 satisfy any of the conditions (A), (B), and (C) mentioned above. That is, when the "distance along the half line" between the inner contour line and outer contour line of each strip-like regions is provided as a width of the strip-like region on the half line, the width is defined so that, on any of the twelve half lines, any of the conditions (A), (B), and (C) is satisfied.

Figure 31:
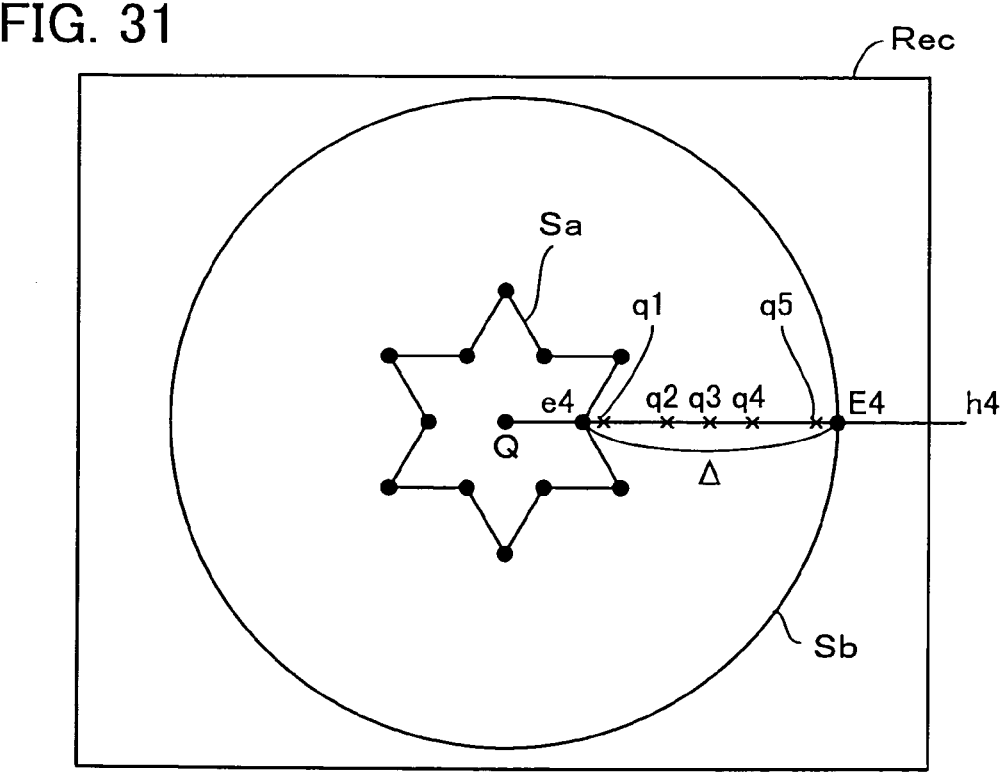
FIG. 31 is a plan view showing a state in which points q1 to q5 to determine contour lines of individual strip-like regions have been plotted between the first index point e4 and the second index point E4 shown in FIG. 29.

For example, in the case of an example shown in FIG. 31, it has been set so that the widths on the half line h4 passing through the first index point e4 and the second index point E4 and having the reference point Q as an end point satisfy the condition (A) mentioned above. As illustrated, for a setting to satisfy the condition (A) when points q1 to q5 are plotted on the half line h4 and the distance between the points e4 and q1 is provided as W1, and the distance between the points q1 and q2, as W2, and the distance between the points q2 and q3, as W3, and the distance between the points q3 and q4, as W4, and the distance between the points q4 and q5, as W5, and the distance between the points q5 and E4, as W6, the respective points q1 to q5 are plotted so that the odd-numbered distances W1, W3, and W5 gradually increase and the even-numbered distances W2, W4, and W6 gradually decrease. Obviously, a setting to satisfy the condition (B) or the condition (C) in place of the condition (A) may be performed.

The positions at which the respective points q1 to q5 should be plotted can also be determined by use of a sequence. That is, it suffices that any of the following sequences A, B, and C is defined in the "strip-like region defining step" of step S30:

<Sequence A>: Sequence composed of 2n numerals Gi (i=1~2n, n is an integer equal to or more than 2) of which odd-numbered numerals increase monotonically and even-numbered numerals decrease monotonically;

<Sequence B>: Sequence composed of 2n numerals Gi (i=1~2n, n is an integer equal to or more than 2) of which odd-numbered numerals increase monotonically and even-numbered numerals take the same value; and <Sequence C>: Sequence composed of 2n numerals Gi (i=1~2n, n is an integer equal to or more than 2) of which even-numbered numerals decrease monotonically and odd-numbered numerals take the same value, and where, for each half line, the distance between the first index point and the second index point is A and a sum total of numerals composing the defined sequence is SUM, the width Wi of the i-th strip-like region on the half line becomes $Wi=\Delta \times Gi/SUM$.

FIG. 32 is a view showing a sequence A used for setting the dimensions of strip-like regions according to the condition (A) and expressions used for calculating the widths W1 to W6 (positions at which the respective points q1 to q5 should be plotted) of the respective strip-like regions. The sequence A is a sequence composed of six numerals of "1, 3, 2, 2, 3, 1." The odd-numbered numerals of the sequence A increase monotonically as "1, 2, 3," and even-numbered numerals decrease monotonically as "3, 2, 1."

After such a sequence is defined, it suffices that the respective strip-like regions are defined so that, where a sum total of numerals composing this sequence is SUM (in the case of the sequence A shown in FIG. 32, SUM=12), the width Wi of the i-th strip-like region becomes $Wi=\Delta \times Gi/SUM$. For example, when the positions of the respective points q1 to q5 that should be plotted on the half line h4 shown in FIG. 31 are determined, where the distance between the first index point e4 and the second index point E4 is $\Delta$, the width W1 of the first strip-like region f1, that is, the distance W1 between the points e4 to q1 can be determined as $Wi=\Delta \times Gi/SUM=\Delta \times 1/12$. The same applies to the widths W2 to W6.

In FIG. 31, for the convenience of description, an example of the respective points q1 to q5 plotted on the half line h4 passing through the first index point e4 and the second index point E4 has been shown, however, in actuality, the process performed is completely the same for all 12 half lines to plot the respective points q1 to q5 on each individual half line, respectively.

Figure 33:
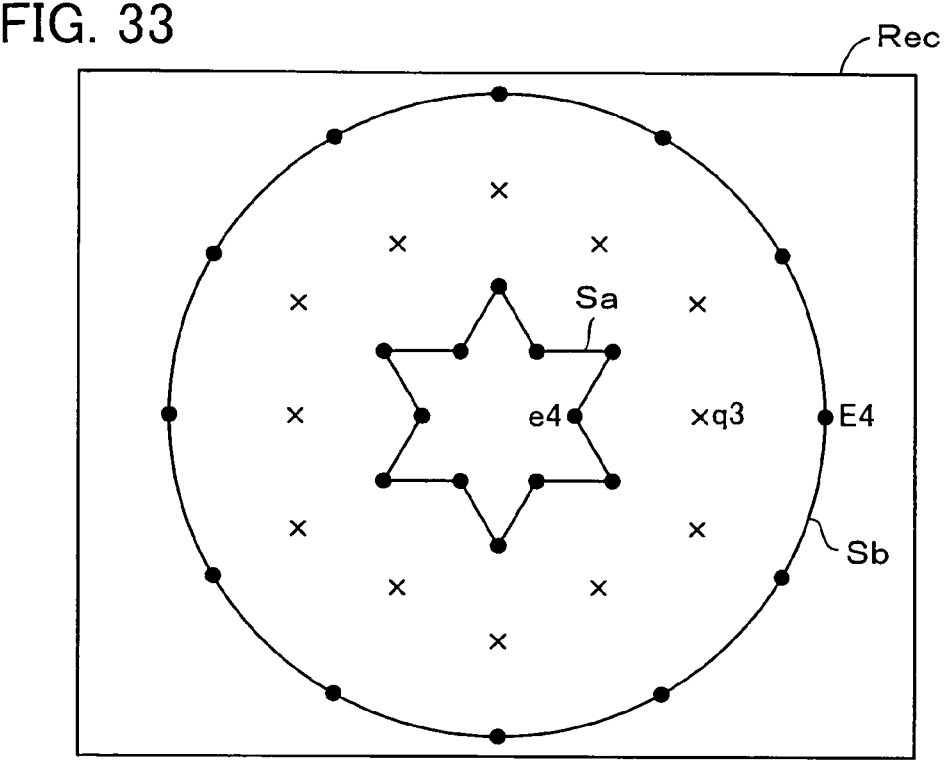
FIG. 33 is a plan view showing a state in which a group of points q3 have been plotted between the first index points e1 to e12 and the second index points E1 to E12 shown in FIG. 30.

FIG. 33 is a plan view showing a state in which a group of points q3 have been plotted between the first index points e1 to e12 and the second index points E1 to E12 shown in FIG. 30. The points denoted with × marks in the figure show the points q3 respectively plotted on the all 12 half lines. Obviously, in actuality, the points q1, q2, q4, and q5 are also to be plotted on each of all 12 half lines, however, FIG. 33 shows a state in which only the group of points q3 have been plotted for avoiding complication of the figure.

Figure 34:
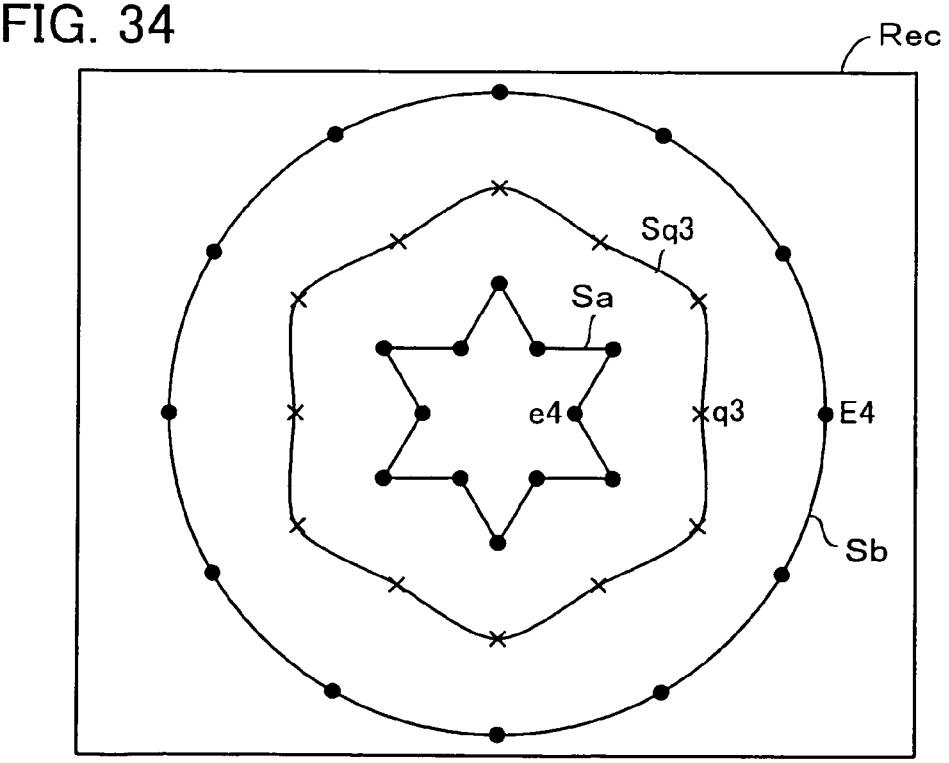
FIG. 34 is a plan view showing a state in which a contour line Sq3 has been defined by connecting the group of points q3 shown in FIG. 33.

Here, when the group of twelve points q3 denoted with × marks in FIG. 33 are connected in order, a middle figure Sq3 can be defined as shown in FIG. 34. The group of 12 points q3 may be connected by a straight line, or may be connected by a smooth curved line as illustrated. In completely the same manner, by connecting an unillustrated group of 12 points q1 in order, a middle figure Sq1 can be defined, and by connecting a group of 12 points q2 in order, a middle figure Sq2 can be defined, and by connecting a group of 12 points q4 in order, a middle figure Sq4 can be defined, and by connecting a group of 12 points q5 in order, a middle figure Sq5 can be defined.

These middle figures Sq1 to Sa5 and the first basic figure Sa and the second basic figure Sb are figures that compose inner contour lines and outer contour lines of the six strip-like regions f1 to f6 that should be determined.

Consequently, in the process described above, by plotting points to be intersections with inner contour lines and outer contour lines of the individual strip-like regions on each of 12 half lines and connecting the plotted points by a straight line or a smooth curved line, inner contour lines and outer contour lines of the individual strip-like regions are defined. And, the widths of the respective strip-like regions defined by such a process satisfy any of the conditions (A), (B), and (C) described above.

Figure 35:
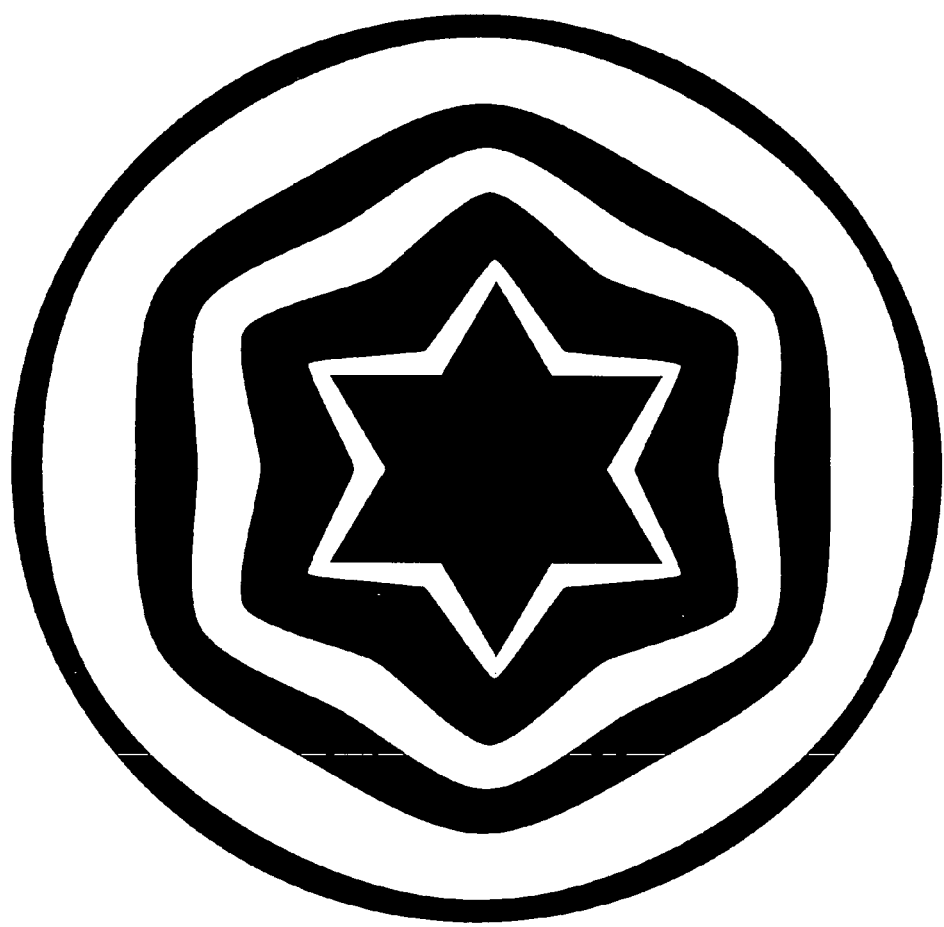
FIG. 35 is a plan view showing a state in which a middle main region Mm shown in FIG. 27 has been divided into six annular strip-like regions and either of two record attributes has been assigned to the respective regions.

FIG. 35 is a plan view showing a state in which a middle main region Mm shown in FIG. 27 has been divided into six annular strip-like regions f1 to f6 by the process described above and either of two record attributes has been assigned to the respective regions. The black region is a region assigned with the first record attribute A, and the white region is a region assigned with the second record attribute B. That is, the black star-shaped polygon positioned at the center of the figure is a region corresponding to the first main region M1 shown in FIG. 27, the white annular portion adjacent thereto at the immediate outside thereof is a first strip-like region f1. At the outside thereof, positioned are strip-like regions f2 (black), f3 (white), f4 (black), f5 (white), and f6 (black), and further, a portion with a white background at the outside thereof is the second main region M2.

In this example shown in FIG. 35, the respective strip-like regions have been defined by use of the sequence A shown in FIG. 32, and the ratio of the widths of the odd-numbered strip-like regions (white) increases monotonically as 1:2:3 from the inside to the outside, and the ratio of the widths of the even-numbered strip-like regions (black) decreases monotonically as 3:2:1 from the inside to the outside. Therefore, by recording a motif of the first original image on the black portions and recording a motif of the second original image on the white portions, an effect unique to the present invention that both motifs are observed in a smoothly blended state can be obtained.

Figure 36:
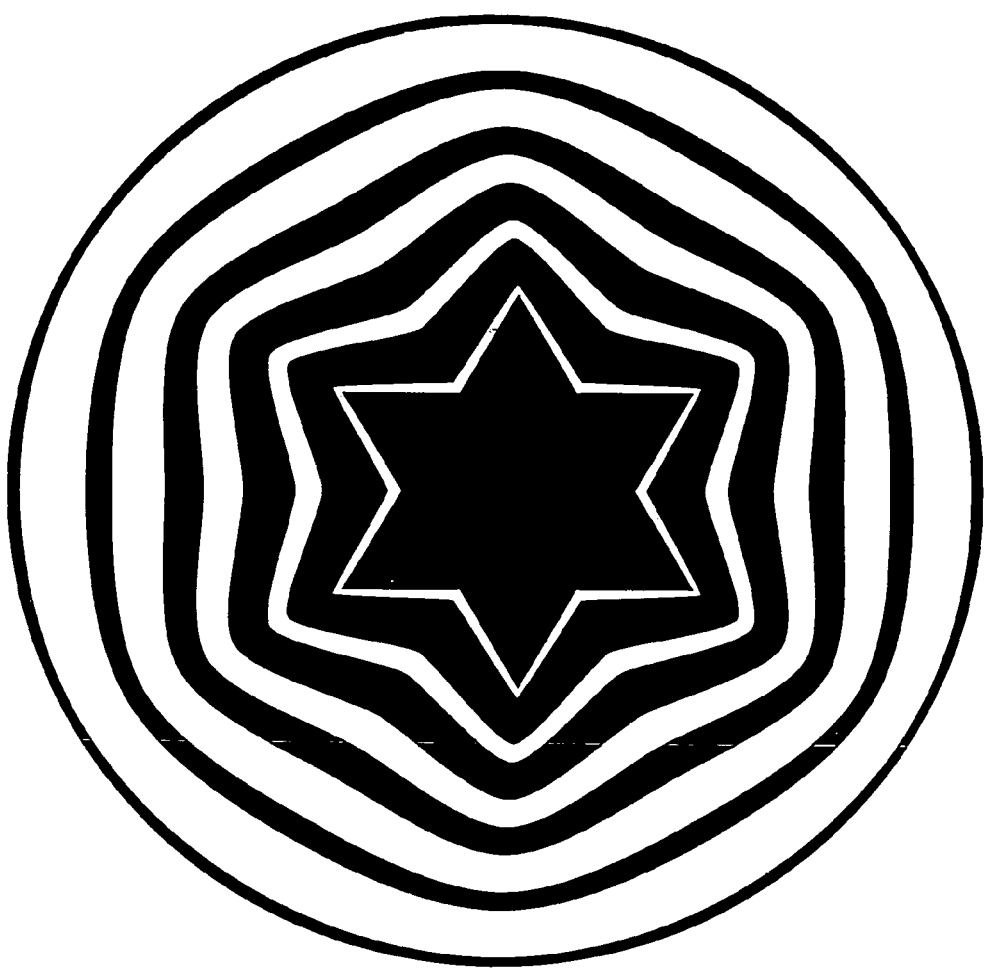
FIG. 36 is a plan view showing a state in which a middle main region Mm shown in FIG. 27 has been divided into ten annular strip-like regions and either of two record attributes has been assigned to the respective regions.

The example shown in FIG. 36 is a plan view showing a state in which the middle main region Mm shown in FIG. 27 has been divided into ten annular strip-like regions and either of two record attributes (shown in black or white) has been assigned to the respective regions. The black star-shaped polygon positioned at the center of the figure is a region corresponding to the first main region M1 shown in FIG. 27, the white annular portion adjacent thereto at the immediate outside thereof is a first strip-like region f1. At the outside thereof, positioned are strip-like regions f2 (black), f3 (white), f4 (black), f5 (white), f6 (black), f7 (white), f8 (black), f9 (white), and f10 (black), and further, a portion with a white background at the outside thereof is the second main region M2.

In this example shown in FIG. 36, the respective strip-like regions have been defined by use of a sequence "1, 5, 2, 4, 3, 3, 4, 2, 5, 1," and the ratio of the widths of the odd-numbered strip-like regions (white) increases monotonically as 1:2:3:4:5 from the inside to the outside, and the ratio of the widths of the even-numbered strip-like regions (black) decreases monotonically as 5:4:3:2:1 from the inside to the outside.

Figure 37:
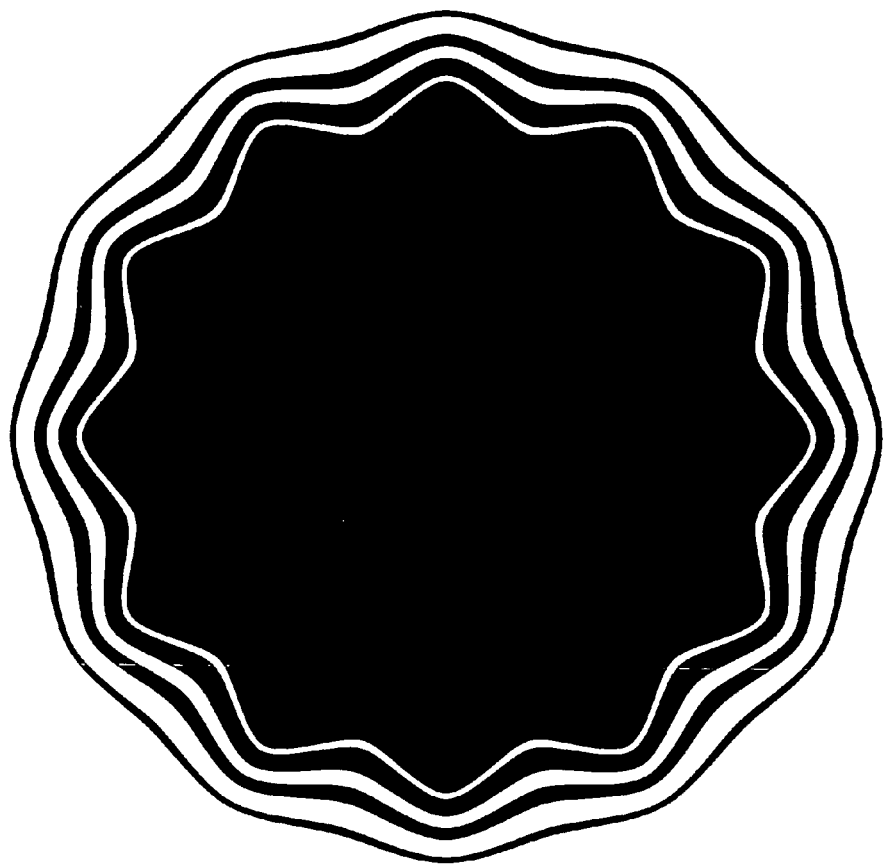
FIG. 37 is a plan view showing a state in which three main regions having an inclusion relation have been defined on a recording plane by use of basic figures different from those in FIG. 27, a middle main region thereof has been divided into six annular strip-like regions, and either of two record attributes has been assigned to the respective regions.

The example shown in FIG. 37 is a plan view showing a state in which three main regions having an inclusion relation have been defined on a recording plane by use of basic figures different from those in FIG. 27, a middle main region thereof has been divided into six annular strip-like regions, and either of two record attributes (shown in black or white) has been assigned to the respective regions. The first basic figure Sa positioned at the center of the figure and filled in black is a figure having a wavy contour line, and constitutes the first main region M1. At the outside thereof, positioned are strip-like regions f1 (white), f2 (black), f3 (white), f4 (black), f5 (white), and f6 (black), and an outer contour line of the strip-like region f6 corresponds to the second basic figure Sb. Further, a portion with a white background at the outside thereof is the second main region M2.

In this example shown in FIG. 37, the respective strip-like regions have been defined by use of the sequence A shown in FIG. 32, and the ratio of the widths of the odd-numbered strip-like regions (white) increases monotonically as 1:2:3 from the inside to the outside, and the ratio of the widths of the even-numbered strip-like regions (black) decreases monotonically as 3:2:1 from the inside to the outside.

Figure 38:
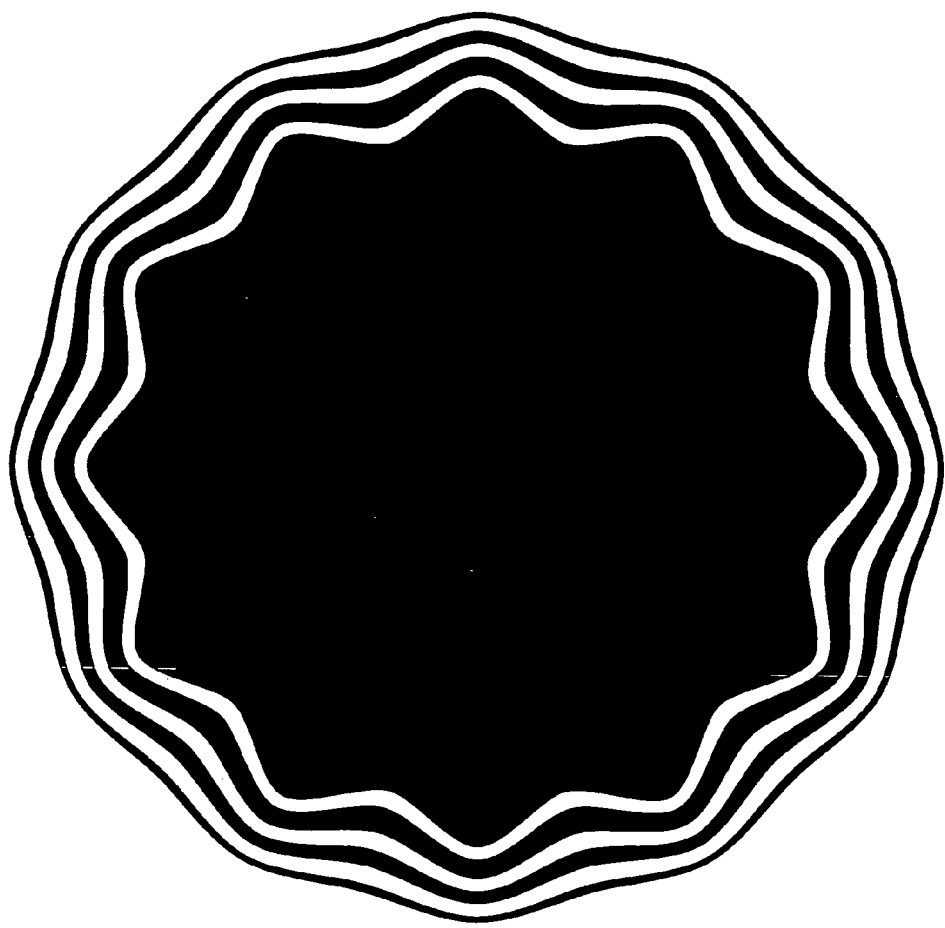
FIG. 38 is a plan view showing an example where the respective strip-like regions are defined by a dividing method different from that of FIG. 37.

Meanwhile, in the example shown in FIG. 38, although the same figures as those of the example in FIG. 37 are used as the first basic figure Sa and the second basic figure Sb, the respective strip-like regions are defined by a dividing method different from that of FIG. 37. That is, in this example shown in FIG. 38, since the respective strip-like regions have been defined by use of a sequence "2, 3, 2, 2, 2, 1," the ratio of the widths of the odd-numbered strip-like regions (white) is maintained at a constant value of 2:2:2, while the ratio of the even-numbered strip-like regions (black) decreases monotonically as 3:2:1 from the inside to the outside. This is an example of a setting performed to satisfy the condition (B) mentioned above, and in this example as well, by recording a motif of the first original image on the black portions and recording a motif of the second original image on the white portions, an effect unique to the present invention that both motifs are observed in a smoothly blended state can be obtained.

Section 6

Record Pattern Preparing Method

In Section 1 and Sections 2 to 5 described up until now, a basic concept of the present invention was described, and specific processing details of the "main region defining step" of step S20 and the "strip-like region defining step" of step S30 in the flowchart shown in FIG. 3 were mainly described, respectively. Therefore, in this Section 6, the process of the "record pattern preparing step" of step S50 shall now be described in more detail.

As mentioned above, in the "record pattern preparing step" of step S50, by determining any of an interference fringe pattern, a diffraction grating pattern, or a scattering structure pattern, based on the first original image, for a region assigned with the first record attribute, and determining any of an interference fringe pattern, a diffraction grating pattern, or a scattering structure pattern, based on the second original image, for a region assigned with the second record attribute, a process of preparing data indicating a predetermined record pattern to be formed on a recording plane is executed. Thus, a method for preparing record pattern data formed of interference fringe patterns shall now be described.

Figure 39:
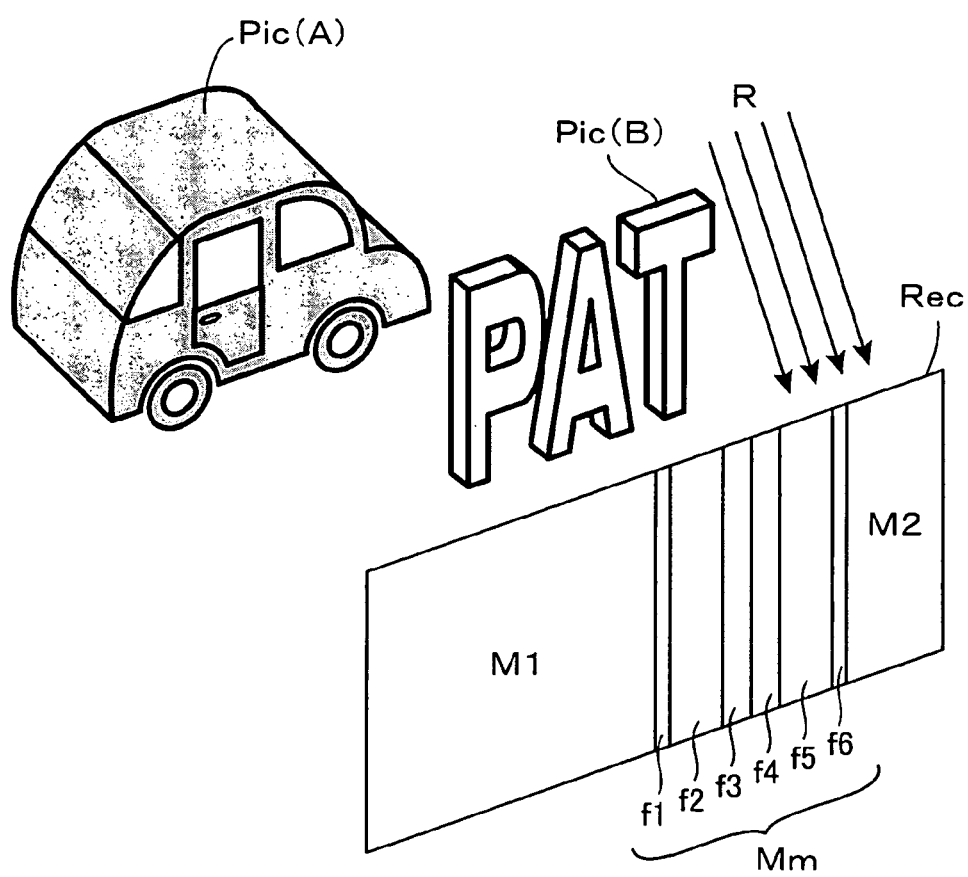
FIG. 39 is a perspective view showing principles of recording interference fringe patterns by positioning the two original images, shown in FIGS. 4A and 4B, and the recording plane, shown in FIG. 4C, in a three-dimensional space.

FIG. 39 is a perspective view showing principles of recording interference fringe patterns onto the recording plane Rec by positioning the two original images Pic(A) and Pic(B), shown in FIGS. 4A and 4B, and the recording plane Rec, shown in FIG. 4C, in a three-dimensional space. The original images Pic(A) and Pic(B) are, as illustrated, positioned in a manner slightly shifted in the transverse direction. This positioning is employed in consideration that the first original image Pic(A) is recorded in the first main region M1 defined on the left side on the recording plane Rec and the second original image Pic(B) is recorded in the second main region M2 defined on the right side. Because this process is actually executed as a simulation computation of optical phenomena on a computer, the original images Pic(A) and Pic(b) and the recording plane Rec are virtual objects positioned in a three-dimensional space on a computer.

Since the "strip-like region defining step" of step S30 and the "attribute assigning step" of step S40 have already been performed, the middle main region Mm of the recording plane Rec has been divided into a plurality of strip-like regions f1 to f6, and to the respective regions, either of the first record attribute A (attribute assigned to a region hatched by diagonal lines) and the second record attribute B (attribute assigned to a region hatched by dots) has been assigned.

For determining interference fringe patterns to be recorded on the recording plane Rec, as illustrated, a predetermined reference light R is set in addition to the original images Pic(A) and Pic(B) and the recording plane Rec, and interference fringe patterns formed at respective portions on the recording plane Rec by object light emitted from the original images Pic(A) and Pic(B) and the reference light R are determined by computation by the computer. Although in the illustrated example, the reference light R is set in common for the original images Pic(A) and Pic(B), a reference light Ra for recording the original images Pic(A) and a reference light Rb for recording the original images Pic(B) may instead be set separately. Because such an interference fringe pattern computing method is a general method for computer holograms as disclosed, for example, in the above-mentioned Patent Documents, detailed description of the computing method itself shall be omitted.

An important feature of the "record pattern preparing step" of step S50 of the present invention is that the original image to be recorded differs according to each individual region defined on the recording plane Rec. A first main region M1, a second main region M2, and strip-like regions f1 to f6 are defined on the recording plane Rec, shown in FIG. 39, and to each of these regions, either the first record attribute A or the second record attribute B is assigned. Thus, in computing and recording the interference fringe patterns, only an interference fringe pattern based on the first original image Pic(A) is recorded in the region (region hatched by diagonal lines in FIG. 6), to which the first record attribute A was assigned, and only an interference fringe pattern based on the second original image Pic(B) is recorded in the region (region hatched by dots in FIG. 6), to which the second record attribute B was assigned.

Specifically, an interference fringe pattern of the object light from the first original image Pic(A) and the reference light R is recorded in each of the regions M1, f2, f4, and f6, and in this process, the object light from the second original image Pic(B) is completely ignored. Likewise, an interference fringe pattern of the object light from the second original image Pic(B) and the reference light R is recorded in each of the regions M2, f1, f3, and f5, and in this process, the object light from the first original image Pic(A) is completely ignored. Because in a computer hologram method, the interference fringe patterns are determined by computation, such a process of determining an interference fringe pattern upon selecting the object light can be carried out freely by a program.

A predetermined record pattern is thus prepared on the recording plane Rec by the "record pattern preparing step" of step S50, and the object to be recorded with the record pattern differs according to each individual unit region.

Such a process of determining interference fringe patterns on the recording plane Rec is performed by computing interference fringe intensities at respective individual positions on the recording plane Rec. In performing this interference fringe intensity computation, various measures that have been proposed up until now can be incorporated. For example, the above-mentioned Japanese Patent Laid-open Publication No. 11-024539 discloses a method for performing an interference fringe intensity computation while restricting spread angles of the object light, and such a method can be applied to the process of the "record pattern preparing step" of step S40 as well.

Figure 40:
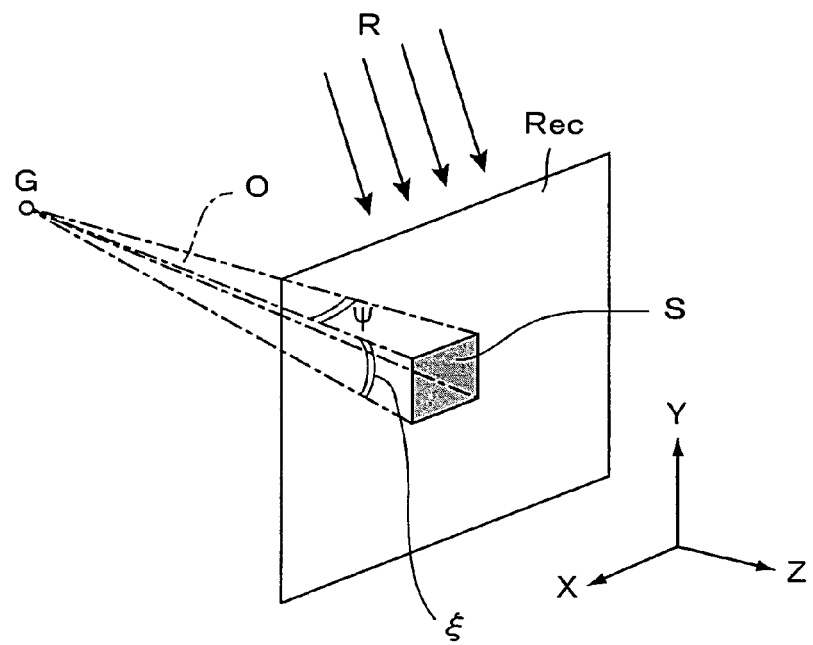
FIG. 40 is a perspective view showing a method for restricting spread angles of an object light in determining an interference fringe pattern on the recording plane Rec.

FIG. 40 is a perspective view of a method for restricting spread angles of the object light in determining an interference fringe pattern on the recording plane Rec. Here, an example, in which a horizontal spread angle of the object light O from a point light source G (a single point constituting an original image) is restricted to $\phi$ and a vertical spread angle is restricted to $\xi$, is shown. When such a restriction of spread angles is applied, the object light O from the point light source G arrives only within a restricted region S, indicated by hatching on the recording plane Rec. In other words, the information concerning the point light source G (the interference fringe pattern of the object light O and the reference light R) is recorded only inside the restricted region S on the recording plane Rec.

In comparison to such a method for forming interference fringe patterns optically, with a method for computer holograms, because interference fringe patterns can be determined by computation, hologram recording media that provide various special effects can be prepared by applying various measures in the computation process. Computation methods, to which such various measures are applied, may be used as necessary in the record pattern preparing step of step S50.

For example, as a recording medium that can display different reconstruction images to an observer according to the observation direction, a stereogram, arranged by positioning a lenticular lens, a fly-eye lens, or other lens array, has been known for a long time. Japanese Patent Laid-open Publications No. 2004-264839 and No. 2004-309709 disclose principles of preparing hologram recording media (CGH stereograms), with which the resolution of such stereograms can be improved significantly. With these methods, by employing a method for changing the radiance of the object light, directed from each point on a virtual object to the recording plane, according to the radiation angle, a medium providing an effect equivalent to the stereogram in the reconstruction process can be prepared. Obviously, such a CGH stereogram method may also be used in the record pattern preparing step of step S50 of the present invention.

That is, with the present invention, the "original images," which are prepared in step S10 and are to be recorded in step S50, are not restricted to simply geometrical virtual objects but broadly includes subjects to be recorded by computer hologram methods. Thus, "original image" data, as referred to in the present invention, not only refers to shape data of simply geometrical virtual objects but covers various data used in the record pattern preparation computation of step S50. For example, if a method for restricting the spread angles $\xi$ and $\phi$, shown in FIG. 40, is to be employed in the recording process, the information concerning the restriction is also data that constitutes a portion of the "original image," and if the above-described CGH stereogram method is to be employed, the information on the radiance that changes according to the radiation angle is also data that constitutes a portion of the "original image."

Thus, FIG. 39 and FIG. 40 illustrate examples of a method for recording each original image in the form of interference fringe patterns of the object light O and the reference light R (a method for recording each image as a normal hologram). In the case where such a method is employed, in determining an interference fringe pattern, based on an original image, for each region in the record pattern preparing step, the original image and the recording plane are positioned in the three-dimensional space, a predetermined reference light is defined, and the interference fringe pattern formed inside each region by the object light from the original image and the reference light is determined by computation.

Meanwhile, with the present invention, an original image can also be recorded in the form of diffraction grating patterns. As mentioned above, "hologram" in the present application is used as a broad concept that includes not only normal holograms, formed of optical interference fringe patterns, but also includes pseudo holograms (diffraction grating recording media) formed of diffraction grating patterns. Although methods for preparing pseudo holograms, constituted of diffraction grating patterns, are known techniques, such as described in the above-mentioned Japanese Patent Laid-open Publications No. 06-337622, No. 07-146635 and No. 07-146637, the principles of these methods shall be described briefly below.

Figure 41A:
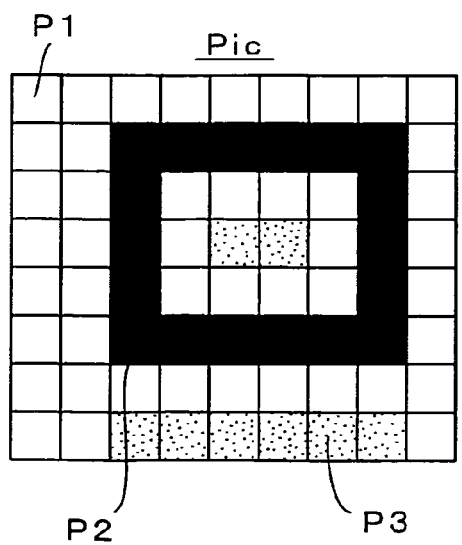
FIGS. 41A and 41B are plan views for describing a method for recording a motif using diffraction grating patterns on the recording plane Rec.

FIG. 41 are plan views for describing a method for recording a motif using diffraction grating patterns on the recording plane Rec. FIG. 41A is a plan view of an original image Pic to be recorded, which is a two-dimensional image constituted of a pixel array of 8 rows and 9 columns. This two-dimensional image is constituted from the three types of pixels of pixels P1, indicated in white, pixels P2, indicated in black, and pixels P3, indicated by hatching by dots. A simple motif is expressed by the combination of these pixels.

Figure 41B:
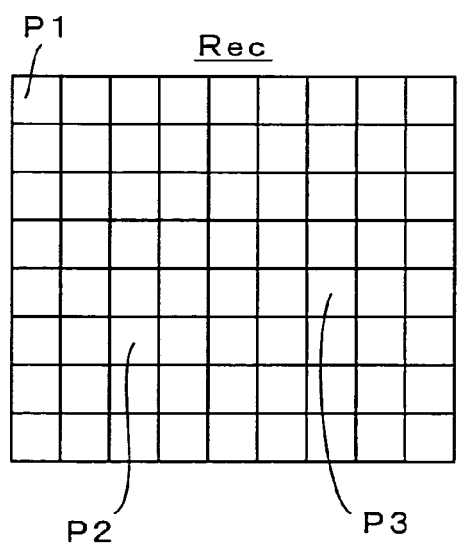

To record the original image Pic, shown in FIG. 41A, in the form of diffraction grating patterns in a predetermined region on the recording plane Rec, the same pixel array as that of the original image Pic is defined in the predetermined region on the recording plane Rec as shown in FIG. 41B to make the pixels on the recording plane Rec correspond to the pixels on the original image Pic. Diffraction grating patterns, corresponding to the pixel values of the pixels P1, P2, and P3 on the original image Pic, are then recorded in the corresponding pixels P1, P2, and P3 on the recording plane Rec.

For example, in the strip-like regions f1, f3, and f5 and the second main region M2 shown in FIG. 7, the three-dimensional characters "PAT" shown in FIG. 4B are to be recorded, however, by using planar characters "PAT" in place of the three-dimensional characters "PAT," this can be recorded in the form of diffraction grating patterns. That is, the planar characters "PAT" is prepared as data of a collection of a large number of pixels, a large number of pixels are defined in the interior of the regions f1, f3, f5, and M2, respectively, the pixels composing the planar characters "PAT" and the pixels defined in the interior of the respective regions f1, f3, f5, and M2 are made to correspond one to one, and in the pixels defined in the interior of the respective regions f1, f3, f5, and M2, diffraction grating patterns according to the corresponding pixels on the original image are recorded.

Figure 42:
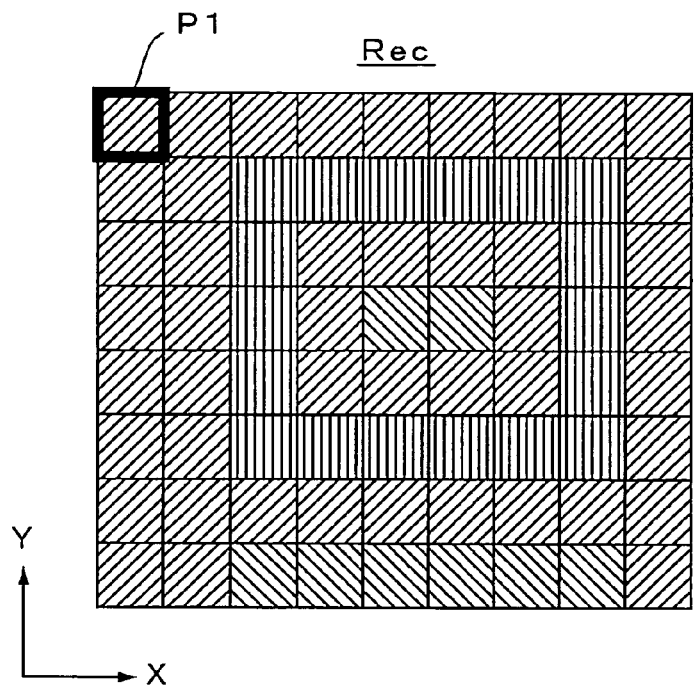
FIG. 42 is a plan view showing a state in which a motif has been recorded on the recording plane Rec by using diffraction grating patterns.

FIG. 42 is a plan view showing a state in which the motif, corresponding to the original image of FIG. 41A, has been recorded on the recording plane Rec, shown in FIG. 41B, by using diffraction grating patterns. The lines drawn inside each individual pixel shown in FIG. 42 indicate grating lines of a diffraction grating pattern for the sake of description. The grating lines of an actual diffraction grating pattern are recorded at a pitch of the level of the wavelength of visible light and cannot be observed by the naked eye. There are three types of diffraction grating patterns in the individual pixels shown in FIG. 42, and these correspond to the three types of pixels shown in FIG. 41A. That is, at the position of each pixel P1, indicated in white in FIG. 41A, a diffraction grating pattern, having grating lines that are inclined in the upper right to lower left direction, is formed, at the position of each pixel P2, indicated in black in FIG. 41A, a diffraction grating pattern, having grating lines directed in the vertical direction, is formed, and at the position of each pixel P3, indicated by hatching by dots in FIG. 41A, a diffraction grating pattern, having grating lines that are inclined in the upper left to lower right direction, is formed.

By thus recording diffraction grating patterns according to the pixel values of the respective individual pixels of the original image Pic onto the corresponding pixel positions on the recording plane Rec, the motif on the original image Pic can be expressed by diffraction grating patterns. Because the medium, onto which the diffraction grating patterns have been recorded as shown in FIG. 42, is not a normal hologram recording medium, a three-dimensional image cannot be reconstructed. However, because diffracted light is directed toward an observation position according to the diffraction grating patterns recorded in the respective individual pixels, the three types of pixels are observed in modes differing from each other, thereby enabling the motif on the original image Pic to be reconstructed.

Although the medium shown in FIG. 42 should be called a pseudo hologram, in general, such media are also referred to as holograms, and as mentioned above, are referred to as hologram recording media in the present application.

Figure 43:
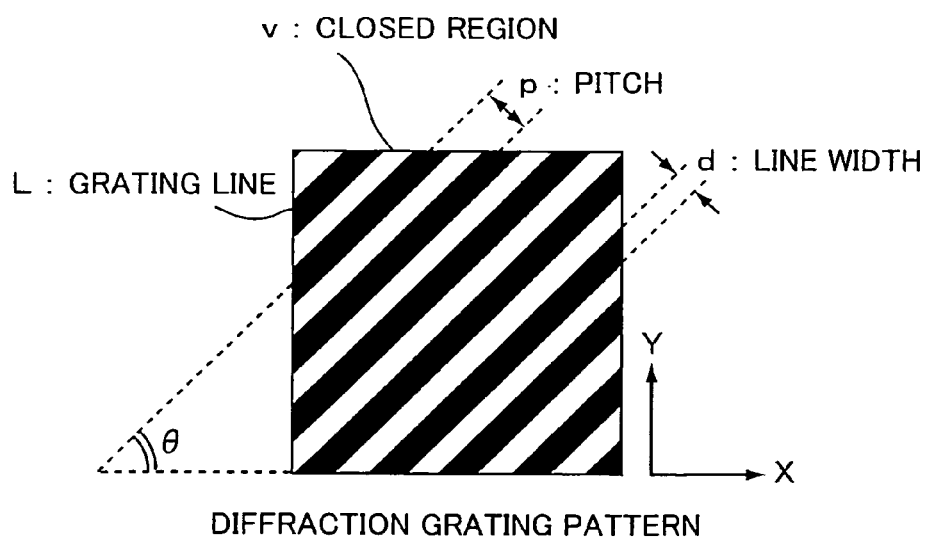
FIG. 43 is an enlarged plan view of a diffraction grating pattern formed in a pixel P1 shown in FIG. 42.

FIG. 43 is an enlarged plan view of the diffraction grating pattern formed in a pixel P1 shown in FIG. 42. A two-dimensional XY coordinate system is indicated in each of FIG. 42 and FIG. 43, and the orientation of the grating lines is defined by a positioning angle θ of the grating lines with respect to the X-axis. With the example shown in FIG. 43, grating lines L (black portions), with a line width d, are positioned inside a closed region v at a positioning angle θ and a pitch p. The three types of diffraction grating patterns shown in FIG. 42 correspond to changing the positioning angle θ of the grating lines in three ways. That is, with the recording medium shown in FIG. 42, the three types of pixels P1, P2, and P3 on the original image, shown in FIG. 41A, are expressed by diffraction grating patterns having three types of positioning angles θ.

Although diffraction grating pattern variations can thus be obtained by changing the positioning angle θ of the grating lines L, diffraction grating pattern variations can also be obtained by changing other parameters. Specifically, different diffraction grating patterns that give rise to different diffraction phenomena can also be obtained by changing the line width d and the pitch p of the grating lines L shown in FIG. 43. Also, although with the example shown in FIG. 43, the size of a pixel is made the same as the size of the closed region v, in which the grating lines are formed, by making the size of the closed region v, in which the grating lines are formed, 80%, 60%, 40%, and 20% of the size of a pixel, pixels, with which the intensities of the diffracted light are 80%, 60%, 40%, and 20%, respectively, can be formed.

Numerous variations of pixels, each having a diffraction grating pattern formed in the interior, can thus be formed by variously changing the positioning angle θ, line width d, and pitch p of the grating lines L, the size of the closed region v in which the grating lines L are formed, etc. By using such variations to express the variations of the pixel values of pixels on an original image, the motif on the original image can be expressed in the form of diffraction grating patterns.

Meanwhile, scattering structure patterns may be formed instead of diffraction grating patterns inside the respective individual pixels on the recording plane Rec. As mentioned above, by using diffraction grating patterns, a plurality of types of pixels that appear differently during observation can be prepared by changing the positioning angle θ, line width d, and pitch p of the grating lines L and the size of the closed region v, etc., and the variation of the pixel values of the pixels on the original image can be expressed by these plurality of types of pixels. In other words, as long as a plurality of types of pixels that mutually differ in appearance can be prepared for expressing the variation of the pixel values of the pixels on an original image, these plurality of types of pixels do not have to be formed by diffraction grating patterns.

Scattering structure patterns are patterns with unique light scattering characteristics and, in the present invention, may be used in place of the diffraction grating patterns described above. For example, Japanese Patent Laid-open Publication No. 2002-328639 and No. 2002-333854 disclose methods for forming recording media having unique light scattering characteristics by forming microscopic relief structures on surfaces. Surfaces of various light scattering characteristics can be formed, for example, by roughening the surfaces of recording media by etching or use of chemicals or by performing microscopic embossing using an electron beam printer. Thus, by preparing a plurality of types of scattering structure patterns that mutually differ in light scattering characteristics and allocating a specific scattering structure pattern in each pixel on a recording plane Rec according to the pixel value of a pixel on an original image, the information of the original image can be recorded in a manner similar to the above-described case of using diffraction grating patterns.

As described above, in the record pattern preparing step of step S50 in the flowchart of FIG. 3, two types of record pattern preparing method may be employed. In the first method, interference fringe patterns of the object light from the original images and the reference light are prepared, and by employing this method, a normal hologram recording medium that enables a three-dimensional reconstruction image to be obtained is prepared. In the second method, predetermined diffraction grating patterns or scattering structure patterns that correspond to pixels on the original images are prepared, and by employing this method, although a three-dimensional reconstruction image cannot be obtained, a (pseudo) hologram recording medium that appears to shimmer brightly or has a white, matted appearance is prepared.

Obviously, in recording the two original images onto the medium, one of either of the above-described two methods may be used or both methods may be used in combination. By selecting whether to record each of the two original images in the form of interference fringe patterns or in the form of diffraction grating patterns (or scattering structure patterns), media of the following three modes can be prepared.

In a medium of a first mode, both original images are recorded in the form of interference fringe patterns. To prepare such a medium, in the record pattern preparing step, the first original image, the second original image, and the recording plane are positioned in a three-dimensional space, a predetermined reference light is defined (as mentioned above, reference light that differs according to each original image may be defined), interference fringe patterns of the object light from the first original image and the reference light are determined by computation for the regions to which the first record attribute is assigned, and interference fringe patterns of the object light from the second original image and the reference light are determined by computation for the regions to which the second record attribute is assigned.

In a medium of a second mode, the first original image is recorded in the form of interference fringe patterns and the second original image is recorded in the form of diffraction grating patterns or scattering structure patterns. To prepare such a medium, in the record pattern preparing step, the first original image and the recording plane are positioned in a three-dimensional space, a predetermined reference light is defined, and interference fringe patterns of the object light from the first original image and the reference light are determined by computation for the regions to which the first record attribute is assigned, and for each region to which the second record attribute is assigned, a plurality of pixels are defined in the region, corresponding pixels on the second original image are determined for the defined pixels, and a diffraction grating pattern or a scattering structure pattern in each individual defined pixel is determined based on the pixel value of the corresponding pixel.

In a medium of a third mode, both original images are recorded in the form of diffraction grating patterns or scattering structure patterns. To prepare such a medium, in the record pattern preparing step, for each region to which the first record attribute is assigned, a plurality of pixels are defined in the region, corresponding pixels on the first original image are determined for the defined pixels, and a diffraction grating pattern or a scattering structure pattern in each individual defined pixel is determined based on the pixel value of the corresponding pixel, and for each region to which the second record attribute is assigned, a plurality of pixels are defined in the region, corresponding pixels on the second original image are determined for the defined pixels, and a diffraction grating pattern or a scattering structure pattern in each individual defined pixel is determined based on the pixel value of the corresponding pixel.

With the present invention, the original images to be recorded may be two-dimensional images or three-dimensional images. Thus, in the "original image preparing step" of step S10, it suffices that digital data expressing a two-dimensional image or a three-dimensional image be prepared as an original image. Obviously, an original image, prepared as a two-dimensional image, may be recorded in the form of interference fringe patterns or recorded in the form of diffraction grating patterns or scattering structure patterns. Likewise, an original image, prepared as a three-dimensional image, may be recorded in the form of interference fringe patterns or recorded in the form of diffraction grating patterns or scattering structure patterns. In other words, it suffices that, in the "record pattern preparing step" of step S40, a process, in which a record pattern of some form is prepared by determining (any of) interference fringe patterns, diffraction grating patterns, or scattering structure patterns based on an original image of some form, is performed.

An implementation is also possible, in which an empty image without an actual entity is prepared as one of the original images in the "original image preparing step" of step S10, so that no pattern whatsoever is formed for regions that have been assigned with the record attribute of this empty image. For example, by using an empty image without an actual entity as an original image Pic(B) in place of the original image Pic(B) shown in FIG. 4B, a reconstruction image, in which just the automobile motif, corresponding to the original image Pic(A) shown in FIG. 4A, gradually fades out spatially, can be obtained.

Section 7

Hologram Recording Medium Preparing Device

Figure 44:
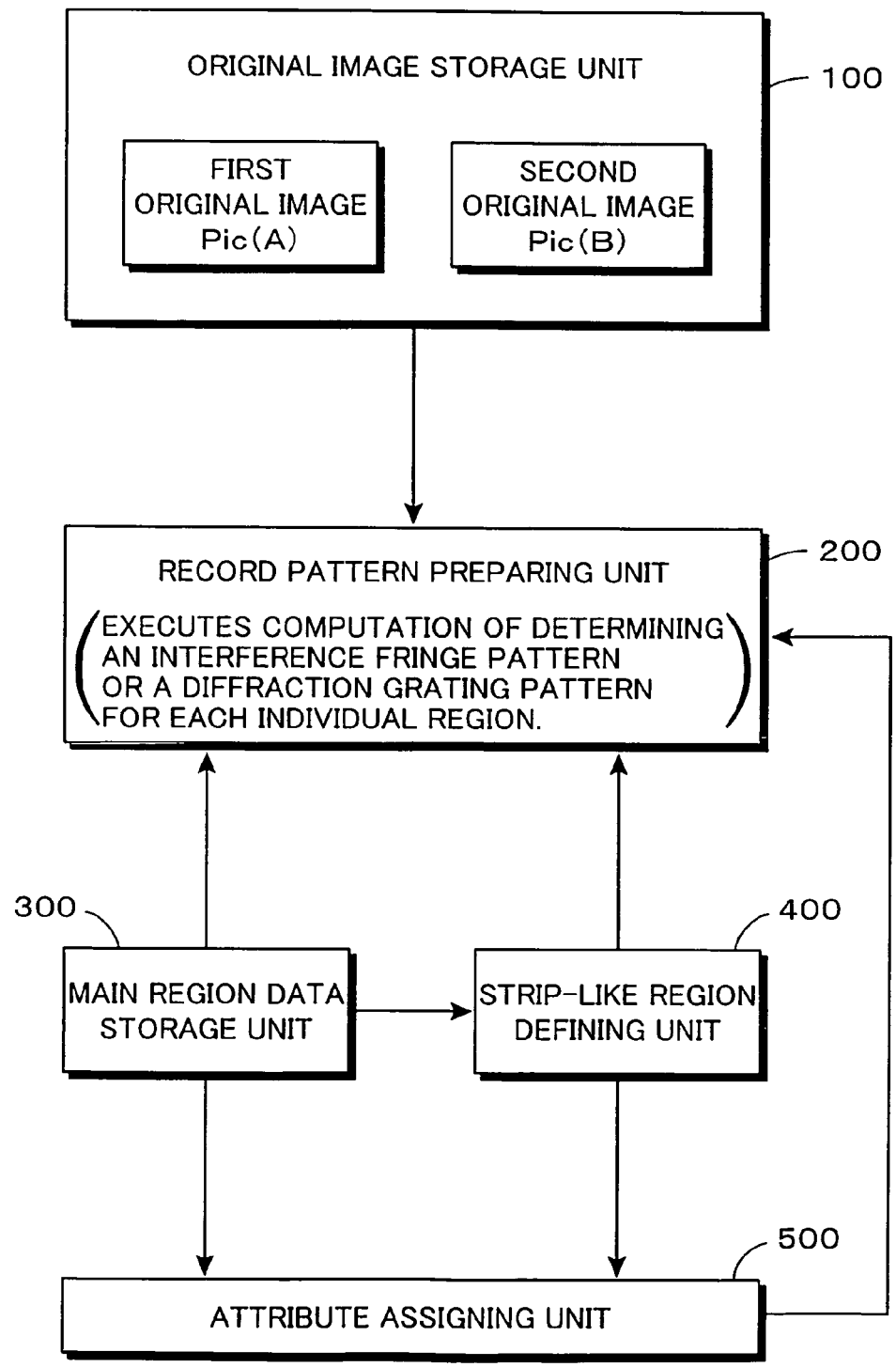
FIG. 44 is a block diagram showing a basic arrangement of a hologram recording medium preparing device according to the present invention.

FIG. 44 is a block diagram showing a basic arrangement of a hologram recording medium preparing device according to the present invention. As illustrated, this device includes an original image storage unit 100, a record pattern preparing unit 200, a main region data storage unit 300, a strip-like region defining unit 400, and an attribute assigning unit 500.

The original image storage unit 100 is a component that stores, as data, a first original image Pic(A) and a second original image Pic(B) to be recorded. The main region data storage unit 300 is a component that stores data indicating a first main region M1 and a second main region M2, defined on a hologram recording plane Rec, positioned spatially separated from each other and a middle main region Mm positioned therebetween and in contact with both the first main region M1 and the second main region M2. The storage data in the original image storage unit 100 and the storage data in the main region data storage unit 300 are set by an operator input operation.

On the other hand, the strip-like region defining unit 400 is a component thereof that performs a process of defining, by dividing the middle main region Mm, a plurality of strip-like regions extending almost along a first boundary line C1 positioned at a boundary between the first main region M1 and the middle main region Mm or a second boundary line C2 positioned at a boundary between the middle main region Mm and the second main region M2. A specific algorithm to perform such a process is as described in detail in Sections 2 to 5. In this strip-like region defining unit 400, the sequence data mentioned above is prepared as necessary.

That is, performed is a process of defining a total of 2n strip-like regions constituted of the first strip-like region in contact with the first main region M1, the (i+1)-th strip-like region in contact with the i-th strip-like region (i=1~2n−2, n is an integer equal to or more than 2), and the 2n-th strip-like region in contact with the (2n−1)-th strip-like region and the second main region M2, so that any of the following conditions (A), (B), and (C) is satisfied:

(A) The widths of the odd-numbered strip-like regions gradually increase from the first main region to the second main region, and the widths of the even-numbered strip-like regions gradually decrease from the first main region to the second main region;
(B) The widths of the odd-numbered strip-like regions gradually increase from the first main region to the second main region, and the widths of the even-numbered strip-like regions are maintained almost constant; and
(C) The widths of the even-numbered strip-like regions gradually decrease from the first main region to the second main region, and the widths of the odd-numbered strip-like regions are maintained almost constant.

The attribute assigning unit 500 is a component that performs a process of assigning the first record attribute A to the first main region M1, assigning the second record attribute B to the second main region M2, and assigning, to the middle main region Mm, one of either the first record attribute A or the second record attribute B for each individual strip-like region. Specifically, performed is a process of assigning, the second record attribute B to the odd-numbered strip-like regions and assigning the first record attribute A to the even-numbered strip-like regions when the respective strip-like regions are numbered from the strip-like region near the first main region M1 to that near the second main region M2.

The record pattern preparing unit 200 is a component that executes the method described in detail in Section 6. That is, performed is a process of preparing data indicating a predetermined record pattern to be formed on the recording plane Rec, by determining an interference fringe pattern, a diffraction grating pattern, or a scattering structure pattern, based on the first original image Pic(A), for a region assigned with the first record attribute A, and determining an interference fringe pattern, a diffraction grating pattern, or a scattering structure pattern, based on the second original image Pic(B), for a region assigned with the second record attribute B.

The device shown in FIG. 44 can be realized in actuality by incorporating a predetermined program in a computer. This program is a program for executing the process of the "strip-like region defining step" of step S30, the "attribute assigning step" of step S40, and the "record pattern preparing step" of step S50 based on digital data, expressing original images, prepared in the "original image preparing step" of step S10, and digital data, expressing main regions, defined in the "main region defining step" of step S20.

Section 8

Features of Hologram Recording Medium According to Present Invention

Last, features of a hologram recording medium according to the present invention shall be summarized. First, this hologram recording medium includes a first main region M1 and a second main region M2 positioned spatially separated from each other and a middle main region Mm positioned therebetween and in contact with both of these. Moreover, the middle main region Mm is divided into a plurality of strip-like regions extending almost along a first boundary line C1 positioned at a boundary between the first main region M1 and the middle main region Mm or a second boundary line C2 positioned at a boundary between the middle main region Mm and the second main region M2. The plurality of strip-like regions are constituted of a total of 2n strip-like regions of the first strip-like region in contact with the first main region M1, the (i+1)-th strip-like region in contact with the i-th strip-like region (i=1~2n−2, n is an integer equal to or more than 2), and the 2n-th strip-like region in contact with the (2n−1)-th strip-like region and the second main region M2.

The widths of the 2n strip-like regions are set so that any of the following conditions (A), (B), and (C) is satisfied:
(A) The widths of the odd-numbered strip-like regions gradually increase from the first main region to the second main region, and the widths of the even-numbered strip-like regions gradually decrease from the first main region to the second main region;
(B) The widths of the odd-numbered strip-like regions gradually increase from the first main region to the second main region, and the widths of the even-numbered strip-like regions are maintained almost constant; and
(C) The widths of the even-numbered strip-like regions gradually decrease from the first main region to the second main region, and the widths of the odd-numbered strip-like regions are maintained almost constant.

Furthermore, in the first main region M1 and the even-numbered strip-like regions, any of an interference fringe pattern, a diffraction grating pattern, or a scattering structure pattern based on the first original image is recorded, and in the second main region M2 and the odd-numbered strip-like regions, any of an interference fringe pattern, a diffraction grating pattern, or a scattering structure pattern based on the second original image is recorded.

Particularly, in recording the first original image in the form of interference fringe patterns and recording the second original image in the form of diffraction grating patterns or scattering structure patterns, interference fringe patterns of an object light from the original image and a reference light are recorded in the first main region M1 and the even-numbered strip-like regions, and in the second main region M2 and the odd-numbered strip-like regions, a plurality of pixels are positioned, and diffraction grating patterns or scattering structure patterns corresponding to the pixels of an image to be expressed are recorded in the individual pixels.

On the hologram recording medium arranged as in the above, images of two different motifs are to be recorded adjacently, and moreover, the two adjacent motifs are observed in a state smoothly blended at a boundary therebetween.

What is claimed is:
1. A hologram recording medium preparing method comprising:
an original image preparing step of preparing, as data, a first original image of a first motif and a second original image of a second motif to be recorded, wherein the first motif and the second motif are expressed upon being positioned adjacently;
a main region defining step of defining a first main region and a second main region positioned spatially separated from each other on a hologram recording plane and further defining a middle main region positioned between the first main region and the second main region and in contact with both the first main region and the second main region, wherein dimensions of said first main region, said second main region and said middle main region can be resolved with a naked eye;
a strip-like region defining step of defining a plurality of strip-like regions extending along a first boundary line positioned at a boundary between the first main region and the middle main region or a second boundary line positioned at a boundary between the middle main region and the second main region by dividing the middle main region;
an attribute assigning step of assigning a first record attribute to the first main region, assigning a second record attribute to the second main region, and assigning either the first record attribute or the second record attribute to the middle main region, for the individual strip-like regions, respectively;
a record pattern preparing step of determining an interference fringe pattern, a diffraction grating pattern, or a scattering structure pattern, based on the first original image, for a region assigned with the first record attribute, and determining an interference fringe pattern, a diffraction grating pattern, or a scattering structure pattern, based on the second original image, for a region assigned with the second record attribute, to prepare data indicating a record pattern to be formed on the recording plane; and
a medium forming step of forming the record pattern on a physical medium, wherein
in the strip-like region defining step, a total of 2n strip-like regions constituted of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region are defined so that any of the following conditions (A), (B), and (C) is satisfied:

(A) Widths of odd-numbered strip-like regions gradually increase from the first main region to the second main region, and widths of even-numbered strip-like regions gradually decrease from the first main region to the second main region;

(B) Widths of odd-numbered strip-like regions gradually increase from the first main region to the second main region, and widths of even-numbered strip-like regions are maintained constant; and (C) Widths of even-numbered strip-like regions gradually decrease from the first main region to the second main region, and widths of odd-numbered strip-like regions are maintained constant, and in the attribute assigning step, the second record attribute is assigned to the odd-numbered strip-like regions, and the first record attribute is assigned to the even numbered strip-like regions so that the first motif obtained by reproduction and the second motif obtained by reproduction are observed simultaneously to be positioned next to each other while smoothly blended at a boundary portion therebetween.

2. The hologram recording medium preparing method according to claim 1, wherein in the strip-like region defining step, the respective strip-like regions are defined so that one lateral contour line of a first strip-like region is in contact with the first main region, the other lateral contour line of the first strip-like region is in contact with a second strip-like region, with respect to i within a range of $1<i<2n$, one lateral contour line of an i-th strip-like region is in contact with an $(i-1)$-th strip-like region, and the other lateral contour line of the i-th strip-like region is in contact with an $(i+1)$-th strip-like region, and one lateral contour line of a 2n-th strip-like region is in contact with a $(2n-1)$-th strip-like region, and the other contour line of the 2n-th strip-like region is in contact with the second main region.

3. The hologram recording medium preparing method according to claim 2, wherein in the main region defining step, the respective main regions are defined so that the first boundary line and the second boundary line are constituted of lines in the same shape so as to overlap with each other by a parallel displacement, and in the strip-like region defining step, strip-like regions each having, as lateral contour lines, two sides constituted of lines in the same shape that overlap with the first boundary line and the second boundary line by a parallel displacement are defined, and where a distance in a predetermined axis direction between both contour lines of a strip-like region is provided as a width of the strip-like region, the width is defined so that any of the conditions (A), (B), and (C) is satisfied.

4. The hologram recording medium preparing method according to claim 3, wherein in the main region defining step, the respective main regions are defined so that the first boundary line and the second boundary line become straight lines parallel to each other, and in the strip-like region defining step, strip-like regions each having, as lateral contour lines, two sides parallel to the first boundary line and the second boundary line are defined.

5. The hologram recording medium preparing method according to claim 4, wherein in the main region defining step, the first main region, the middle main region, and the second main region are defined, respectively, by three rectangular regions positioned adjacently in a traverse direction, and in the strip-like region defining step, longer-than-wide strip-like regions are defined by dividing a rectangle constituting the middle main region into 2n parts in the traverse direction.

6. The hologram recording medium preparing method according to claim 3, wherein in the strip-like region defining step, any of the following sequences A, B, and C is defined:

<Sequence A>: Sequence composed of 2n numerals Gi ($i=1\sim2n$, n is an integer equal to or more than 2) of which odd-numbered numerals increase monotonically and even-numbered numerals decrease monotonically;

<Sequence B>: Sequence composed of 2n numerals Gi ($i=1\sim2n$, n is an integer equal to or more than 2) of which odd-numbered numerals increase monotonically and even-numbered numerals take the same value; and <Sequence C>: Sequence composed of 2n numerals Gi ($i=1\sim2n$, n is an integer equal to or more than 2) of which even-numbered numerals decrease monotonically and odd-numbered numerals take the same value, and the strip-like regions are defined so that, where a total width of the middle main region is Lm and a sum total of numerals composing a defined sequence is SUM, a width Wi of an i-th strip-like region becomes $Wi=Lm\times Gi/SUM$.

7. The hologram recording medium preparing method according to claim 2, wherein in the main region defining step, a first boundary half line and a second boundary half line having a predetermined reference point as an end point are defined to define the respective main regions, so that a partial section of the first boundary half line becomes the first boundary line and a partial section of the second boundary half line becomes the second boundary line, and in the strip-like region defining step, $(2n-1)$ dividing half lines having the reference point as an end point and positioned between the first boundary half line and the second boundary half line are defined to define strip-like regions by dividing the middle main region by the individual dividing half lines, so that, where an intersection angle of half lines constituting lateral contour lines of each strip-like region is provided as a width of the strip-like region, any of the conditions (A), (B), and (C) is satisfied.

8. The hologram recording medium preparing method according to claim 7, wherein in the strip-like region defining step, any of the following sequences A, B, and C is defined:

<Sequence A>: Sequence composed of 2n numerals Gi ($i=1\sim2n$, n is an integer equal to or more than 2) of which odd-numbered numerals increase monotonically and even-numbered numerals decrease monotonically;

<Sequence B>: Sequence composed of 2n numerals Gi ($i=1\sim2n$, n is an integer equal to or more than 2) of which odd-numbered numerals increase monotonically and even-numbered numerals take the same value; and <Sequence C>: Sequence composed of 2n numerals Gi ($i=1\sim2n$, n is an integer equal to or more than 2) of which even-numbered numerals decrease monotonically and odd-numbered numerals take the same value, and the strip-like regions are defined so that, where an intersection angle of the first boundary half line and the second boundary half line is φ and a sum total of numerals composing a defined sequence is SUM, a width θi of an i-th strip-like region becomes θi=φ×Gi/SUM.

9. The hologram recording medium preparing method according to claim 2, wherein in the main region defining step, a specific shape line whose shape and position are determined with reference to a predetermined half line is defined and a first boundary half line and a second boundary half line having a predetermined reference point as an end point are defined to define the respective main regions, so that a partial section of a specific shape line with reference to the first boundary half line becomes the first boundary line and a partial section of a specific shape line with reference to the second boundary half line becomes the second boundary line, and in the strip-like region defining step, (2n−1) dividing half lines having the reference point as an end point and positioned between the first boundary half line and the second boundary half line are defined to define strip-like regions by dividing the middle main region by specific shape lines with reference to the individual dividing half lines, and for each strip-like region, where an intersection angle of a pair of half lines being the basis for a pair of specific shape lines including contour lines at both sides is provided as a width of the strip-like region, the widths are defined so that any of the conditions (A), (B), and (C) is satisfied.

10. The hologram recording medium preparing method according to claim 9, wherein in the strip-like region defining step, any of the following sequences A, B, and C is defined:

<Sequence A>: Sequence composed of 2n numerals Gi (i=1~2n, n is an integer equal to or more than 2) of which odd-numbered numerals increase monotonically and even-numbered numerals decrease monotonically;

<Sequence B>: Sequence composed of 2n numerals Gi (i=1~2n, n is an integer equal to or more than 2) of which odd-numbered numerals increase monotonically and even-numbered numerals take the same value; and <Sequence C>: Sequence composed of 2n numerals Gi (i=1~2n, n is an integer equal to or more than 2) of which even-numbered numerals decrease monotonically and odd-numbered numerals take the same value, and the strip-like regions are defined so that, where an intersection angle of the first boundary half line and the second boundary half line is φ and a sum total of numerals composing a defined sequence is SUM, a width θi of an i-th strip-like region becomes θi=φ×Gi/SUM.

11. The hologram recording medium preparing method according to claim 1, wherein in the main region defining step, the middle main region is defined so as to surround the first main region, and the second main-region is defined so as to surround the middle main region, and in the strip-like region defining step, a first annular strip-like region is defined so as to surround the first main region, an (i+1)-th annular strip-like region is defined so as to surround an i-th annular strip-like region (i=1~2n−1, n is an integer equal to or more than 2), and the second main region surround a 2n-th annular strip-like region.

12. The hologram recording medium preparing method according to claim 11, wherein in the main region defining step, a sample figure having a closed contour line and a reference point positioned in the interior or on the contour line of the sample figure are defined, a first basic figure obtained by increasing the sample figure by α times and a reference point corresponding thereto and a second basic figure obtained by increasing the same figure by β times (α<β) and a reference point corresponding thereto are determined, the first basic figure and the second basic figure are overlapped so that the respective reference points overlap, and an inner region of the first basic figure or a part thereof is defined as the first main region, an outer region of the second basic figure or a part thereof is provided as the second main region, and a region positioned outside the first basic region and inside the second basic region or a part thereof is defined as the middle main region.

13. The hologram recording medium preparing method according to claim 12, wherein in the strip-like region defining step, a total of (2n−1) magnification parameters γ(i) (i=1~2n−1, n is an integer equal to or more than 2) that satisfy a condition α<γ(1)<γ(2)<γ(3)<, . . . , <γ(2n−1)<β are defined to determine a total of (2n−1) middle figures obtained by increasing the sample figure by γ(i) times, respectively, and these respective middle figures are overlapped so that respective reference points overlap with the reference points of the first basic figure and the second basic figure, an annular region sandwiched between a contour line of the first basic figure and a contour line of a first middle figure is defined as a first strip-like region, an annular region sandwiched between a contour line of an i-th middle figure and a contour line of an (i+1)-th middle figure is defined as an (i+1)-th strip-like region (i=1~2n−2, n is an integer equal to or more than 2), and an annular region sandwiched by a contour line of a (2n−1)-th middle figure and a contour line of the second basic figure is defined as a 2n-th strip-like region.

14. The hologram recording medium preparing method according to claim 13, wherein in the strip-like region defining step, any of the following sequences A, B, and C is defined:

<Sequence A>: Sequence composed of 2n numerals Gi (i=1~2n, n is an integer equal to or more than 2) of which odd-numbered numerals increase monotonically and even-numbered numerals decrease monotonically;

<Sequence B>: Sequence composed of 2n numerals Gi (i=1~2n, n is an integer equal to or more than 2) of which odd-numbered numerals increase monotonically and even-numbered numerals take the same value; and <Sequence C>: Sequence composed of 2n numerals Gi (i=1~2n, n is an integer equal to or more than 2) of which even-numbered numerals decrease monotonically and odd-numbered numerals take the same value, and the strip-like regions are defined so that, where δ=β−α, a sum total of numerals composing a defined sequence is SUM, and a sum of numerals from a first numeral G1 to an i-th numeral Gi of the defined sequence is Si, an i-th magnification parameter γ(i) becomes γ(i)=α+(Si/SUM)δ.

15. The hologram recording medium preparing method according to claim 12, wherein
a reference point of a sample figure is defined at a center of gravity position of the sample figure.

16. The hologram recording medium preparing method according to claim 11, wherein
in the main region defining step, a first basic figure having a closed contour line and a second basic figure having a closed contour line and including the first basic figure are defined, an inner region of the first basic figure or a part thereof is defined as the first main region, an outer region of the second basic figure or a part thereof is defined as the second main region, and a region positioned outside the first basic figure and inside the second basic figure or a part thereof is defined as the middle main region.

17. The hologram recording medium preparing method according to claim 16, wherein
in the strip-like region defining step,
a reference point is defined in an interior of the first basic figure, and a plurality of, m first index points are defined on the contour line of the first basic figure,
m half lines having the reference point as an end point and passing through the m first index points are defined, and second index points are defined at intersections between these m half lines and the contour line of the second basic figure, and
where a distance along a half line between an inner contour line and an outer contour line of each strip-like region is provided as a width of the strip-like region on the half line, the width is defined so that, on any of the m half lines, any of the conditions (A), (B), and (C) is satisfied.

18. The hologram recording medium preparing method according to claim 17, wherein
in the strip-like region defining step, any of the following sequences A, B, and C is defined:
<Sequence A>: Sequence composed of 2n numerals Gi (i=1~2n, n is an integer equal to or more than 2) of which odd-numbered numerals increase monotonically and even-numbered numerals decrease monotonically;
<Sequence 13>: Sequence composed of 2n numerals Gi (i=1~2n, n is an integer equal to or more than 2) of which odd-numbered numerals increase monotonically and even-numbered numerals take the same value; and
<Sequence C>: Sequence composed of 2n numerals Gi (i=1~2n, n is an integer equal to or more than 2) of which even-numbered numerals decrease monotonically and odd-numbered numerals take the same value, and
where, for each half line, a distance between the first index point and the second index point is Δ and a sum total of numerals composing a defined sequence is SUM, a width Wi of an i-th strip-like region on the half line becomes Wi=Δ×Gi/SUM.

19. The hologram recording medium preparing method according to claim 18, wherein
in the strip-like region defining step, by plotting, on each half line, points to be intersections with inner contour lines and outer contour lines of individual strip-like regions and connecting the plotted points by a straight line or a smooth curved line, the inner contour lines and the outer contour lines of the individual strip-like regions are defined.

20. The hologram recording medium preparing method according to claim 17, wherein
in the strip-like region defining step, a reference point of the first basic figure is defined at a center of gravity position thereof.

21. The hologram recording medium preparing method according to claim 17, wherein
in the main region setting step, a polygon is defined as the first basic figure, and
in the strip-like region defining step, individual apexes of the polygon are used as the first index points.

22. The hologram recording medium preparing method according to claim 17, wherein
in the strip-like region defining step, a start point is determined on the contour line of the first basic figure, and the first index points are defined as points periodically plotted at predetermined reference intervals along the contour line from the start point.

23. The hologram recording medium preparing method according to claim 17, wherein
in the strip-like region defining step, dividing points to divide an overall length of the contour line of the first basic figure into a plurality of, m equal parts are determined, and these dividing points are used as the first index points.

24. The hologram recording medium preparing method according to claim 17, wherein
in the strip-like region defining step, with an integer m equal to or more than 2, m half lines having a reference point as an end point are defined in a manner separated at an angle of 360°/m, and the first index points are defined at intersections between these m half lines and the contour line of the first basic figure.

25. The hologram recording medium preparing method according to claim 1, wherein
in the original image preparing step, digital data, expressing a two-dimensional image or a three-dimensional image, is prepared as an original image.

26. The hologram recording medium preparing method according to claim 1, wherein
in the original image preparing step, an empty image without an actual entity is prepared as one of the original images and no interference fringe pattern, no diffraction grating pattern, and no scattering structure pattern are formed for regions that have been assigned with a record attribute of the empty image.

27. The hologram recording medium preparing method according to claim 1, wherein
in determining an interference fringe pattern based on an original image for each region in the record pattern preparing step, the original image and the recording plane are positioned in a three-dimensional space, a predetermined reference light is defined, and an interference fringe pattern, formed in the region by an object light from the original image and the reference light, is determined by computation.

28. The hologram recording medium preparing method according to claim 1, wherein
in determining a diffraction grating pattern or a scattering structure pattern based on an original image for each region in the record pattern preparing step, a plurality of pixels are defined in each region, corresponding pixels on the original image are determined for the defined pixels, and a diffraction grating pattern or a scattering structure pattern in each individual defined pixel is determined based on a pixel value of a corresponding pixel.

29. The hologram recording medium preparing method according to claim 1, wherein
in the record pattern preparing step, the first original image, the second original image, and the recording plane are positioned in a three-dimensional space, a predetermined reference light is defined, an interference fringe pattern of object light from the first original image and the reference light is determined by computation for each region, to which the first record attribute is assigned, and an interference fringe pattern of object light from the second original image and the reference light is determined by computation for each region, to which the second record attribute is assigned.

30. The hologram recording medium preparing method according to claim 1, wherein
in the record pattern preparing step, the first original image and the recording plane are positioned in a three-dimensional space, a predetermined reference light is defined, and an interference fringe pattern of object light from the first original image and the reference light is determined by computation for each region to which the first record attribute is assigned, and for each region to which the second record attribute is assigned, a plurality of pixels are defined in the region, corresponding pixels on the second original image are determined for the defined pixels, and a diffraction grating pattern or a scattering structure pattern in each individual defined pixel is determined based on a pixel value of a corresponding pixel.

31. The hologram recording medium preparing method according to claim 1, wherein
in the record pattern preparing step, for each region to which the first record attribute is assigned, a plurality of pixels are defined in the region, corresponding pixels on the first original image are determined for the defined pixels, and a diffraction grating pattern or a scattering structure pattern in each individual defined pixel is determined based on a pixel value of a corresponding pixel, and for each region to which the second record attribute is assigned, a plurality of pixels are defined in the region, corresponding pixels on the second original image are determined for the defined pixels, and a diffraction grating pattern or a scattering structure pattern in each individual defined pixel is determined based on a pixel value of a corresponding pixel.

32. A non-transitory media recording a program, said program making a computer execute a process of the strip-like region defining step, a process of the attribute assigning step, and a process of the record pattern preparing step of the preparing method according to claim 1,
on the basis of digital data, expressing an original image prepared in the original image preparing step of the preparing method, and
digital data, expressing the main regions defined in the main region defining step of the preparing method.

33. A hologram recording medium, prepared by the preparing, method according to claim 1.

34. A hologram recording medium preparing device comprising:
an original image storage unit, storing, as data, a first original image of a first motif and a second original image of a second motif to be recorded, wherein the first motif and the second motif are expressed upon being positioned adjacently;
a main region data storage unit, storing data indicating a first main region and a second main region positioned spatially separated from each other on a hologram recording plane and a middle main region positioned between the first main region and the second main region and in contact with both the first main region and the second main region, wherein dimensions of said first main region, said second main region and said middle main region can be resolved with a naked eye;
a strip-like region defining unit, defining a plurality of strip-like regions extending along a first boundary line positioned at a boundary between the first main region and the middle main region or a second boundary line positioned at a boundary between the middle main region and the second main region by dividing the middle main region;
an attribute assigning unit, assigning a first record attribute to the first main region, assigning a second record attribute to the second main region, and assigning either the first record attribute or the second record attribute to the middle main region for the individual strip-like regions, respectively; and
a record pattern preparing unit, determining an interference fringe pattern, a diffraction grating pattern, or a scattering structure pattern, based on the first original image, for a region assigned with the first record attribute, and determining an interference fringe pattern, a diffraction grating pattern, or a scattering structure pattern, based on the second original image, for a region assigned with the second record attribute, to prepare data indicating a predetermined record pattern to be formed on the recording plane, wherein
in the strip-like region defining unit, a total of 2n strip-like regions constituted of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region are defined so that any of the following conditions (A), (B), and (C) is satisfied:
(A) Widths of odd-numbered strip-like regions gradually increase from the first main region to the second main region, and widths of even-numbered strip-like regions gradually decrease from the first main region to the second main region;
(B) Widths of odd-numbered strip-like regions gradually increase from the first main region to the second main region, and widths of even-numbered strip-like regions are maintained constant; and
(C) Widths of even-numbered strip-like regions gradually decrease from the first main region to the second main region, and widths of odd-numbered strip-like regions are maintained constant, and
in the attribute assigning unit, the second record attribute is assigned to the odd-numbered strip-like regions, and the first record attribute is assigned to the even numbered strip-like regions so that the first motif obtained by reproduction and the second motif obtained by reproduction are observed simultaneously to be positioned next to each other while smoothly blended at a boundary portion therebetween.

35. A hologram recording medium comprising:
a first main region and a second main region positioned spatially separated from each other and a middle main region positioned between the first main region and the second main region and in contact with both the first main region and the second main region, wherein dimensions of said first main region, said second main region and said middle main region can be resolved with a naked eye wherein the middle main region is divided into a plurality of strip-like regions extending along a first boundary line positioned at a boundary between the first main region and the middle main region or a second boundary line positioned at a boundary between the middle main region and the second main region, the plurality of strip-like regions are constituted of a total of 2n strip-like regions of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region, widths of the 2n strip-like regions are set so that any of the following conditions (A), (13), and (C) is satisfied:

(A) Widths of odd-numbered strip-like regions gradually increase from the first main region to the second main region, and widths of even-numbered strip-like regions gradually decrease from the first main region to the second main region;

(B) Widths of odd-numbered strip-like regions gradually increase from the first main region to the second main region, and widths of even-numbered strip-like regions are maintained constant; and (C) Widths of even-numbered strip-like regions gradually decrease from the first main region to the second main region, and widths of odd-numbered strip-like regions are maintained constant, and in the first main region and the even-numbered strip-like regions, an interference fringe pattern, a diffraction grating pattern, or a scattering structure pattern based on a first original image of a first motif is recorded, while in the second main region and the even-numbered strip-like regions, an interference fringe pattern, a diffraction grating pattern, or a scattering structure pattern based on a second original image of a second motif is recorded wherein the first motif and the second motif are expressed upon being positioned adjacently so the first motif obtained by reproduction and the second motif obtained by reproduction are observed simultaneously to be positioned next to each other while smoothly blended at a boundary portion therebetween.

36. A hologram recording medium comprising:

a first main region and a second main region positioned spatially separated from each other and a middle main region positioned between the first main region and the second main region and in contact with both the first main region and the second main region, wherein dimensions of said first main region, said second main region and said middle main region can be resolved with a naked eye wherein the middle main region is divided into a plurality of strip-like regions extending along a first boundary line positioned at a boundary between the first main region and the middle main region or a second boundary line positioned at a boundary between the middle main region and the second main region, the plurality of strip-like regions are constituted of a total of 2n strip-like regions of a first strip-like region in contact with the first main region, an (i+1)-th strip-like region in contact with an i-th strip-like region (i=1~2n−2, n is an integer equal to or more than 2), and a 2n-th strip-like region in contact with a (2n−1)-th strip-like region and the second main region, widths of the 2n strip-like regions are set so that any of the following conditions (A), (B), and (C) is satisfied:

(A) Widths of odd-numbered strip-like regions gradually increase from the first main region to the second main region, and widths of even-numbered strip-like regions gradually decrease from the first main region to the second main region;

(B) Widths of odd-numbered strip-like regions gradually increase from the first main region to the second main region, and widths of even-numbered strip-like regions are maintained constant; and (C) Widths of even-numbered strip-like regions gradually decrease from the first main region to the second main region, and widths of odd-numbered strip-like regions are maintained constant, and an interference fringe pattern of an object light from an original image of a first motif and a reference light is recorded in the first main region and the even-numbered strip-like regions, and in the second main region and the odd-numbered strip-like regions, a plurality of pixels are positioned, and diffraction grating patterns or scattering structure patterns according to pixels of an image of a second motif to be expressed are recorded in the individual pixels, wherein the first motif and the second motif are expressed upon being positioned adjacently so that the first motif obtained by reproduction and the second motif obtained by reproduction are observed simultaneously to be positioned next to each other while smoothly blended at a boundary portion therebetween.

* * * * *

UNITED STATES PATENT AND TRADEMARK OFFICE
CERTIFICATE OF CORRECTION

| | |
|---|---|
| PATENT NO. | : 8,630,032 B2 |
| APPLICATION NO. | : 12/075680 |
| DATED | : January 14, 2014 |
| INVENTOR(S) | : Kitamura et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1540 days.

Signed and Sealed this
Twenty-first Day of July, 2015

Michelle K. Lee
*Director of the United States Patent and Trademark Office*